(12) United States Patent
Nakajima et al.

(10) Patent No.: US 6,621,512 B2
(45) Date of Patent: Sep. 16, 2003

(54) MULTI-BEAM LIGHT SOURCE DEVICE AND MULTI-BEAM SCANNING APPARATUS USING THE SAME

(75) Inventors: Tomohiro Nakajima, Tokyo (JP); Naoki Miyatake, Kanagawa (JP); Taku Amada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 09/833,821

(22) Filed: Apr. 13, 2001

(65) Prior Publication Data

US 2002/0001118 A1 Jan. 3, 2002

(30) Foreign Application Priority Data

| Apr. 13, 2000 | (JP) | 2000-111730 |
| Apr. 17, 2000 | (JP) | 2000-115660 |
| May 17, 2000 | (JP) | 2000-144844 |
| Aug. 21, 2000 | (JP) | 2000-249523 |
| Aug. 30, 2000 | (JP) | 2000-261479 |
| Sep. 22, 2000 | (JP) | 2000-289182 |
| Mar. 30, 2001 | (JP) | 2001-101936 |

(51) Int. Cl.⁷ .................................................. B41J 2/435
(52) U.S. Cl. ........................................ 347/245; 347/263
(58) Field of Search .................................. 347/245, 263, 347/233, 238, 256, 241, 242, 257; 359/384, 383

(56) References Cited

U.S. PATENT DOCUMENTS

| 4,726,640 | A | 2/1988 | Iwama et al. | 359/200 |
| 5,017,987 | A | 5/1991 | Nanjoh et al. | 257/416 |
| 5,069,515 | A | 12/1991 | Itami et al. | 359/200 |
| 5,108,843 | A | 4/1992 | Ohtaka et al. | 428/446 |
| 5,304,357 | A | 4/1994 | Sato et al. | 118/50.1 |
| 5,408,113 | A | 4/1995 | Kanno et al. | 257/292 |
| 5,448,113 | A | 9/1995 | Suzuki et al. | 257/767 |
| 5,453,650 | A | 9/1995 | Hashimoto et al. | 310/268 |
| 5,459,601 | A | 10/1995 | Suzuki et al. | 359/205 |
| 5,508,477 | A | 4/1996 | Kato et al. | 181/205 |
| 5,510,664 | A | 4/1996 | Suzuki et al. | 310/268 |
| 5,546,216 | A | 8/1996 | Suzuki | 359/216 |
| 5,557,448 | A | 9/1996 | Endo et al. | 359/208 |
| 5,570,224 | A | 10/1996 | Endo et al. | 359/212 |
| 5,574,591 | A | 11/1996 | Suzuki et al. | 359/200 |
| 5,581,392 | A | 12/1996 | Hayashi | 359/205 |
| 5,606,448 | A | 2/1997 | Suzuki et al. | 359/200 |
| 5,612,599 | A | 3/1997 | Itami et al. | 318/254 |
| 5,633,523 | A | 5/1997 | Kato | 257/369 |
| 5,633,744 | A | 5/1997 | Nakajima | 359/196 |
| 5,652,670 | A | 7/1997 | Hayashi | 359/205 |
| 5,668,413 | A | 9/1997 | Nanjo | 257/774 |
| 5,717,511 | A | 2/1998 | Suzuki | 359/204 |
| 5,726,699 | A | 3/1998 | Itami et al. | 347/257 |
| 5,739,602 | A | 4/1998 | Suzuki et al. | 310/51 |
| 5,753,907 | A | 5/1998 | Nakajima et al. | 250/234 |
| 5,769,544 | A | 6/1998 | Suzuki et al. | 384/115 |
| 5,786,594 | A | 7/1998 | Ito et al. | 250/236 |

(List continued on next page.)

FOREIGN PATENT DOCUMENTS

| JP | 11-023988 | 1/1999 |
| JP | 11-212006 | 8/1999 |

*Primary Examiner*—Hai Pham
(74) *Attorney, Agent, or Firm*—Oblon, Spivak, McClelland, Maier & Neustadt, P.C.

(57) ABSTRACT

In a multi-beam light source device of the invention, a light source unit holds light sources and coupling lenses, the coupling lenses coupling light beams emitted by the light sources. A base member holds the light source unit such that the light beams from the light source unit held by the base member are rotatable in a direction perpendicular to a main scanning direction of an optical scanning device. An angle adjustment mechanism is provided for adjusting a mounting angle of the light source unit relative to the base member, so that respective pitches of beam spots, formed on a scanned surface by the light beams, in the direction perpendicular to the main scanning direction are variable in accordance with the mounting angle adjustment.

44 Claims, 37 Drawing Sheets

U.S. PATENT DOCUMENTS

| | | | |
|---|---|---|---|
| 5,793,408 A | 8/1998 | Nakajima | 347/259 |
| 5,811,353 A | 9/1998 | Nanjo | 438/666 |
| 5,875,051 A | 2/1999 | Suzuki et al. | 359/205 |
| 5,909,966 A | 6/1999 | Suzuki et al. | 384/115 |
| 5,936,756 A | 8/1999 | Nakajima | 359/208 |
| 5,952,649 A | 9/1999 | Amada | 250/234 |
| 5,969,844 A | 10/1999 | Itami et al. | 359/200 |
| 5,986,791 A | 11/1999 | Suzuki et al. | 359/207 |
| 5,999,345 A | 12/1999 | Nakajima et al. | 359/821 |
| 6,052,211 A | 4/2000 | Nakajima | 359/204 |
| 6,069,724 A | 5/2000 | Hayashi et al. | 359/206 |
| 6,081,386 A | 6/2000 | Hayashi et al. | 359/641 |
| 6,091,534 A | 7/2000 | Nakajima | 359/208 |
| 6,104,522 A | 8/2000 | Hayashi et al. | 359/207 |
| 6,141,133 A | 10/2000 | Suzuki et al. | 359/207 |
| 6,150,698 A | 11/2000 | Ohtsuka et al. | 257/371 |
| 6,150,779 A | 11/2000 | Itami et al. | 318/254 |
| 6,185,026 B1 | 2/2001 | Hayashi et al. | 359/204 |
| 6,198,562 B1 | 3/2001 | Hayashi et al. | 359/204 |
| 6,215,974 B1 | 4/2001 | Katoh et al. | 399/258 |
| 6,222,662 B1 | 4/2001 | Suzuki et al. | 359/205 |
| 6,229,638 B1 | 5/2001 | Sakai et al. | 359/212 |
| 6,233,081 B1 | 5/2001 | Suzuki et al. | 359/212 |
| 6,256,133 B1 | 7/2001 | Suzuki et al. | 359/207 |
| 6,281,609 B1 | 8/2001 | Itami et al. | 310/68 B |
| 6,312,108 B1 | 11/2001 | Kato | 347/54 |
| 6,324,149 B1 | 11/2001 | Mifune et al. | 369/112.01 |
| 6,332,669 B1 | 12/2001 | Kato et al. | 347/54 |
| 6,347,004 B1 | 2/2002 | Suzuki et al. | 359/205 |
| 6,359,717 B2 | 3/2002 | Suzuki et al. | 359/205 |
| 6,367,914 B1 | 4/2002 | Ohtaka et al. | 347/54 |
| 6,400,917 B2 | 6/2002 | Nakazato et al. | 399/111 |
| 6,429,956 B2 | 8/2002 | Itabashi | 359/204 |
| 6,450,618 B2 | 9/2002 | Kato et al. | 347/54 |
| 6,465,918 B1 | 10/2002 | Itami et al. | 310/68 B |
| 6,467,881 B2 | 10/2002 | Katoh | 347/55 |
| 6,485,126 B1 | 11/2002 | Kato et al. | 347/54 |
| 6,496,293 B2 | 12/2002 | Kawamura | 359/212 |
| 6,497,474 B2 | 12/2002 | Irinoda et al. | 347/54 |

FIG.3A
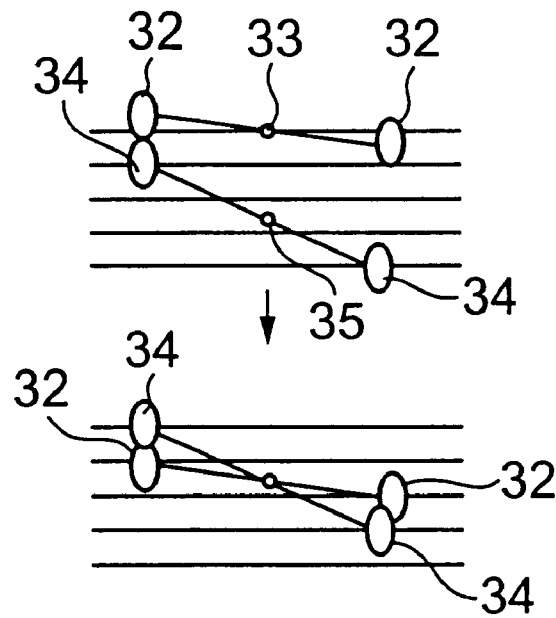
FIG.3B
FIG.4A
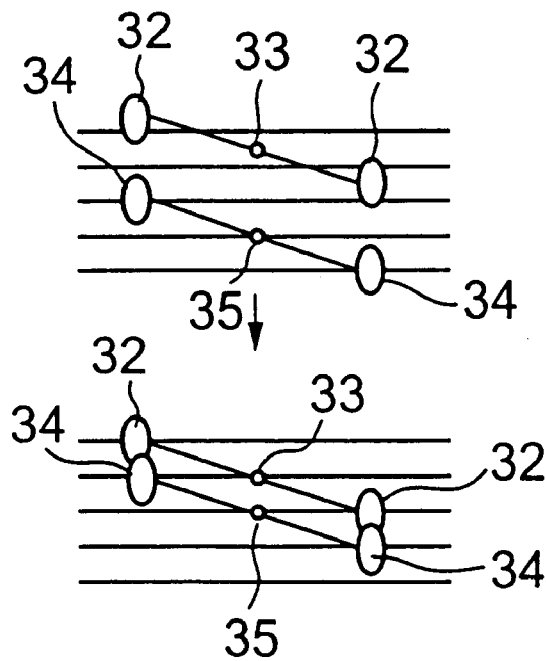
FIG.4B

FIG.7
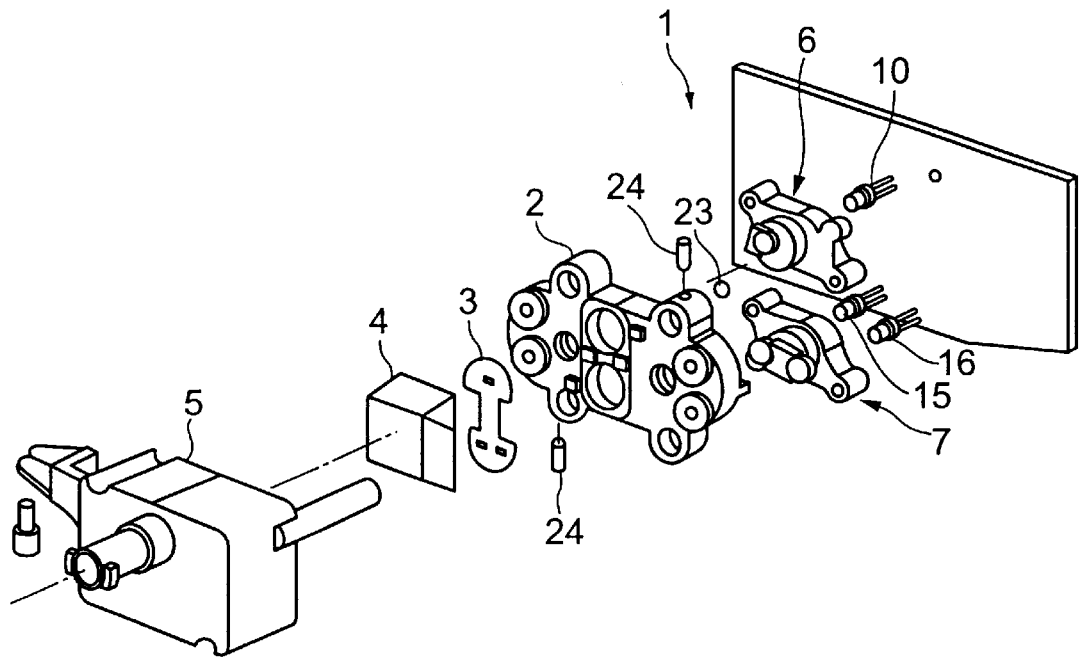
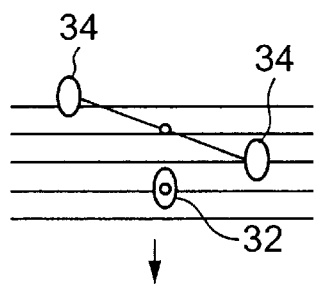
FIG.8A
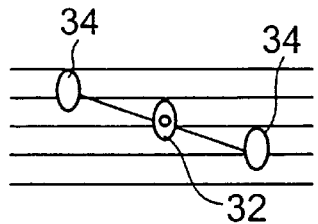
FIG.8B

FIG.17

| | | Rm | Rs | ΔX | N | REMARKS |
|---|---|---|---|---|---|---|
| LIGHT SOURCE | | – | – | 12.84 | | LD WAVELENGTH : 780nm |
| COUPLING LENS | 1ST SURFACE | 52.5 | 52.5 | 3.8 | 1.511 | COAXIAL (NOTE1) |
| | 2ND SURFACE | -8.7 | -6.7 | 15.0 | | COAXIAL (NOTE1) |
| APERTURE | | – | – | 68.4 | | |
| CYLINDRICAL LENS | 1ST SURFACE | ∞ | 36.1 | 3.0 | 1.511 | |
| | 2ND SURFACE | ∞ | ∞ | 69.7 | | |
| POLYGONAL MIRROR | | ∞ | ∞ | 52.6 | | |
| FOCUSING LENS 1 | 1ST SURFACE | -312.6 | -313.6 | 31.4 | 1.524 | COAXIAL (NOTE2,3) |
| | 2ND SURFACE | -83.0 | -83.0 | 78.0 | | COAXIAL (NOTE2,3) |
| FOCUSING LENS 2 | 1ST SURFACE | -500 | -47.7 | 3.5 | 1.524 | TOROIDAL (NOTE2) |
| | 2ND SURFACE | -1000 | -23.38 | 143.8 | | TOROIDAL (NOTE2) |
| SCANNED SURFACE | | – | – | – | – | |

Rm : (MAIN-SCAN) RADIUS OF CURVATURE [mm]
Rs : (SUB-SCAN) RADIUS OF CURVATURE [mm]
ΔX : INTER - SURFACE DISTANCE [mm]
N : REFRACTIVE INDEX

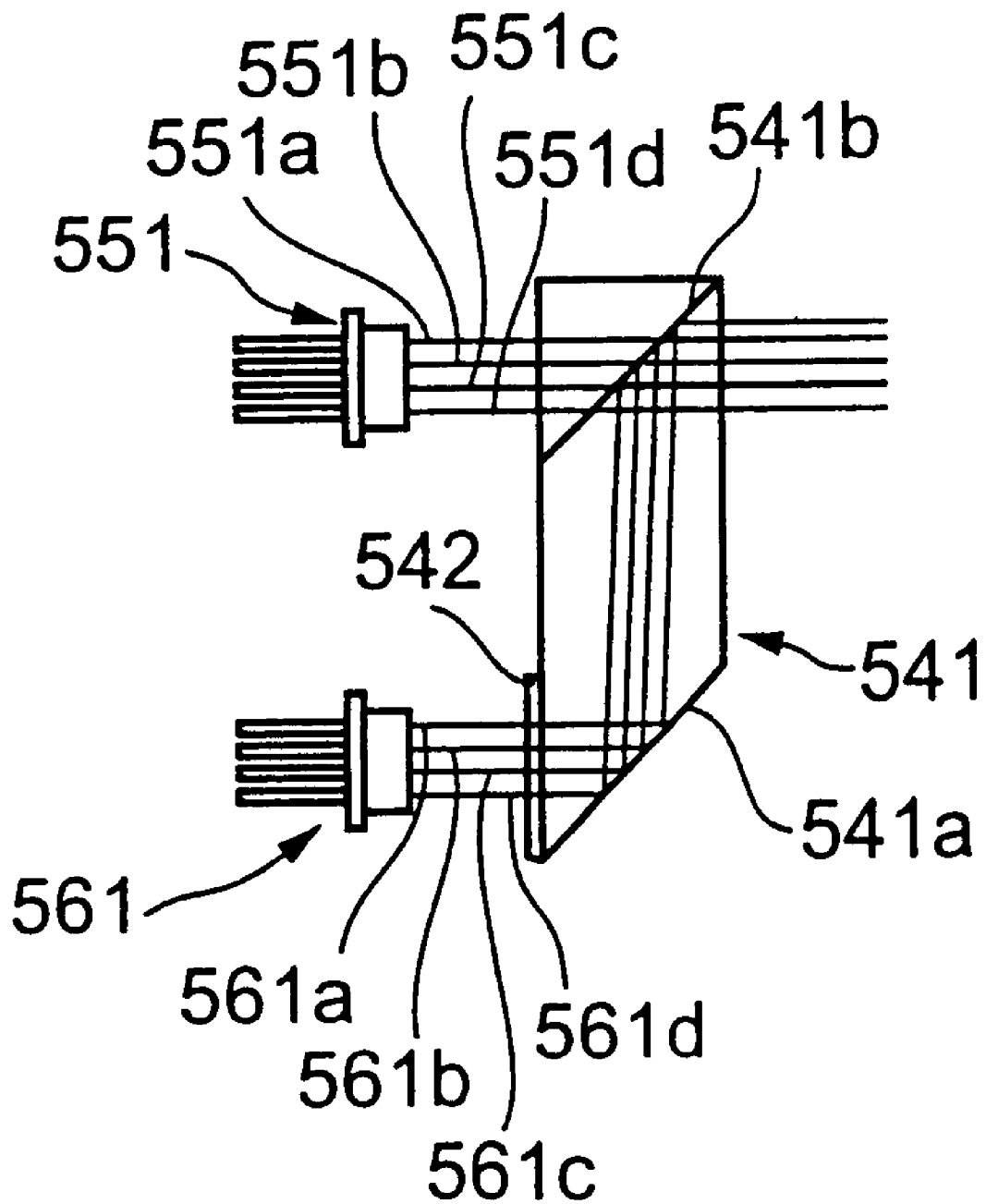

MULTI-BEAM LIGHT SOURCE DEVICE AND MULTI-BEAM SCANNING APPARATUS USING THE SAME

BACKGROUND OF THE INVENTION

1. Field of the Invention

The present invention relates to a multi-beam light source device and a multi-beam scanning apparatus using the multi-beam light source device, which simultaneously emit multiple light beams to a photosensitive medium of an electrophotographic copier or printer in order to speedily form an electrostatic latent image on the photosensitive medium. Specifically, the present invention relates to improvements of a multi-beam light source device and a multi-beam scanning apparatus to facilitate the alignment adjusting operations for the optical axes of laser beams emitted by a plurality of laser light sources.

2. Description of the Related Art

As disclosed in Japanese Laid-Open Patent Application Nos.8-68956, 9-197310, 11-23988 and 11-153762, multi-beam light source devices and multi-beam scanning devices are known in which laser beams, emitted by a plurality of laser light sources, are simultaneously applied to a photosensitive medium of an electrophotographic copier or printer in order to form an image on the photosensitive medium or optically write information thereon.

In such multi-beam light source device, disclosed in Japanese Laid-Open Patent Application Nos.11-23988 and 11-153762, the laser light sources are arrayed in the main scanning direction, and a beam synthesizing prism is used to combine diverging laser beams, emitted by the light sources, into collimated laser beams. The conventional multi-beam light source device has a simple configuration and eliminates time-varying changes of the alignment of beam spots on the scanned surface to increase the stability of the performance.

In order to achieve accurate positioning of beam spots on the scanned surface of the photosensitive medium with the conventional multi-beam light source device, it is necessary to increase the accuracy of alignment of the optical axes of the laser beams produced by the beam synthesizing prism, as well as the accuracy of positioning of the beam split surface and the reflection surface of the beam synthesizing prism in the multi-beam light source device. When volume production is required, it is difficult to achieve accurate positioning of beam spots on the scanned surface of the photosensitive medium with the conventional multi-beam light source device. It is difficult to increase the accuracy of alignment of beam spots on the scanned surface in the sub-scanning direction by performing the alignment adjusting operations on the conventional multi-beam light source device.

SUMMARY OF THE INVENTION

It is an object of the present invention to provide an improved multi-beam light source device in which the above-described problems are eliminated.

Another object of the present invention is to provide a multi-beam light source device that can easily achieve accurate positioning of the beam spots on the scanned surface by performing the alignment adjusting operations with the multi-beam light source device.

Another object of the present invention is to provide a multi-beam scanning apparatus including a multi-beam light source device that can easily achieve accurate positioning of the beam spots on the scanned surface by performing the alignment adjusting operations with the multi-beam light source device.

Another object of the present invention is to provide a multi-beam scanning apparatus that can achieve stable image reproduction performance even when the multi-beam light source device uses general-purpose light sources.

Another object of the present invention is to provide a multi-beam light source device that can easily achieve accurate positioning of the optical paths of the light beams from the light sources by performing the alignment adjusting operations.

Another object of the present invention is to provide a multi-beam scanning apparatus that can easily achieve accurate positioning of the optical paths of the light beams from the light sources by performing the alignment adjusting operations.

Another object of the present invention is to provide a multi-beam scanning device that can reduce deformations of the light source holder and achieve stable image reproduction performance when performing the alignment adjusting operations with the multi-beam light source device, when fastening the light source holder, or when the ambient temperature fluctuates.

The above-mentioned objects are achieved by a multi-beam light source device comprising: multi-beam light source device comprising: a light source unit holding light sources and coupling lenses, the coupling lenses coupling light beams emitted by the light sources; a base member holding the light source unit such that the light beams from the light source unit held by the base member are rotatable in a direction perpendicular to a main scanning direction of an optical scanning device; and an angle adjustment mechanism provided for adjusting a mounting angle of the light source unit relative to the base member, so that respective pitches of beam spots, formed on a scanned surface by the light beams, in the direction perpendicular to the main scanning direction are variable in accordance with the mounting angle adjustment.

The above-mentioned objects are achieved by a multi-beam scanning apparatus including a multi-beam light source device, the multi-beam light source device comprising: a light source unit supporting light sources and coupling lenses to array the light sources in the main scanning direction, the coupling lenses coupling light beams emitted by the light sources; and an optical path changing unit changing an optical path of part of the light beams of the light source unit such that the light beams from the light source unit and the light beams from the optical path changing unit are converted into adjacent light beams that intersect each other in the main scanning direction in the vicinity of a deflector of the optical scanning unit, the optical path changing unit being provided to vary an intersecting angle of the adjacent light beams.

The above-mentioned objects are achieved by a multi-beam light source device comprising: a light source holder holding a plurality of light sources, the light sources emitting multiple light beams; a fastening member supporting the light source holder to maintain a direction of the light source holder relative to an emission axis of the light beams, the fastening member having fastening portions secured to a base member that is fixed to a focusing optical device, wherein the light source holder and the fastening member form a light source unit; and a mounting member supporting the light source unit on the base member by exerting a pressing force on the light source unit against the base member so as to match a direction of the light source unit relative to the base member with an emission axis perpendicular to a scanned surface of an optical scanning unit.

The above-mentioned objects are achieved by a multi-beam light source device comprising: a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder is separately provided with and attached to the fastening member to form an integral light source unit, and the light source holder and the fastening member are of different materials.

The above-mentioned objects are achieved by a multi-beam light source device for use in a multi-beam scanning apparatus, the multi-beam light source device comprising: a plurality of first light sources; a plurality of first coupling lenses which couple light beams emitted by the first light sources; a first light source holder which holds the first light sources and the first coupling lenses; a plurality of second light sources; a plurality of second coupling lenses which couples light beams emitted by the second light sources; a second light source holder which holds the second light sources and the second coupling lenses; a base member which integrally supports the first light source holder and the second light source holder by applying pressure of an elastic member thereto to maintain a direction of each light source holder relative to an emission axis of the light beams; an attitude adjustment mechanism which is provided for adjusting an optical path direction of the light beams of one of the first and second light sources relative to the emission axis by moving one of the first and second light source holders to the other light source holder against the pressure of the elastic member.

The above-mentioned objects are achieved by a multi-beam scanning apparatus including an optical scanning unit and a multi-beam light source device, the multi-beam light source device comprising: a plurality of first light sources; a plurality of first coupling lenses which couples light beams emitted by the first light sources; a first light source holder which holds the first light sources and the first coupling lenses; a plurality of second light sources; a plurality of second coupling lenses which couples light beams emitted by the second light sources; a second light source holder which holds the second light sources and the second coupling lenses; a base member which integrally supports the first light source holder and the second light source holder by applying pressure of an elastic member thereto to maintain a direction of each light source holder relative to an emission axis of the light beams; and an attitude adjustment mechanism which is provided for adjusting an optical path direction of the light beams of one of the first and second light sources relative to the emission axis by moving one of the first and second light source holders to the other light source holder against the pressure of the elastic member, wherein the optical scanning unit scans a surface of a photosensitive medium in a main scanning direction by focusing the multiple light beams of the multi-beam light source device onto the scanned surface.

The above-mentioned objects are achieved by a multi-beam light source device comprising: a light source holder which holds a plurality of light sources, the light sources emitting multiple light beams; a fastening member which supports the light source holder to maintain a direction of the light source holder relative to an emission axis of the light beams, the fastening member having fastening portions secured to a base member that is fixed to a housing, wherein the light source holder is separately provided with and attached to the fastening member to form an integral light source unit; and a mounting mechanism which is provided for adjusting a mounting angle of the light source unit relative to the base member, so that respective pitches of beam spots, formed on a scanned surface by the light beams, are variable in a sub-scanning direction in accordance with the mounting angle adjustment.

The above-mentioned objects are achieved by a multi-beam light source device comprising: a light source holder which holds light sources and coupling lenses, the coupling lenses coupling multiple light beams emitted by the light sources, the light source holder having a first linear expansion coefficient; a fastening member which supports the light source holder to maintain a mounting angle of the light source holder relative to an emission axis of the light beams, the fastening member having a second linear expansion coefficient, and the fastening member having fastening portions secured to a base member fixed to a housing; and an intermediate member which is provided between an outside peripheral surface of the light source holder and an inside peripheral surface of the fastening member such that the light source holder is supported onto the fastening member through the intermediate member without contacting the fastening member directly.

The above-mentioned objects are achieved by an image forming system including a multi-beam light source device and a multi-beam scanning apparatus, the multi-beam light source device comprising: a light source unit holding light sources and coupling lenses, the coupling lenses coupling light beams emitted by the light sources; a base member holding the light source unit such that the light beams from the light source unit held by the base member are rotatable in a direction perpendicular to a main scanning direction of an optical scanning device; and an angle adjustment mechanism provided for adjusting a mounting angle of the light source unit relative to the base member, so that respective pitches of beam spots, formed on a scanned surface by the light beams, in the direction perpendicular to the main scanning direction are variable in accordance with the mounting angle adjustment.

The above-mentioned objects are achieved by an image forming system including a multi-beam light source device and a multi-beam scanning apparatus, the multi-beam light source device comprising: a light source unit supporting light sources and coupling lenses to array the light sources in the main scanning direction, the coupling lenses coupling light beams emitted by the light sources; and an optical path changing unit changing an optical path of part of the light beams of the light source unit such that the light beams from the light source unit and the light beams from the optical path changing unit are converted into adjacent light beams that intersect each other in the main scanning direction in the vicinity of a deflector of the optical scanning unit, the optical path changing unit being provided to vary an intersecting angle of the adjacent light beams.

The above-mentioned objects are achieved by an image forming system including a multi-beam light source device and a multi-beam scanning apparatus, the multi-beam light source device comprising: a light source holder holding a plurality of light sources, the light sources emitting multiple light beams; a fastening member supporting the light source holder to maintain a direction of the light source holder relative to an emission axis of the light beams, the fastening member having fastening portions secured to a base member that is fixed to a focusing optical device, wherein the light source holder and the fastening member form a light source unit; and a mounting member supporting the light source unit on the base member by exerting a pressing force on the light source unit against the base member so as to match a direction of the light source unit relative to the base member with an emission axis perpendicular to a scanned surface of an optical scanning unit.

The above-mentioned objects are achieved by an image forming system including a multi-beam light source device and a multi-beam scanning apparatus, the multi-beam light source device comprising: a light source holder holding a plurality of light sources, the light sources emitting multiple light beams; a fastening member supporting the light source holder to maintain a direction of the light source holder relative to an emission axis of the light beams, the fastening member having fastening portions secured to a base member that is fixed to a focusing optical device, wherein the light source holder is separately provided with and attached to the fastening member to form an integral light source unit, and the light source holder and the fastening member are of different materials.

In the multi-beam light source device and the multi-beam scanning apparatus of one preferred embodiment of the invention, the angle adjustment mechanism is provided for adjusting a mounting angle of at least one of the first and second light source units relative to the base member, so that respective pitches of beam spots, formed on the scanned surface by the light beams from the first and second light source units, are variable in the sub-scanning direction in accordance with the mounting angle adjustment. The multi-beam light source device of the present invention is effective in providing accurate positioning of the beam spots on the scanned surface by performing the alignment adjusting operations.

In the multi-beam scanning apparatus of one preferred embodiment of the invention, the multi-beam scanning device is provided with the angle adjustment mechanism. The multi-beam scanning apparatus of the present invention is effective in providing accurate positioning of the beam spots on the scanned surface by performing the alignment adjusting operations.

The multi-beam scanning apparatus of one preferred embodiment of the invention is effective in providing stable image reproduction performance even when the multi-beam light source device uses general-purpose light sources.

The multi-beam light source device and the multi-beam scanning apparatus of one preferred embodiment of the invention are effective in easily providing accurate positioning of the optical paths of the light beams from the light sources by performing the alignment adjusting operations.

The multi-beam scanning apparatus and the multi-beam light source device of one preferred embodiment of the invention are effective in reducing deformations of the light source holder and providing stable image reproduction performance.

BRIEF DESCRIPTION OF THE DRAWINGS

Other objects, features and advantages of the present invention will be apparent from the following detailed description when read in conjunction with the accompanying drawings.

FIG. 3A and FIG. 3B are diagrams for explaining a positional adjustment of the beam spots that is performed with the multi-beam light source device of FIG. 1.

FIG. 4A and FIG. 4B are diagrams for explaining another positional adjustment of the beam spots that is performed with the multi-beam light source device of FIG. 1.

FIG. 7 is an exploded view of another preferred embodiment of the multi-beam light source device of the invention.

FIG. 8A and FIG. 8B are diagrams for explaining a positional adjustment of the beam spots performed with the multi-beam light source device of FIG. 7.

FIG. 17 is a diagram for explaining the specifications and layout of the optical elements of the multi-beam scanning apparatus of the present embodiment.

FIG. 38 is a diagram for explaining a beam synthesizing prism in another configuration of the multi-beam light source device of the present embodiment.

DETAILED DESCRIPTION OF PREFERRED EMBODIMENTS

A description will now be given of preferred embodiments of the charging process management system of the present invention with reference to the accompanying drawings.

In the multi-beam light source device of the present invention, a first light source unit holds first light sources and first coupling lenses, the first coupling lenses coupling light beams emitted by the first light sources. A second light source unit holds second light sources and second coupling lenses, the second coupling lenses coupling light beams emitted by the second light sources. A base member holds the first light source unit and the second light source unit such that the light beams from at least one of the first and second light source units held by the base member are rotatable in a sub-scanning direction. A beam synthesizing unit converts the light beams from the first and second light source units into adjacent light beams that are adjacent to each other on a scanned surface, so that the light beams are directed to the scanned surface along an emission axis perpendicular to the scanned surface. An angle adjustment mechanism is provided for adjusting a mounting angle of at least one of the first and second light source units relative to the base member, so that respective pitches of beam spots, formed on the scanned surface by the light beams from the first and second light source units, are variable in the sub-scanning direction in accordance with the mounting angle adjustment.

Figure 1:
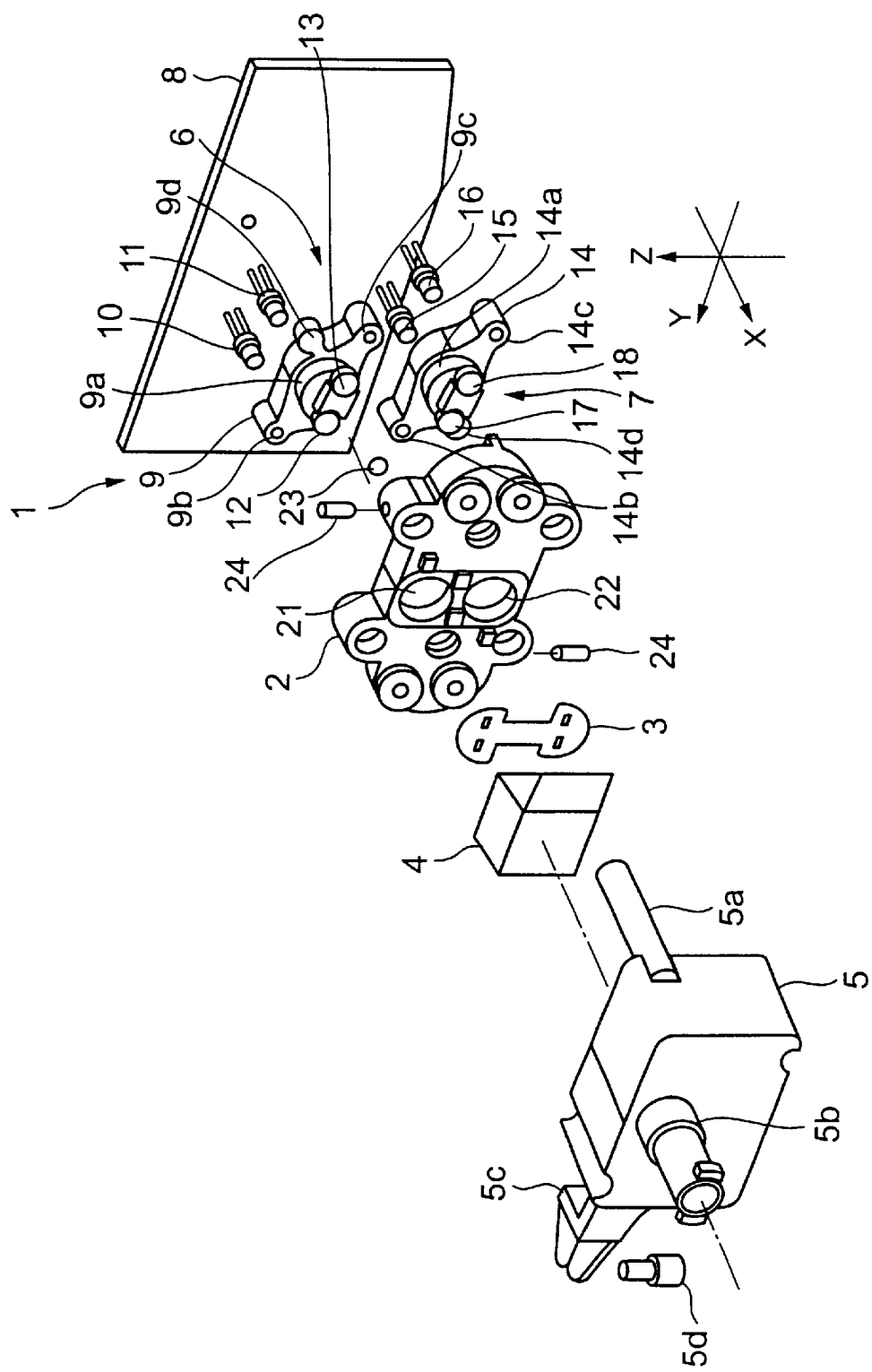
FIG. 1 is an exploded view of one preferred embodiment of the multi-beam light source device of the invention.

FIG. 1 is an exploded view of one preferred embodiment of the multi-beam light source device of the invention.

As shown in FIG. 1, the multi-beam light source device of the present embodiment is a 4-beam light source device. The 4-beam light source device generally comprises a light source member 1, a base member 2, an aperture plate 3, a beam synthesizing prism 4, and a holder member 5.

The light source member 1 includes a first light source unit 6, a second light source unit 7, and a substrate board 8. The first light source unit 6 includes a supporting member 9 and two semiconductor lasers 10 and 11. The semiconductor lasers 10 and 11 are provided as light sources that emit laser beams in the first light source unit 6. The supporting member 9 is made of, for example, aluminum die casting. On the back surface of the supporting member 9, mounting holes are provided to fit the semiconductor lasers 10 and 11 into the mounting holes of the supporting member 9. The semiconductor lasers 10 and 11 are press-fitted into the mounting holes of the supporting member 9 so that they are aligned with each other in a main scanning direction at a given distance (for example, about 8 mm). The light sources 10 and 11 of the first light source unit 6 are fitted to the supporting member 9 at positions that are symmetric with respect to a first emission axis of the first light source unit 6.

Further, on the front surface of the supporting member 9, coupling lenses 12 and 13, corresponding to the light sources 10 and 11, are provided. After the positioning of the coupling lenses 12 and 13 is performed, a UV curing adhesive agent is applied to between the coupling lens and the mounting portion of the supporting member 9, so that the coupling lenses 12 and 13 are secured to the supporting member 9. The coupling lenses 12 and 13 respectively convert the laser beams, emitted by the semiconductor lasers 10 and 11, into collimated laser beams in a given direction along the first emission axis of the first light source unit 6.

Similarly, the second light source unit 7 includes a supporting member 14 and two semiconductor lasers 15 and 16. The semiconductor lasers 15 and 16 are provided as light sources that emit laser beams in the second light source unit 7. The supporting member 14 is made of, for example, aluminum die casting. On the back surface of the supporting member 14, mounting holes are provided to fit the semiconductor lasers 15 and 16 into the mounting holes of the supporting member 14. The semiconductor lasers 15 and 16 are press-fitted into the mounting holes of the supporting member 14 so that they are aligned with each other in a main scanning direction. The light sources 15 and 16 of the second light source unit 7 are fitted to the supporting member 14 at positions that are symmetric with respect to a second emission axis of the second light source unit 7.

Further, on the front surface of the supporting member 14, coupling lenses 17 and 18, corresponding to the light sources 17 and 18, are provided. After the positioning of the coupling lenses 17 and 18 is performed, a UV curing adhesive agent is applied to between the coupling lens and the mounting portion of the supporting member 14, so that the coupling lenses 17 and 18 are secured to the supporting member 14. The coupling lenses 17 and 18 respectively convert the laser beams, emitted by the semiconductor lasers 17 and 18, into collimated laser beams in a given direction along the second emission axis of the second light source unit 7.

The circuit board 8 contains both a laser drive circuit for driving the semiconductor lasers 10 and 11 and a laser drive circuit for driving the semiconductor lasers 15 and 16.

The supporting member 9 includes a cylinder portion 9a having a center that matches with the first emission axis of the first light source unit 6, and the supporting member 14 includes a cylinder portion 14a having a center that matches with the second emission axis of the second light source unit 7. The base member 2 includes a pair of mounting holes 21 and 22. The cylinder portion 9a of the supporting member 9 is fitted to the mounting hole 21 of the base member 2. The cylinder portion 14a of the supporting member 14 is fitted to the mounting hole 22 of the base member 2.

The supporting member 9 is provided with a pair of mounting portions 9b and 9c that are symmetrically located with respect to the first emission axis of the first light source unit 6, and further with a mounting portion 9d that is located at a right-angle point of a right triangle having a hypotenuse that matches with a line segment passing through the positions of the mounting portions 9b and 9c. Also, the supporting member 14 is provided with a pair of mounting portions 14b and 14c that are symmetrically located with respect to the second emission axis of the second light source unit 7, and further with a mounting portion 14d that is located at a right-angle point of a right triangle having a hypotenuse that matches with a line segment passing through the positions of the mounting portions 14b and 14c.

The supporting member 9 is supported by the base member 2 on the basis of the three mounting portions 9b, 9c and 9d by fitting the cylinder portion 9a of the supporting member 9 to the mounting hole 21 of the base member 2 and fastening the front surface of the base member 2 to the mounting portions 9b and 9c by means of screws. Also, the supporting member 14 is supported by the base member 2 on the basis of the three mounting portions 14b, 14c and 14d by fitting the cylinder portion 14a of the supporting member 14 to the mounting hole 22 of the base member 2 and fastening the front surface of the base member 2 to the mounting portions 14b and 14c by means of screws.

The aperture plate 3 includes four apertures corresponding to the semiconductor lasers 10, 11, 15 and 16 of the first and second light source units 6 and 7. The beam synthesizing prism 4 converts the laser beams from the semiconductor lasers 10, 11, 15 and 16 into adjacent light beams that are adjacent to each other on a scanned surface of a photosensitive medium (not shown). The aperture plate 3 and the beam synthesizing prism 4 are attached to the front surface of the base member 2 on which the first and second light source units 6 and 7 are mounted, so that the laser beams are directed to the scanned surface along the emission axis perpendicular to the scanned surface.

The holder member 5 holds the aperture plate 3 and the beam synthesizing prism 4 onto the base member 2. The holder member 5 includes a supporting rod 5a, and this supporting rod 5a is secured to the circuit board 8. As described above, the circuit board 8 contains the laser drive circuit for the semiconductor lasers 10 and 11 and the laser drive circuit for the semiconductor lasers 15 and 16, and lead lines from the semiconductor lasers 10, 11, 15 and 16 are soldered to the laser drive circuits of the circuit board 8. In the above-described manner, the 4-beam light source device of the present embodiment is constructed.

The holder member 5 includes a cylinder portion 5b. When the multi-beam light source device of the present embodiment is attached to a housing of an optical scanning apparatus (not shown), the center of the cylinder portion 5b of the holder member 5 is aligned with the optical axis of the optical scanning apparatus, and then the holder member 5 is secured to the housing thereof. The laser beams from the multi-beam light source device of the present embodiment are incident to the optical scanning apparatus.

Further, the holder member 5 includes a lever 5c and an adjusting screw 5d. The level 5c is integrally formed with the holder member 5. The adjusting screw 5d is brought into contact with the lever 5c. The holder member 5 is rotatably supported on the housing of the optical scanning apparatus such that the holder member 5 is rotatable around the central axis of the cylinder portion 5b when the adjusting screw 5d is manually rotated to move up or down the lever 5c. Hence, when an undesired inclination of the scanning lines from the optical scanning apparatus with respect to the main scanning direction occurs, it is possible to eliminate the undesired inclination and adjust the laser beams along the correct scanning lines by rotating the adjusting screw 5d of the multi-beam light source device of the present embodiment on the optical scanning apparatus.

Figure 2:
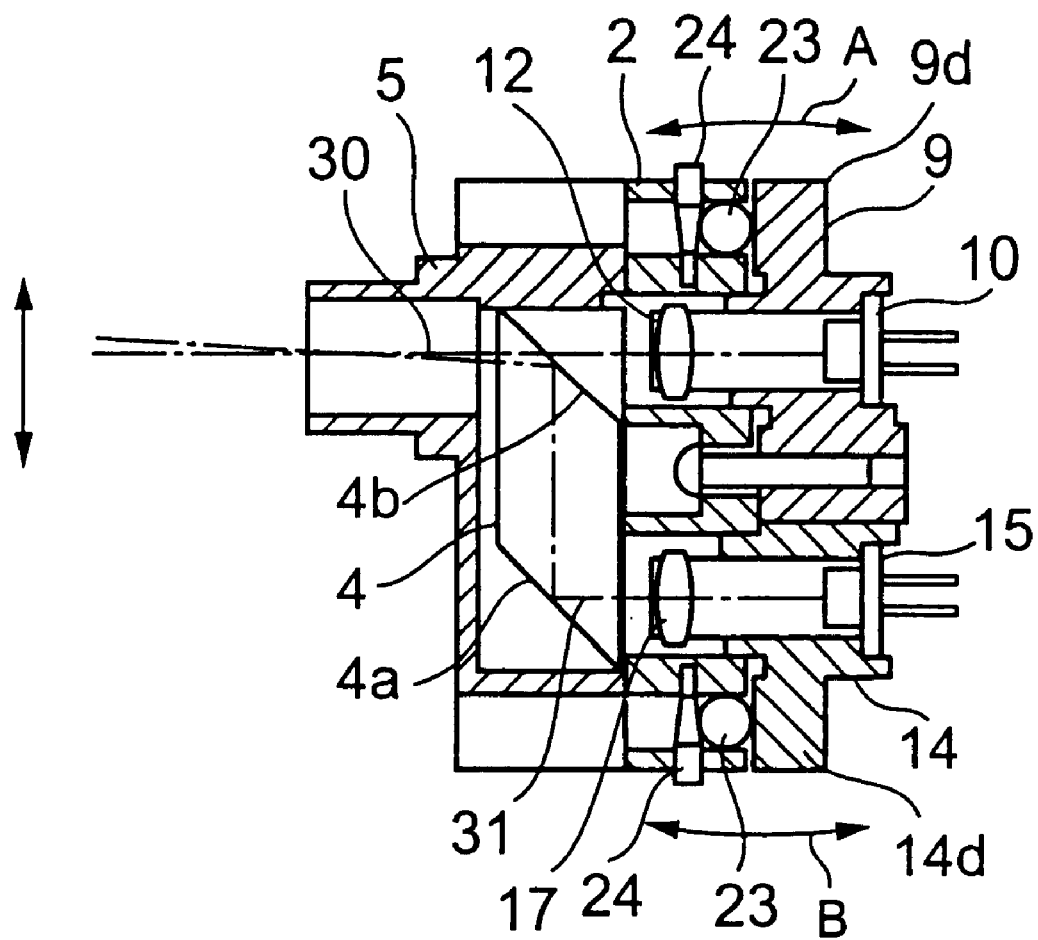
FIG. 2 is a cross-sectional view of the multi-beam light source device of FIG. 1.

FIG. 2 is a cross-sectional view of the multi-beam light source device of FIG. 1 in the sub-scanning direction.

As shown in FIG. 2, the beam synthesizing prism 4 includes a lower slanted surface 4a and an upper beam-split surface 4b. The laser beams 30, emitted by the first light source unit 6, pass through the beam-split surface 4b to the emission axis of the multi-beam light source device. The laser beams 31, emitted from the second light source unit 7, are reflected by the lower slanted surface 4a to the beam-split surface 4b, and the reflected laser beams are further reflected by the beam-split surface 4b to the emission axis of the multi-beam light source device. Hence, the beam synthesizing prism 5 converts the laser beams from the semiconductor lasers 10, 11, 15 and 16 into the adjacent light beams that are adjacent to each other on the scanned surface of the photosensitive medium.

As indicated by the arrow in FIG. 2, when an angular error of the beam synthesizing prism 5 on the multi-beam light source device takes place, the emission direction of the laser beams 31, reflected through the beam synthesizing prism 5, will deviate from the emission direction of the laser beams 30 that matches with the emission axis of the multi-beam light source device.

FIG. 3A and FIG. 3B are diagrams for explaining a positional adjustment of the beam spots that is performed with the multi-beam light source device of FIG. 1.

As shown in FIG. 3A, the laser beams 30, emitted by the semiconductor lasers 10 and 11 and passed through the prism 4, form a pair of beam spots 32 on the scanned surface, while the laser beams 31, emitted by the semiconductor lasers 15 and 16 and reflected through the prism 4, form a pair of beam spots 34. In FIG. 3A, a central position between the beam spots 32 is indicated by reference numeral 33, and a central position between the beam spots 34 is indicated by reference numeral 35. When a deviation of the emission direction of the laser beams 31 from the emission direction of the laser beams 30 occurs as shown in FIG. 2, the central position 33 of the beam spots 32 deviates from the central position 35 of the beam spots 34 on the scanned surface in the sub-scanning direction as shown in FIG. 3A. The respective pitches of beam spots, formed on the scanned surface, will be inaccurate and not match with the scanning lines.

In order to eliminate the above problem, the multi-beam light source device of the present embodiment is provided with an angle adjustment mechanism. This angle adjustment mechanism is provided for adjusting a mounting angle of at least one of the first and second light source units 6 and 7 relative to the base member, so that the respective pitches of the beam spots, formed on the scanned surface by the light beams from the first and second light source units 6 and 7, are variable in the sub-scanning direction in accordance with the mounting angle adjustment.

The angle adjustment mechanism of the present embodiment includes balls 23 which are provided on the base member 2 for the first and second light source units 6 and 7, and adjusting screws 24 each having a conical surface contacting a corresponding one of the balls 23.

As shown in FIG. 2, one of the balls 23 is provided on the base member 2 to contact the mounting portion 9d of the supporting member 9, and the other ball 23 is provided on the base member 2 to contact the mounting portion 14d of the supporting member 14. The balls 23 are provided on the base member 2 to make the gradients of the semiconductor lasers of the first and second light source units 6 and 7 relative to the emission axis variable. Each of the adjusting screws 24 is provided on the base member 2 in contact with a corresponding one of the balls 23. Each of the adjusting screws 24 is movable to the base member 2 in a direction perpendicular to the emission axis.

Therefore, by rotating the adjusting screws 24 in the angle adjustment mechanism of the present embodiment so that the adjusting screws 24 are moved to the base member 2 in the desired direction, the gradients of the light sources of the first and second light source units 6 and 7 relative to the emission axis can be adjusted by the connections of the balls 23 and the adjusting screws 24.

As indicated by the arrow "A" in FIG. 2, the gradient of the semiconductor lasers 10 and 11 relative to the emission axis can be adjusted when the upper-side adjusting screw 24 is moved relative to the base member 2 in the desired direction perpendicular to the emission axis. Similarly, as indicated by the arrow "B" in FIG. 2, the gradient of the semiconductor lasers 15 and 16 relative to the emission axis can be adjusted when the lower-side adjusting screw 24 is moved to the base member 2 in the direction perpendicular to the emission axis.

By adjusting the adjusting screws 24 relative to the base member 2, the deviation of the central position 33 of the beam spots 32 from the central position 35 of the beam spots 34 on the scanned surface in the sub-scanning direction, shown in FIG. 3A, can be corrected so that the respective pitches of beam spots, formed on the scanned surface after the adjustment, will be accurate and match with the scanning lines as shown in FIG. 3B.

FIG. 4A and FIG. 4B are diagrams for explaining another layout of the beam spots in the multi-beam light source device of the present embodiment. The layout of the beam spots on the scanned surface may be modified to that shown in FIG. 4A and FIG. 4B, instead of that of FIG. 3A and FIG. 3B.

Figure 5:
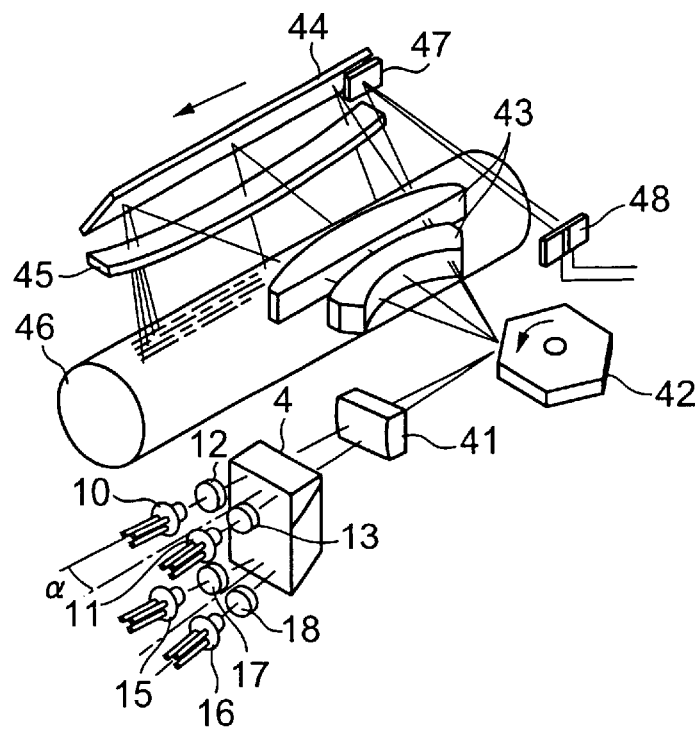
FIG. 5 is a perspective view of a multi-beam scanning apparatus in which the multi-beam light source device of FIG. 1 is provided.

FIG. 5 is a perspective view of a multi-beam scanning apparatus in which the multi-beam light source device of FIG. 1 is provided.

As shown in FIG. 5, in the multi-beam scanning apparatus, the beam synthesizing prism 4, the laser diodes 10, 11 and the coupling lenses 12, 13, and the laser diodes 15, 16 and the coupling lenses 17, 18 are provided as the elements of the multi-beam light source device of the present embodiment. The laser beams of the multi-beam light source device are directed to a reflection surface of a rotary polygonal mirror 42 through a focusing lens 41. For example, the optical axes of the laser beams of the laser diodes 11 and 12 are symmetrical about the emission axis and at an intersecting angle "α" within a horizontal plane including the emission axis as shown in FIG. 5.

The laser beams reflected by the polygonal mirror 42 are passed through focusing optical lenses 43. The focusing optical lenses 43 convert the laser beams from the polygonal mirror 42 into converging laser beams in the main scanning direction. A reflector 44 reflects the laser beams from the focusing optical lenses 43 onto a scanned surface of a photosensitive drum 46. A toroidal lens 45 converts the reflected laser beams from the reflector 44 into converging laser beams in the sub-scanning direction, and focuses the laser beams onto the scanned surface of the photosensitive drum 46. The beam spots are formed on the scanned surface of the photosensitive drum 46 by the laser beams of the multi-beam light source device.

In the multi-beam scanning apparatus of FIG. 5, a mirror 47, which is provided at a start position of the main scanning line, reflects the laser beam corresponding to the main scanning start position to a sensor board 48. The sensor board 48 contains photodiodes each outputting a scan-start timing signal to a control unit (not shown) in response to the reflected laser beam of the mirror 47.

Figure 6:
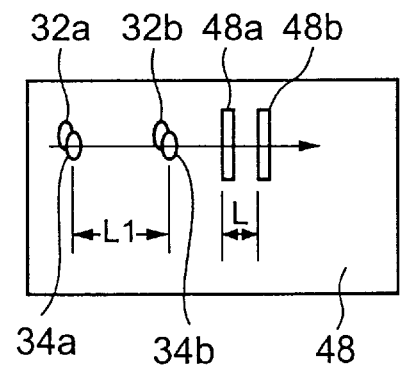
FIG. 6 is a diagram for explaining a relationship between the beam spots and the photo diodes of a scan-start timing sensor board.

FIG. 6 is a diagram for explaining a relationship between the beam spots and the photo-diodes of the scan-start timing sensor board. As shown in FIG. 6, the beam spots 32a and 32b of the laser diodes 10 and 11 (or the beam spots 34a and 34b of the laser diodes 15 and 16), incident to the sensor board 48, are at a distance L1 in the main scanning direction because of the intersecting angle of the optical axes thereof. The sensor board 48 includes the photo-diodes 48a and 48b, which are arrayed at a distance L in the main scanning direction that is smaller than the distance L1 of the beam spots. By this configuration, each of the photo-diodes 48a and 48b can accurately outputs the scan-start timing signal.

FIG. 7 is an exploded view of another preferred embodiment of the multi-beam light source device of the invention. In the present embodiment, the multi-beam light source device according to the invention is a 3-beam light source device using through laser diodes. The basic configuration of the 3-beam light source device of the present embodiment is essentially the same as that of the multi-beam light source device shown in FIG. 1.

FIG. 8A and FIG. 8B are diagrams for explaining a positional adjustment of the beam spots performed with the multi-beam light source device of FIG. 7.

Similarly, by adjusting the adjusting screws 24 relative to the base member 2 in the 3-beam light source device of FIG. 7, the deviation of the central position of the beam spots 34 from the position of the beam spot 32 on the scanned surface in the sub-scanning direction, shown in FIG. 8A, can be corrected as shown in FIG. 8B. Therefore, the respective pitches of the beam spots, formed on the scanned surface after the adjustment, will be accurate and match with the scanning lines.

In the above-described embodiment, the multi-beam light source device according to the present invention is effective in providing accurate positioning of the beam spots on the scanned surface by performing the alignment adjusting operations.

Figure 9:
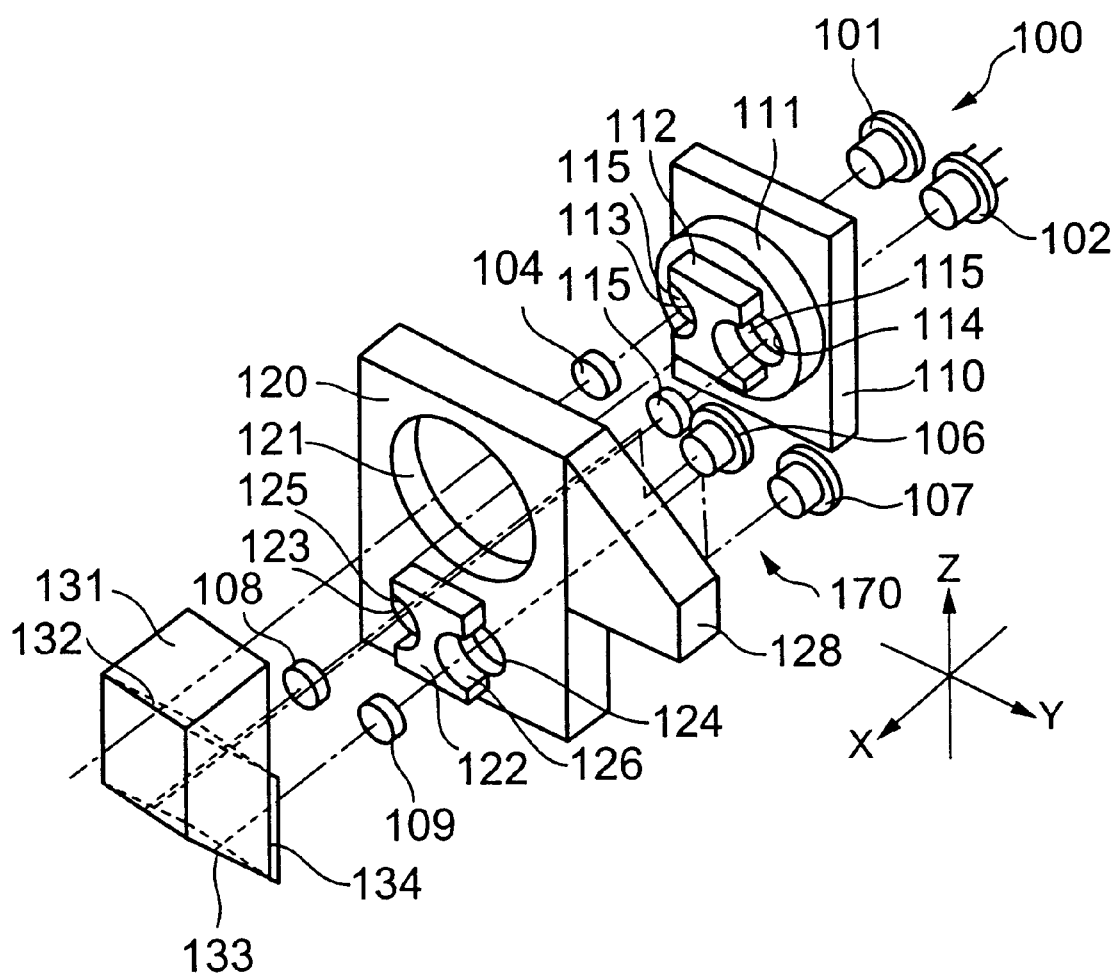
FIG. 9 is an exploded view of one preferred embodiment of the multi-beam light source device of the invention.

FIG. 9 is an exploded view of one preferred embodiment of the multi-beam light source device of the invention.

As shown in FIG. 9, the multi-beam light source device generally includes a first light source unit 100, a second light source unit 170, and a beam synthesizing prism 131. The first light source unit 100 has a supporting member 110 of aluminum die casting that has a cylinder portion 111 and a projecting portion 112 on the cylinder portion 111. The supporting member 110 integrally supports the laser diodes 101 and 102, which are fitted to the mounting holes 113 and 114 of the cylinder portion 111, and integrally supports the coupling lenses 104 and 105, which are fitted into the recesses 115 and 116 of the projecting portion 112. The supporting member 110 arrays the laser diodes in the main scanning direction.

Similarly, the second light source unit 170 includes a supporting member 120 of aluminum die casting that has a circular opening 121 and a projecting portion 122 fitted onto the circular opening 121. The supporting member 120 integrally supports the laser diodes 106 and 107, which are fitted to the mounting holes 123 and 124 of the supporting member 120, and integrally supports the coupling lenses 108 and 109, which are fitted into the recesses 125 and 126 of the projecting portion 122. The supporting member 120 arrays the laser diodes 106 and 107 in the main scanning direction.

In the present embodiment, the cylinder portion 111 of the supporting member 110 is rotatably supported on the opening 121 of the supporting member 120, and the optical axes of the laser beams of the light sources 101 and 102 accord with the emission axis of the multi-beam light source device.

Figure 10:
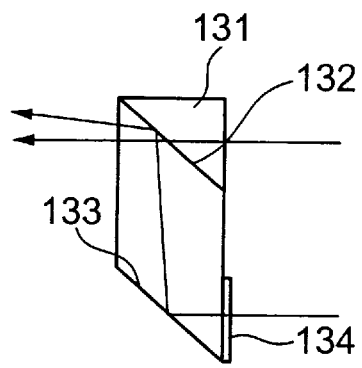
FIG. 10 is a diagram of a beam synthesizing prism in the multi-beam light source device of FIG. 9.

FIG. 10 is a diagram of the beam synthesizing prism 131 in the multi-beam light source device of FIG. 9.

As shown in FIG. 10, the beam synthesizing prism 131 includes an upper beam-split surface 132 and a lower slated surface 133. The laser beams, emitted by the laser diodes 106 and 107, are reflected by the slanted surface 133, and the reflected laser beams are further reflected by the upper beam-split surface 132 toward the emission axis, as indicated by the arrow in FIG. 10. The laser beams, emitted by the laser diodes 101 and 102, pass through the upper beam-split surface 132 toward the emission axis, as indicated by the arrow in FIG. 10. The halfwave plate 134 rotates the direction of polarization of the laser beams of the laser diodes 106 and 107 by 90 degrees before they are incident to the slated surface 133 of the prism. The beam synthesizing prism 131 converts the laser beams from the light sources into the adjacent light beams that are adjacent to each other on the scanned surface of the photosensitive medium.

In the above-described embodiment, the first light source unit 100 is rotatably supported by the second light source unit 170, and the multi-beam light source device of the present embodiment is effective in providing accurate positioning of the beam spots on the scanned surface in the sub-scanning direction by performing the alignment adjusting operations.

Figure 11A:
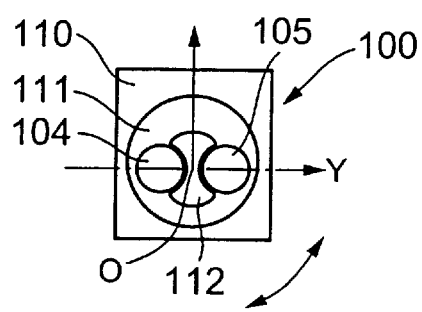
FIG. 11A and FIG. 11B are diagrams for explaining a positional adjustment of the beam spots performed with the multi-beam light source of the invention.
Figure 11B:
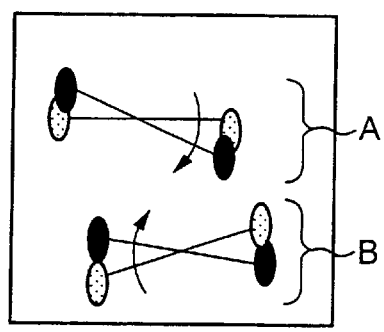

FIG. 11A and FIG. 11B are diagrams for explaining a positional adjustment of the beam spots performed with the multi-beam light source of the invention.

As indicated by the arrow in FIG. 11A, by adjusting the relative position of the first light source unit 100 to the second light source unit 170 around the emission axis "O" of the multi-beam light source device, the rotational deviation of the beam spots of the laser beams of the first light source unit 100 from the beam spots of the laser beams of the second light source unit 170 on the scanned surface can be corrected so that the respective pitches of the beam spots, formed on the scanned surface after the adjustment, will be accurate and match with the scanning lines as indicated by "A" or "B" in FIG. 11B.

Figure 12A:
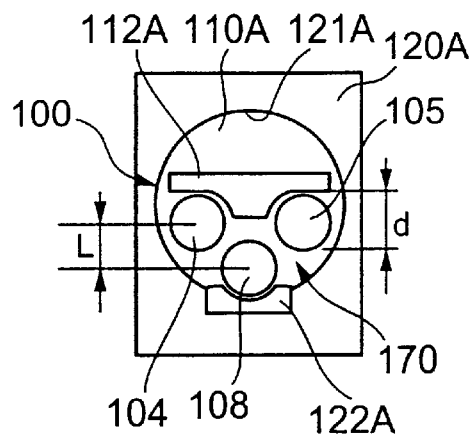
FIG. 12A and FIG. 12B are diagrams for explaining a variation of the multi-beam light source device of FIG. 9.
Figure 12B:
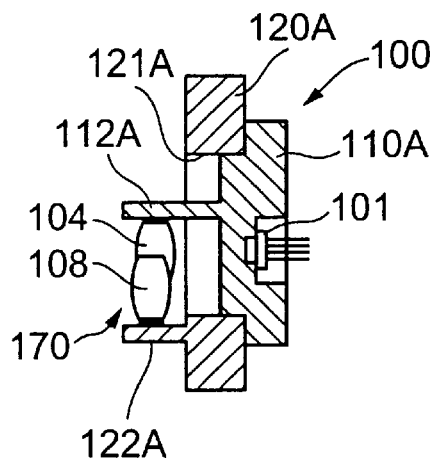

FIG. 12A and FIG. 12B are diagrams for explaining a variation of the multi-beam light source device of FIG. 9. In the present embodiment, the multi-beam light source device is a 3-beam light source device using three laser diodes.

In the present embodiment, each of the coupling lenses 104, 105 and 108 has an outside diameter "d", the coupling lenses 104, 105 and the coupling lens 108 are arranged to have a distance L between them, and the first light source unit 110A is held by the base member 120A so as to satisfy the condition that the outside diameter d is larger than the distance L (d<L).

Figure 13A:
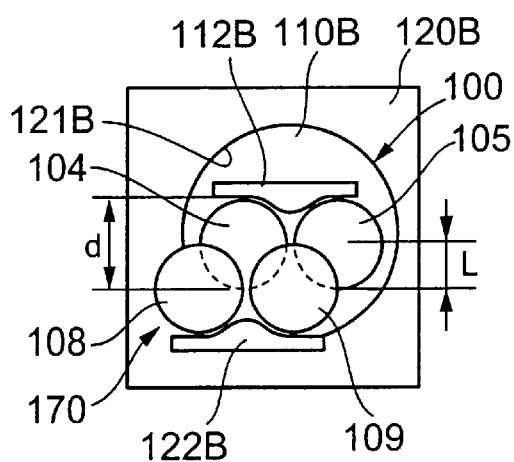
FIG. 13A and FIG. 13B are diagrams for explaining a variation of the multi-beam light source device of FIG. 9.
Figure 13B:
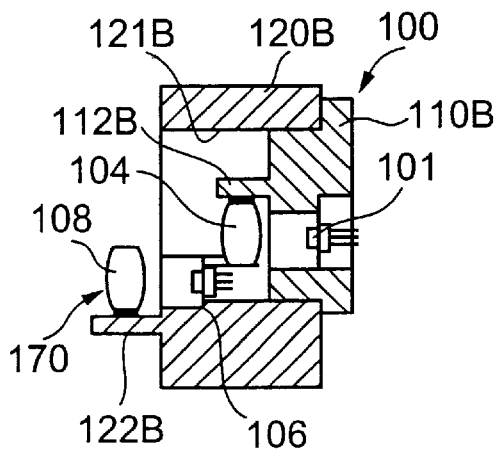

FIG. 13A and FIG. 13B are diagrams for explaining a variation of the multi-beam light source device of FIG. 9. In the present embodiment, the multi-beam light source device is a 4-beam light source device using four laser diodes. The basic configuration of the 4-beam light source device is essentially the same as that of the embodiment of FIG. 12A and FIG. 12B.

The multi-beam light source device of the above-described embodiment is effective in providing accurate positioning of the beam spots on the scanned surface in the sub-scanning direction by performing the alignment adjusting operations.

Figure 14A:
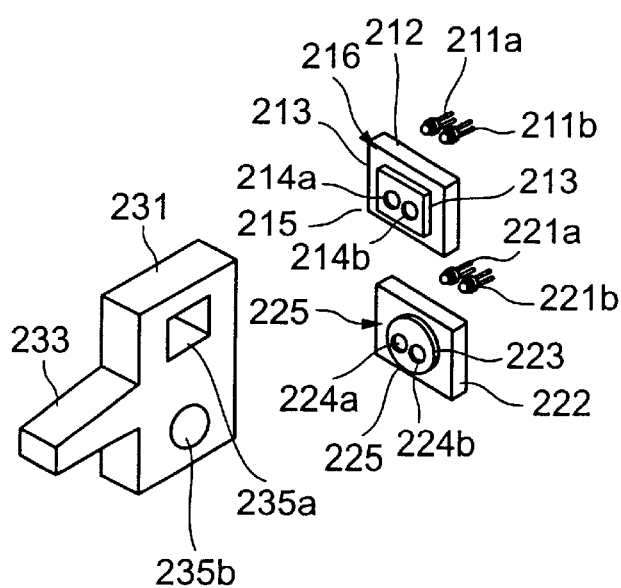
FIG. 14A and FIG. 14B are diagrams of one preferred embodiment of the multi-beam light source unit of the invention.
Figure 14B:
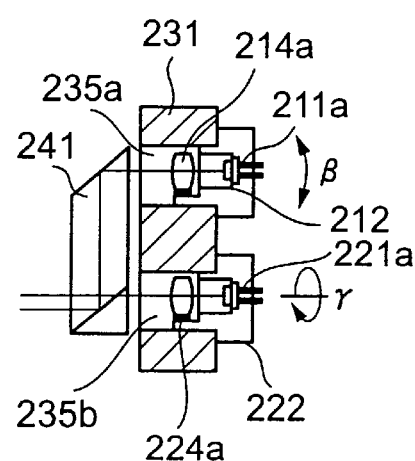

FIG. 14A and FIG. 14B are diagrams of one preferred embodiment of the multi-beam light source unit of the invention.

As shown in FIG. 14A and FIG. 14B, the multi-beam light source device of this embodiment includes a first laser-diode (LD) base 212, a second laser-diode (LD) base 222, a flange member 231, and a beam synthesizing prism 241. The LD base 212 supports two laser diodes 211a and 211b thereon, and is provided as a first supporting member. The LD base 222 supports two laser diodes 221a and 221b thereon, and is provided as a second supporting member. The flange member 231 is provided as a third supporting member that supports both the LD base 212 and the LD base 222 as shown in FIG. 14B.

The LD base 212 includes a mounting portion 215, and coupling lenses 214a and 214b are mounted on the mounting portion 215. The LD base 222 includes a mounting portion 225, and coupling lenses 224a and 224b are mounted on the mounting portion 225 by applying a UV curing adhesive agent. A rectangular portion 216 projects from the LD base 212, and the mounting portion 215 is provided on the rectangular portion 216. On the other hand, a cylinder portion 226 projects from the LD base 222, and the mounting portion 225 is provided on the cylinder portion 226. The cylinder portion 226 has the outside periphery that is provided as a positioning area 223.

The flange member 231 includes a rectangular opening 235a to which the rectangular portion 216 of the LD base 212 is inserted, and includes a circular opening 235b to which the cylinder portion 226 of the LD base 222. The flange member 231 further includes a projection 233. The LD base 222 is rotatably supported on the flange member 231.

As shown in FIG. 14B, in the above-described embodiment, the optical-axis adjustment of the laser beams from the light sources of the LD base 222 can be performed by rotating the LD base 222 relative to the flange member 231 in the direction indicated by the arrow "γ" in FIG. 14B. Further, the beam-pitch adjustment of the laser beams from the light sources of the LD base 212 can be performed by rotating the LD base 212 relative to the flange member 231 in the direction indicated by the arrow "β" in FIG. 14B.

Figure 15:
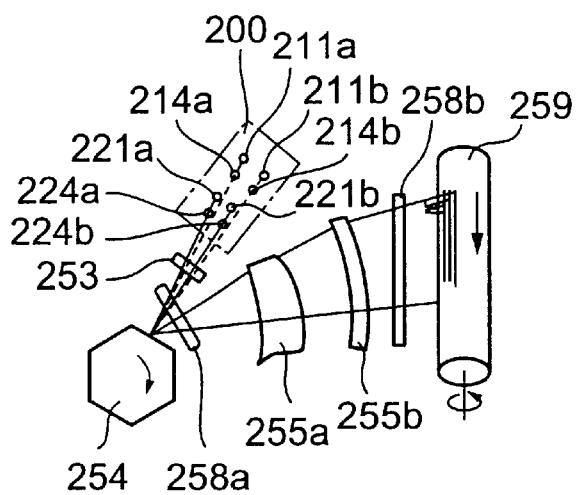
FIG. 15 is a diagram of a multi-beam scanning apparatus in which the multi-beam light source unit of the present embodiment is provided.
Figure 16:
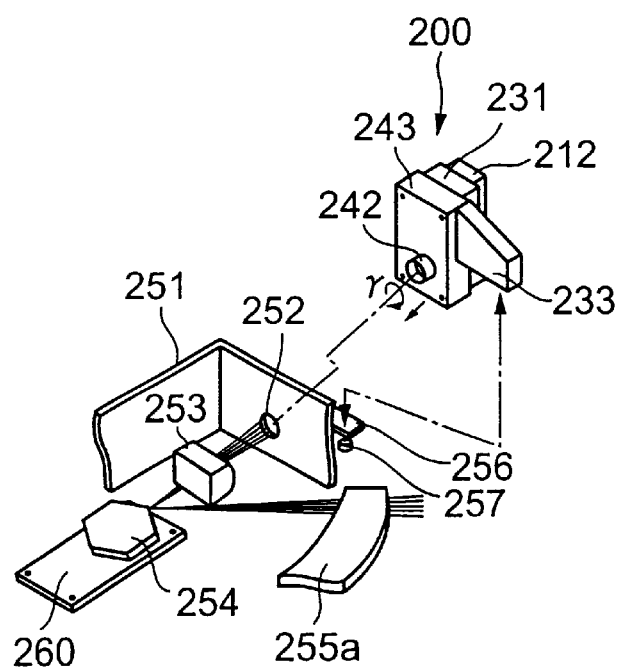
FIG. 16 is a perspective view of the multi-beam scanning apparatus of the present embodiment.

FIG. 15 is a diagram of a multi-beam scanning apparatus in which the multi-beam light source unit of the present embodiment is provided. FIG. 16 is a perspective view of the multi-beam scanning apparatus of the present embodiment.

As shown in FIG. 15 and FIG. 16, in the multi-beam scanning apparatus, the laser diodes 211a, 211b, 221a, 221b, and the coupling lenses 214a, 214b, 224a, 224b are provided as the elements of the multi-beam light source device 200 of the present embodiment. In the multi-beam scanning apparatus, the cylindrical lens 253, the polygonal mirror 254, the focusing optical lenses 255a, 255b, the dust-proof glass 258a, the dust-proof glass 258b, the polygon scanner 260, and the photosensitive medium 259 are provided in addition to the multi-beam light source device.

Further, in the present embodiment, the holder 243 is attached to the flange member 231, and the holder 243 includes the positioning portion 242. The housing 251 includes the opening 252 through which the laser beams of the multi-beam light source device 200 pass. The adjusting screw 257 is attached to the housing 251 through the connecting portion 256. As shown in FIG. 16, the rotation of the adjusting screw 257 is transferred to the projection 233 of the flange member 231.

Therefore, in the present embodiment, the optical-axis adjustment of the laser beams from the light sources of the LD base 222 can be performed by rotating the LD base 222 relative to the flange member 231 (in the direction indicated by the arrow "γ" in FIG. 16) by means of the adjusting screw 257.

The laser beams of the multi-beam light source device are directed to the reflection surface of the polygonal mirror 254 through the cylindrical 253. The laser beams reflected by the polygonal mirror 254 are passed through the focusing optical lenses 255a and 255b. The focusing optical lenses 255a and 255b convert the laser beams from the polygonal mirror 254 into converging laser beams in the main scanning direction. The laser beams from the focusing optical lenses 255a and 255b are reflected onto the scanned surface of the photosensitive medium 259. Hence, the beam spots are formed on the scanned surface of the photosensitive medium 259 by the laser beams of the multi-beam light source device 200.

FIG. 17 shows the specifications and layout of the optical elements of the multi-beam scanning apparatus of the present embodiment. As shown in FIG. 17, "NOTE1" indicates that, for the purpose of aberration correction, the non-spherical coefficients are applied to determine the configuration of the first and second surfaces of the coupling lenses, "NOTE2" indicates that, for the purpose of correction of focusing and scanning performance, the non-spherical coefficients are applied to determine the configuration of the first and second surfaces of the focusing lenses, and "NOTE3" indicates that, for the purpose of dust isolation and noise reduction, the dust-proof glass is used.

Figure 18A:
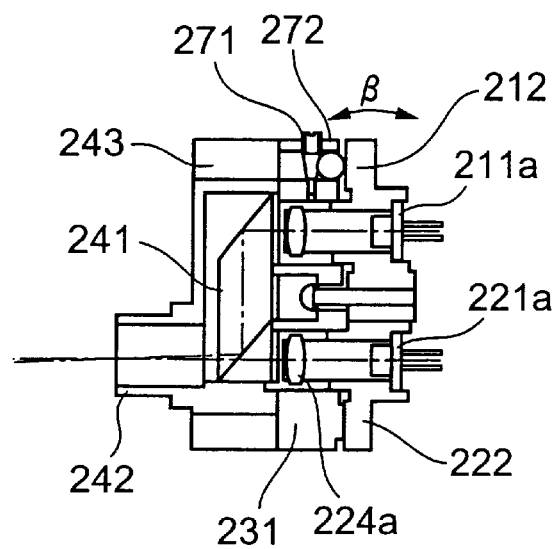
FIG. 18A and FIG. 18B are diagrams for explaining operations of the multi-beam scanning apparatus of the present embodiment.
Figure 18B:
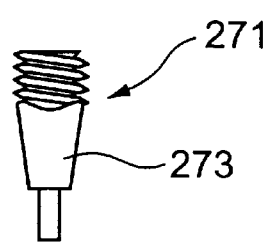

FIG. 18A and FIG. 18B are diagrams for explaining operations of the multi-beam scanning apparatus of the present embodiment.

As shown in FIG. 18A, the ball 272 is provided on the top of the flange member 231. The ball 272 contacts the LD base 212 to make the gradient of the LD base 212 relative to the flange member 231 variable. The adjusting screw 271 is attached to the flange member 231 to have a conical surface in contact with the ball 271. As shown in FIG. 18B, the adjusting screw 271 includes the conical surface that is in contact with the ball 272. When the adjusting screw 271 is rotated so that the screw is moved in the vertical direction perpendicular to the emission axis, the gradient of the LD base 212 relative to the flange member 231 is varied, so that the pitch of beam spots, formed on the scanned surface, is varied in the sub-scanning direction in accordance with the adjusting screw movement.

Therefore, in the present embodiment, the beam-pitch adjustment of the laser beams from the light sources of the LD base 212 can be performed by rotating the LD base 212 relative to the flange member 231 (in the direction indicated by the arrow "β" in FIG. 18B) by means of the adjusting screw 271 and the ball 272.

Figure 19A:
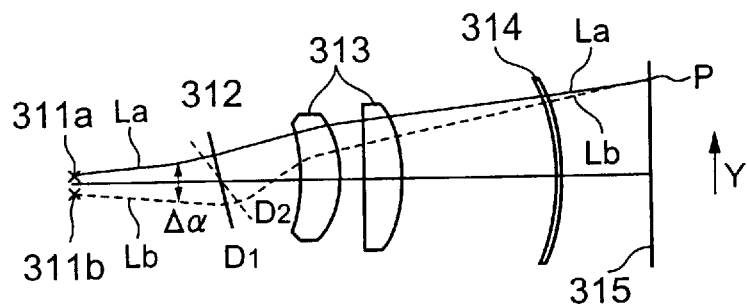
FIG. 19A and FIG. 19B are diagrams showing the basic configuration of one preferred embodiment of the multi-beam scanning apparatus of the invention.
Figure 19B:
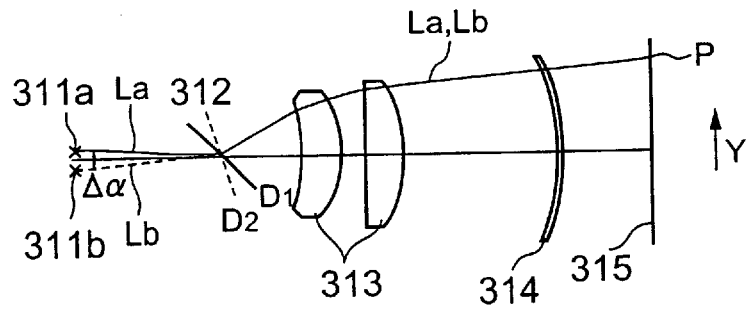

FIG. 19A and FIG. 19B are diagrams showing the basic configuration of one preferred embodiment of the multi-beam scanning apparatus of the invention.

As shown in FIG. 19A, in the multi-beam scanning apparatus of the present embodiment, the laser beams La, Lb from the laser diodes 311a, 311b are reflected by the surface of the polygonal mirror 312, and the optical paths of the laser beams are changed by the surface of the polygonal mirror 312. The laser beams La, Lb from the polygonal mirror 312 are focused by the lenses 313, 314 onto the scanned surface 315 of the photosensitive medium. D1 indicates the direction of the reflection surface of the polygonal mirror 312 when the spot on the scanned surface by the laser beam La of the laser diode 311a reaches a given image height. D2 indicates the direction of the reflection surface of the polygonal mirror 312 when the spot on the scanned surface by the laser beam Lb of the laser diode 311b reaches a given image height.

FIG. 19B shows the actual configuration of the multi-beam scanning apparatus of the present embodiment. As shown in FIG. 19B, in the present embodiment, the optical axes of the laser beams La and Lb of the laser diodes 311a and 311b intersect each other on the reflection surface of the polygonal mirror 312 and they are at an intersecting angle "Δα" within a horizontal plane including the emission axis.

Figure 20:
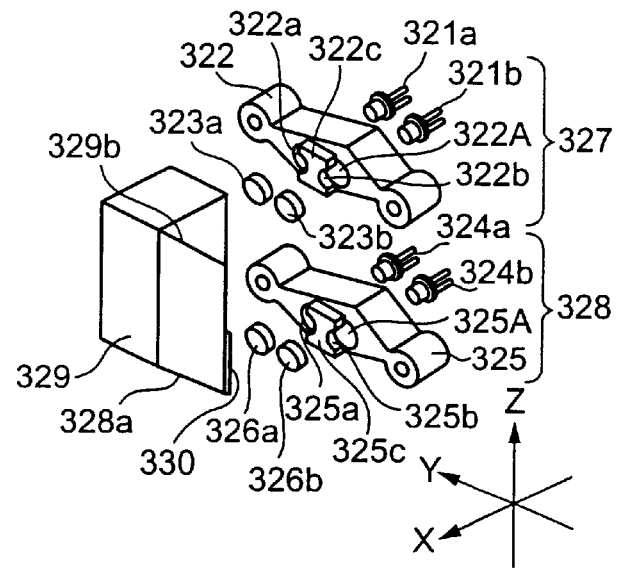
FIG. 20 is an exploded view of a multi-beam light source device in the multi-beam scanning apparatus of the present embodiment.

FIG. 20 is an exploded view of a multi-beam light source device in the multi-beam scanning apparatus of the present embodiment.

As shown in FIG. 20, a first light source unit 327 includes a first supporting member 322. The first supporting member 322 integrally supports first light sources (laser diodes) 321a, 321b and first coupling lenses 323a, 323b to array the light sources 321a, 321b in the main scanning direction (Y). The coupling lenses 323a, 323b couple the laser beams emitted by the light sources 321a and 321b.

Similarly, a second light source unit 328 includes a second supporting member 325. The second supporting member 325 integrally supports second light sources (laser diodes) 324a, 324b and second coupling lenses 326a, 326b to array the light sources 324a, 324b in the main scanning direction (Y). The coupling lenses 326a, 326b couple the laser beams emitted by the light sources 324a and 324b.

In the present embodiment, a halfwave plate 330 changes the optical path direction of the light beams of the second light source unit 328 within a horizontal plane including the main scanning direction.

In the present embodiment, a beam synthesizing prism 329 includes an upper beam-split surface 329b and a lower slated surface 329a. The laser beams, emitted by the laser diodes 324a, 324b, are reflected by the lower slanted surface 329a, and the reflected laser beams are further reflected by the upper beam-split surface 329b toward the emission axis, as indicated by the dotted lines Lb, Lb' in FIG. 21B. The laser beams, emitted by the laser diodes 321a, 321b, pass through the upper beam-split surface 329b toward the emission axis, as indicated by the solid line La, La' in FIG. 21B. The halfwave plate 330 rotates the direction of polarization of the laser beams from the laser diodes 324a, 324b by 90 degrees before they are incident to the slated surface 329a of the prism. The beam synthesizing prism 329 converts the laser beams from the light sources 321a, 321b, 324a, 324b into the adjacent light beams that are adjacent to each other on the scanned surface of the photosensitive medium.

In the present embodiment, the halfwave plate 330 forms the optical path changing unit that changes an optical path direction of the light beams of the second light source unit 328 within a horizontal plane including the main scanning direction (Y).

Figure 21A:
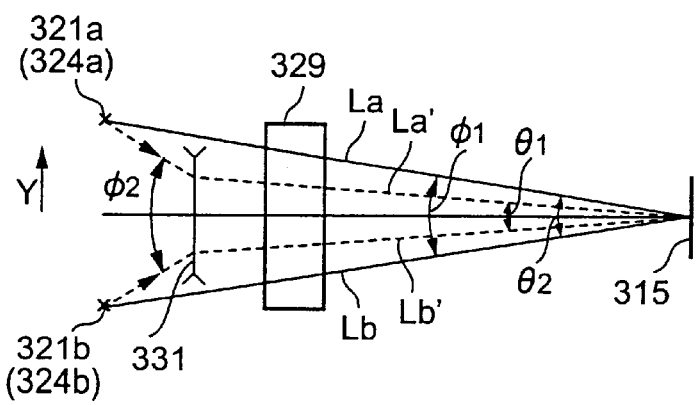
FIG. 21A and FIG. 21B are diagrams for explaining a configuration of the multi-beam scanning apparatus of the present embodiment.
Figure 21B:
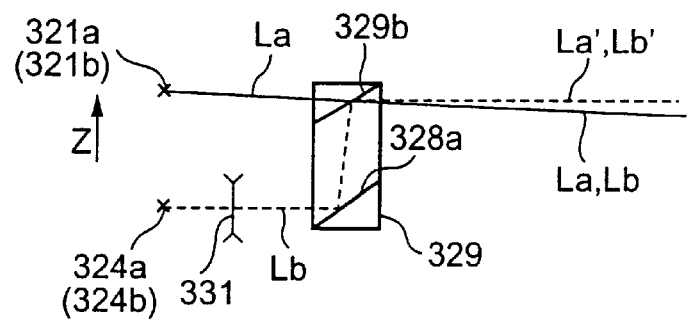

FIG. 21A and FIG. 21B are diagrams for explaining a configuration of the multi-beam scanning apparatus of the present embodiment.

In the present embodiment, the negative lens 331 forms the optical path changing unit. Other configurations of the multi-beam scanning apparatus of the present embodiment are the same as those of the embodiment of FIG. 20.

Alternatively, a position lens may be used as the optical path changing unit. In either case, the optical path changing unit changes an optical path direction of the light beams of the second light source unit 325 within a plane including the main scanning direction (Y).

Figure 22A:
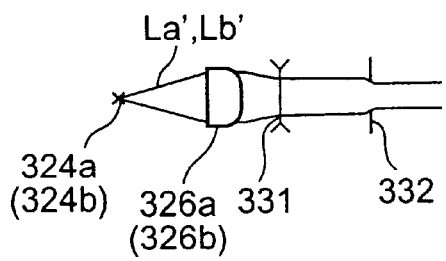
FIG. 22A and FIG. 22B are diagrams for explaining operations of two light source units of the multi-beam scanning apparatus of the present embodiment.
Figure 22B:
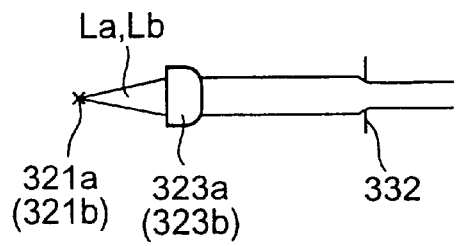

FIG. 22A and FIG. 22B are diagrams for explaining operations of two light source units of the multi-beam scanning apparatus of the present embodiment.

Figure 23A:
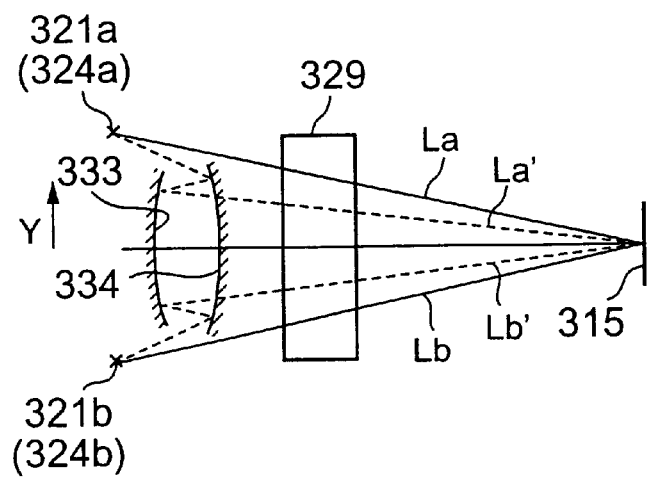
FIG. 23A and FIG. 23B are diagrams for explaining another configuration of the multi-beam scanning apparatus of the present embodiment.
Figure 23B:
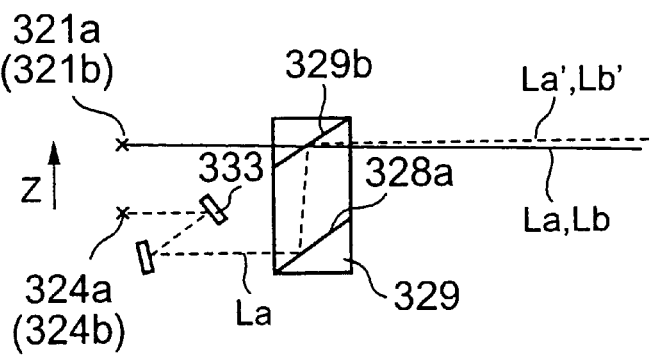

FIG. 23A and FIG. 23B are diagrams for explaining another configuration of the multi-beam scanning apparatus of the present embodiment. In the present embodiment, a spherical mirror 333 and a spherical mirror 334, which confront each other, are disposed between the coupling lenses (not shown) and the beam synthesizing prism 329. FIG. 23A is a cross-sectional view of the multi-beam scanning apparatus in the main scanning direction (Y). FIG. 23B is a cross-sectional view of the multi-beam scanning apparatus in the sub-scanning direction (Z).

In the above-described embodiment, the multi-beam scanning apparatus according to the invention is effective in providing stable image reproduction performance even when the multi-beam light source device uses general-purpose light sources.

Figure 24:
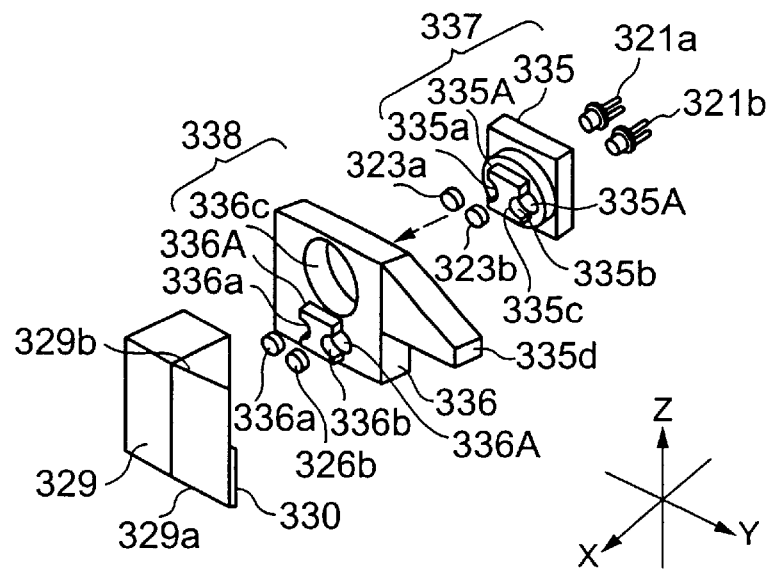
FIG. 24 is an exploded view of another configuration of the multi-beam scanning apparatus of the present embodiment.

FIG. 24 is an exploded view of another configuration of the multi-beam scanning apparatus of the present embodiment. In FIG. 24, the elements that are essentially the same as corresponding elements in FIG. 20 are designated by the same reference numerals, and a description thereof will be omitted.

As shown in FIG. 24, in the present embodiment, the second supporting member 338 supports the first supporting member 337 such that the light beams of the second light source unit 336 are disposed apart from the light beams of the first light source unit 335 in the sub-scanning direction "Z".

Figure 25:
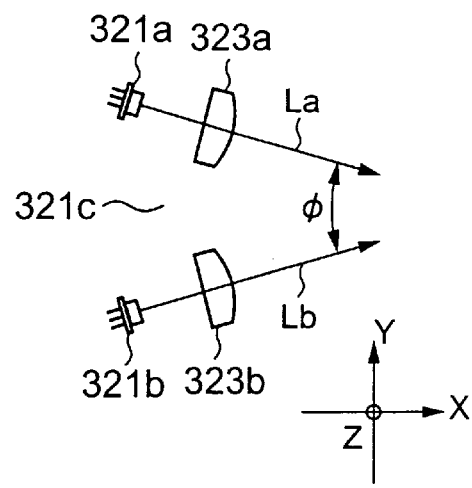
FIG. 25 is a diagram for explaining another configuration of the multi-beam scanning apparatus of the present embodiment.

FIG. 25 is a diagram for explaining another configuration of the multi-beam scanning apparatus of the present embodiment.

As shown in FIG. 25, the optical axis La of the laser beams of the laser diode 321a and the optical axis of the laser beams of the laser diode 321b are at an intersecting angle "φ" within a horizontal plane including the emission axis. The optical axis of the coupling lens 323a accords with the optical axis La of the laser diode. The optical axis of the coupling lens 323b accords with the optical axis Lb of the laser diode.

In the present embodiment, the first coupling lenses and the second coupling lenses are arrayed such that the optical axes of the first coupling lenses and the optical axes of the second coupling lenses are at an intersecting angle within a plane including the main scanning direction (Y).

Figure 26:
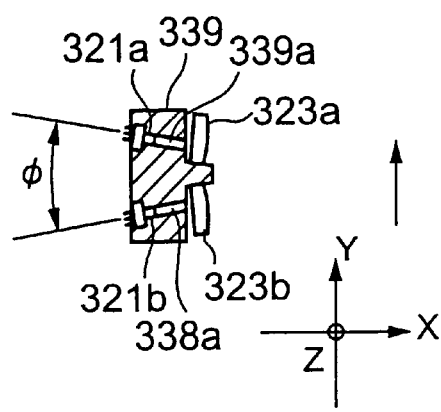
FIG. 26 is a cross-sectional view of a supporting member in the multi-beam scanning apparatus of the present embodiment.

FIG. 26 is a cross-sectional view of the supporting member 339 in the main scanning direction. The supporting member 339 includes the mounting portions 321a and 321b. The laser diodes 321a and 321b are fitted to the mounting portions of the supporting member 339 and the coupling lenses 323a and 323b are attached to the supporting member 339.

As shown in FIG. 26, the optical axes of the laser beams of the laser diodes 321a and 321b are at an intersecting angle "φ" within a horizontal plane including the emission axis.

Figure 27A:
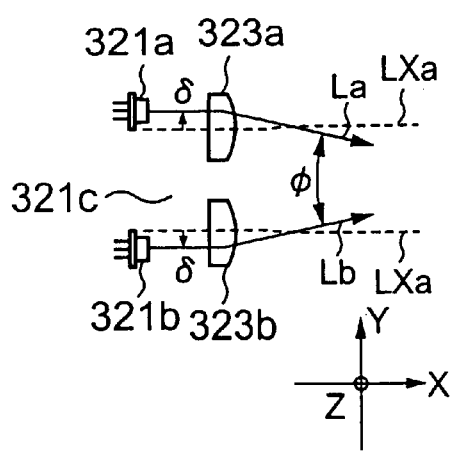
FIG. 27A and FIG. 27B are diagrams for explaining another configuration of the multi-beam scanning apparatus of the present embodiment.
Figure 27B:
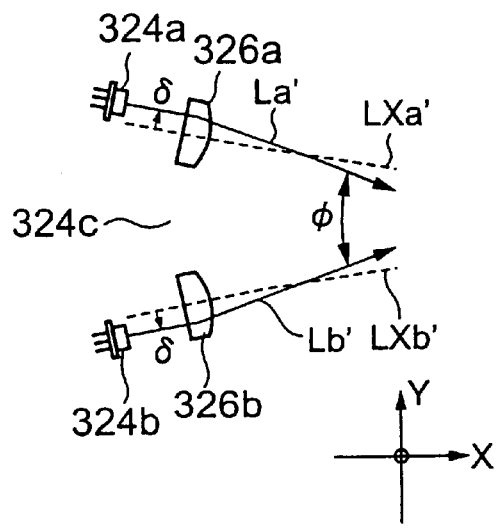

FIG. 27A and FIG. 27B are diagrams for explaining another configuration of the multi-beam scanning apparatus of the present embodiment. In the present embodiment, the optical axis of the laser diode 321a, 321b (or 324a, 324b) is shifted from the optical axis of the coupling lens 323a, 323b (or 326a, 326) by a shifting amount "δ", and the optical axes of the laser beams of the laser diodes 321a and 321b (or 324a, 324b) are at an intersecting angle "φ" within a horizontal plane including the emission axis.

FIG. 27A shows the case in which the optical axes Lxa, Lxb of the laser beams of the laser diodes 321a and 321b are parallel. FIG. 27B shows the case in which the optical axes Lxa', Lxb' of the laser beams of the laser diodes 324a and 324b are slanted to each other.

In the present embodiment, the first supporting member 322 and the second supporting member 325 have an identical configuration, the first light sources 321a, 321b are disposed apart from the optical axes of the first coupling lenses 323a, 323b in the main scanning direction (Y) and the second light sources 324a, 324b are disposed apart from the optical axes of the second coupling lenses 326a, 326b in the main scanning direction (Y).

Figure 28:
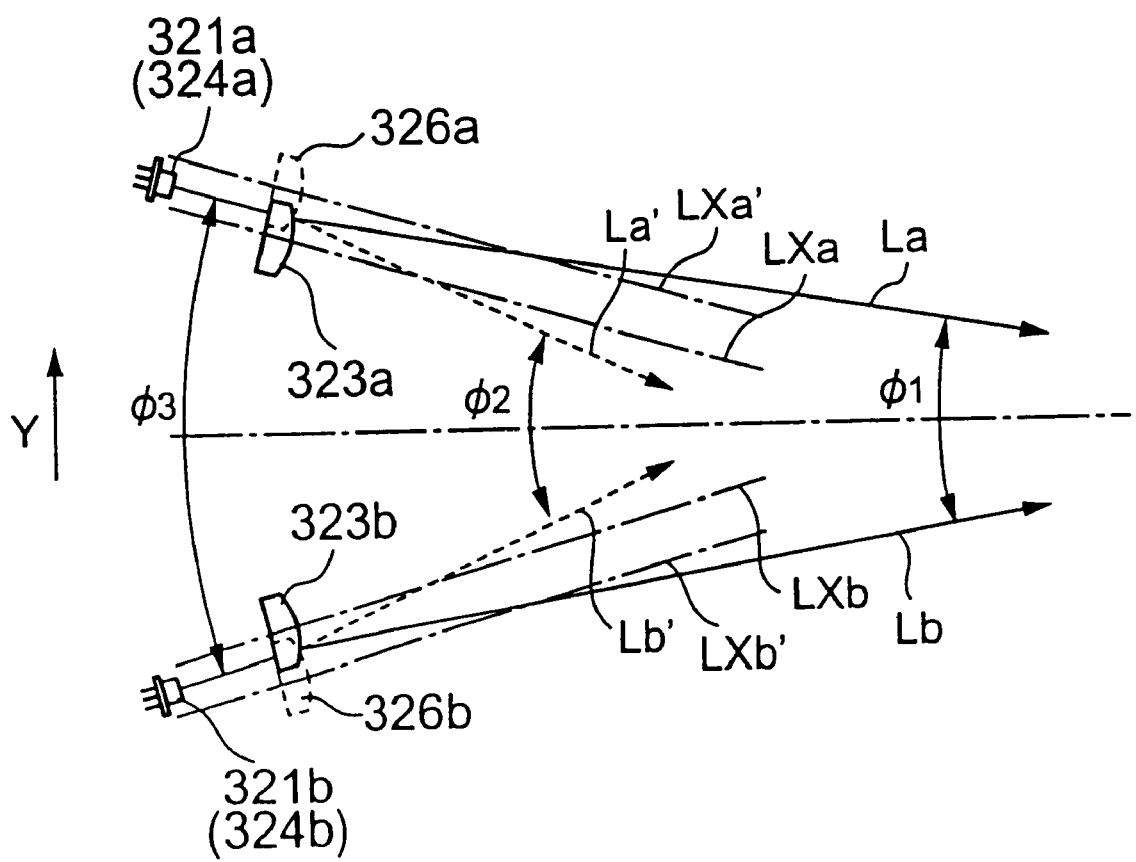
FIG. 28 is a diagram for explaining operations of respective light source units in the multi-beam scanning apparatus of FIG. 27.

FIG. 28 is a diagram for explaining operations of respective light source units in the multi-beam scanning apparatus of the present embodiment. FIG. 28 shows the arrangement of the optical axes of the laser beams when the laser diodes 321a, 321b, 324a, 324b and the coupling lenses 323a, 323b, 326a, 326b are combined in the multi-beam scanning apparatus of FIG. 27A and FIG. 27B.

In the above-described embodiment, the multi-beam scanning apparatus according to the invention is effective in providing stable image reproduction performance even when the multi-beam light source device uses general-purpose light sources.

Figures 29A, 29B:
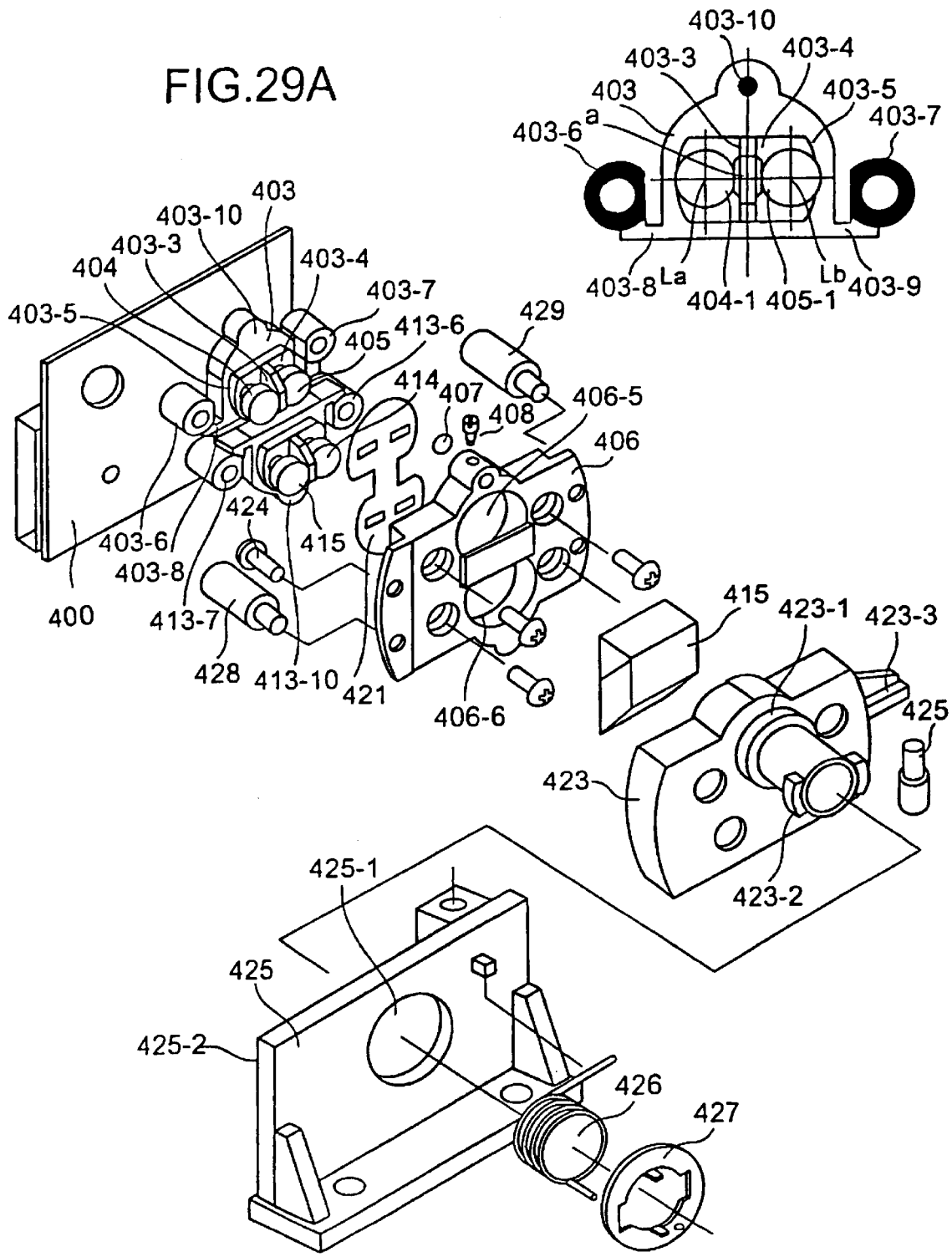
FIG. 29A and FIG. 29B are views of one preferred embodiment of the multi-beam light source device of the invention.
Figure 30:
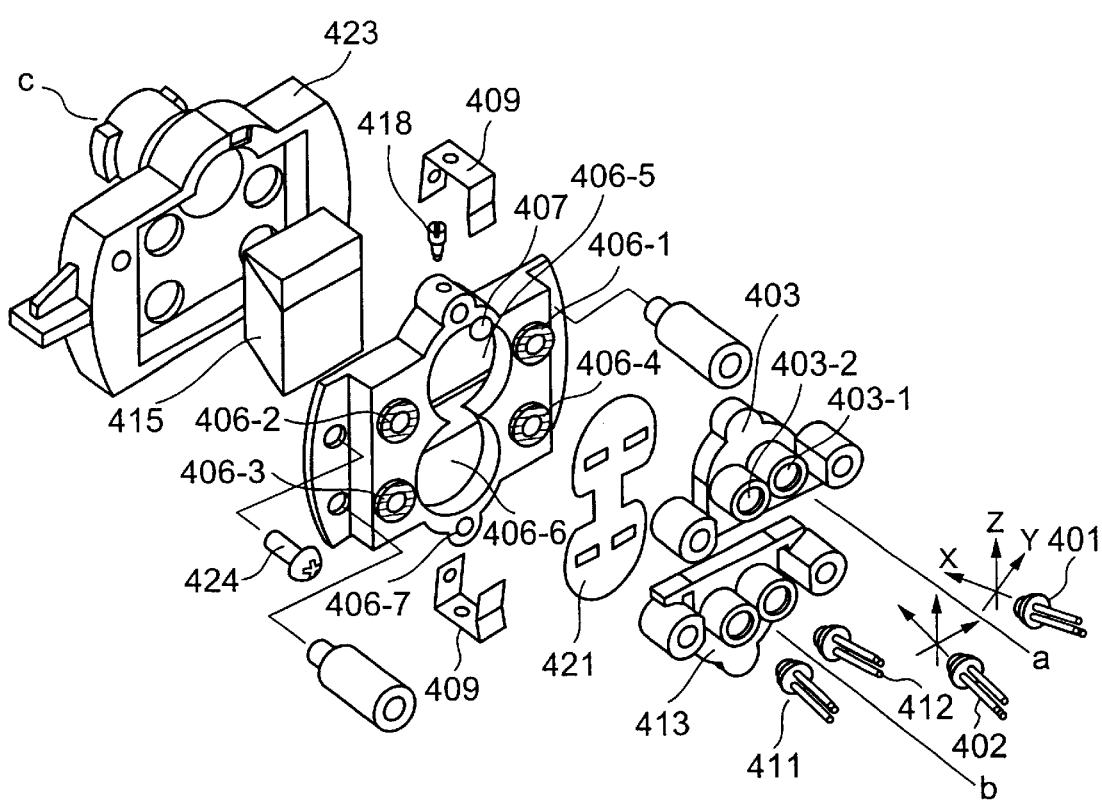
FIG. 30 is an exploded view of the opposite side of the multi-beam light source device of FIG. 29A.

FIG. 29A and FIG. 29B are views of one preferred embodiment of the multi-beam light source device of the invention from the side of the scanned surface. FIG. 30 is an exploded view of the opposite side of the multi-beam light source device of FIG. 29A. In the present embodiment, the multi-beam light source device is a 4-beam light source device using four general-purpose laser diodes.

As shown in FIG. 29A through FIG. 30, in the multi-beam light source device of the present embodiment, the laser diodes 401 and 402 are held on the holder member 403 of aluminum die casting. The holder member 403 has mounting holes 403-1 and 403-2 on the rear surface, the mounting holes being arrayed at a distance of about 8 mm in the main scanning direction. The laser diodes 401 and 402 are press-fitted into the mounting holes so that the light sources are held by the holder member 403.

The coupling lenses 404 and 405 are positioned to the holder member 403 for each of X direction (the emission axial direction), Y direction (the main scanning direction) and Z direction (the sub-scanning direction) of the laser diodes. The cut surfaces 404-1 and 405-1 of the coupling lenses are fitted to the adhesive surfaces 403- and 403-4 of the holder member, and a UV curing adhesive agent is applied between the coupling lens and the adhesive surface. Hence, the coupling lenses are held by the holder member 403 and the optical axes of the coupling lenses accord with the emission axes of the laser diodes. In the present embodiment, the emission axes of the laser diodes 401 and 402 are symmetrical about the emission axis "a" of the holder member 403 and at an intersecting angle of about 3 degrees within a horizontal plane including the emission axis "a" as shown in FIG. 30.

The holder member 403 includes the cylinder portion 403-5, and this cylinder portion is positioned so that its axial direction accords with the emission axis "a". The holder member 403 includes the fastening portions 403-6 and 403-7, and each of fastening portions is provided with a threaded hole. The base member 406 includes the mounting portions 406-1 and 406-2. The fastening portions 403-6 and 403-7 are fitted to the mounting portions 406-1 and 406-2 by fastening screws thereto.

Further, on the holder member 403, torsion bars 403-8 and 403-9 are integrally provided in order for connecting the holder member 403 to the fastening portions 403-6 and 403-7 by bringing the fastening portions into contact with the mounting portions of the base member 406 by a torsional force of each torsion bar. The torsion bars 403-8 and 403-9 are arranged so that the axial directions of the torsion bars are perpendicular to the emission axis "a". The torsion bars 403-8 and 403-9 and the fastening portions 403-6 and 403-7 are configured such that the axial directions of the torsion bars are variable within a horizontal plane perpendicular to the emission axis "a".

Similarly, the holder member 413 holds the laser diodes 411 and 412 and the coupling lenses 414 and 415 in the same manner as the holder member 403. In the present embodiment, the emission axes of the laser diodes 411 and 412 are symmetrical about the emission axis "b" of the holder member 413 as shown in FIG. 30.

The base member 406 is made of aluminum die casting. The base member 406 includes the through holes 406-5 and 406-6. The cylinder portions 403-5 and 413-5 of the holder members are fitted into the through holes of the base member. The fastening portions 403-6, 403-7, 413-6 and 413-7 of the holder members are brought into contact with the mounting portions 406-1, 406-2, 406-3 and 406-4 of the base member by fastening the screws thereto. After the fastening of the screws is performed, the fastening portions of the holder members are pressed onto the mounting portions of the base member by the torsion force of each torsion bar.

In the present embodiment, the ball 407 is provided on the upper contact surface 403-10 of the holder member 403, and the semi-spherical contact 406-7 is integrally provided at the lower portion of the base member 406. The ball 407 contacts the base member 406 to make the gradient of the holder member 403 relative to the emission axis variable. The adjusting screw 408 is attached to the base member 406 to have a conical surface in contact with the ball 407. The semi-spherical contact 406-7 contacts the holder member 413. When the adjusting screw 408 is rotated so that the screw is moved in the vertical direction perpendicular to the emission axis, the gradient of the holder member 403 relative to the emission axis of the holder member 413 is varied, so that the pitch of beam spots, formed on the scanned surface, is varied in the sub-scanning direction in accordance with the adjusting screw movement.

The leaf spring 409 is provided to hold the light source holders 403 and 413 and the base member 406 by bringing the spring 409 into contact with the contact surfaces 403-10 and 413-10. The aperture plate 421 is provided on the rear surface of the base member 406, and the beam synthesizing prism 415 is provided on the front surface of the base member 406.

The holding member 423, which is of resin molding, is attached to the base member 406. The base member 406 is secured to the holding member 423 by fastening screws, and the holding member 423 is fixed to the housing (not shown) of an optical scanning apparatus such that the central axis of the cylinder portion 423-1 accords with the optical axis of the optical scanning apparatus. In the present embodiment, the holding member 423 is fixed to the housing through the bracket 425. The cylinder portion 423-1 of the holding member is inserted into the mounting hole 425-1 of the bracket, and the stopper 427 is fitted to the projections 423-2 of the holding member. The spring 426 under the compressed state is interposed between the bracket 425 and the stopper 427, and the holding member 423 is pressed onto the mounting surface 425-2 of the bracket that is perpendicular to the optical axis of the optical scanning apparatus. The multi-beam light source device of the present embodiment is thus constructed.

The circuit board 400 includes a laser-diode drive circuit that controls the laser diodes 401, 402, 411 and 412. The circuit board 400 is secured to the support members 428 and 429 by fastening the screws thereto. The support members 428 and 429 are press-fitted into the holes of the base member. The lead lines from the laser diodes are passed through the circuit board 400, and connections between the laser-diode drive circuit and the lead lines are established by soldering.

In the above-described embodiment, the multi-beam light source device according to the invention is effective in easily providing accurate positioning of the optical paths of the light beams from the light sources by performing the alignment adjusting operations.

Figure 31:
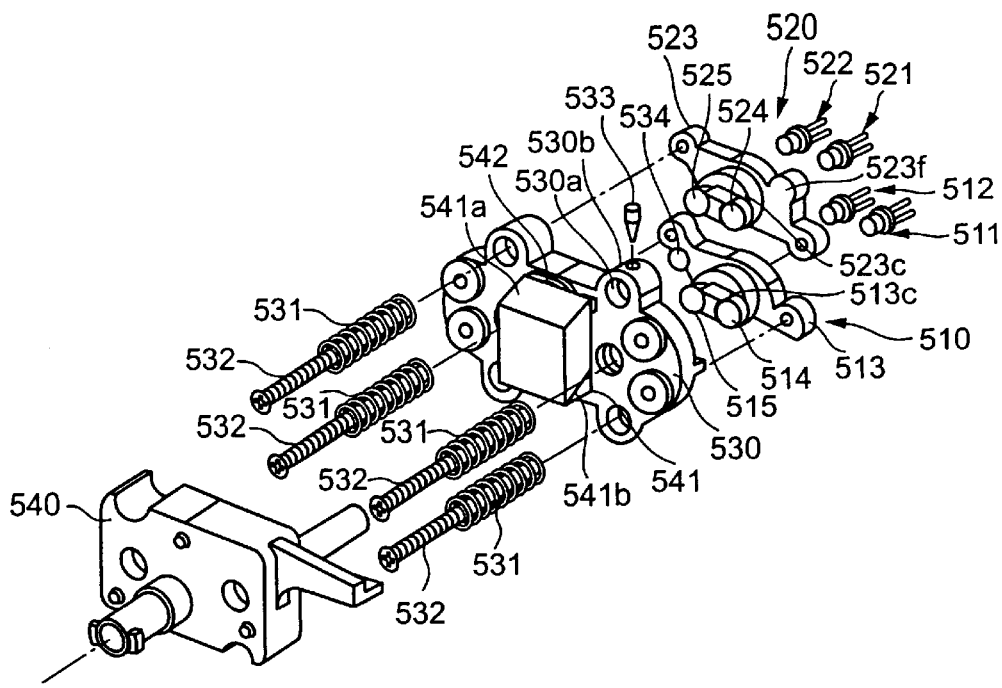
FIG. 31 is an exploded view of one preferred embodiment of the multi-beam light source device of the invention.
Figure 32:
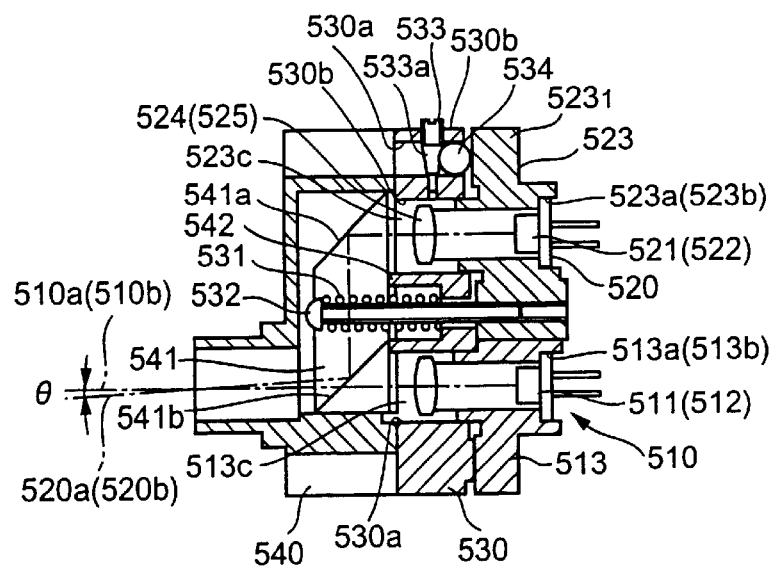
FIG. 32 is a cross-sectional view of the multi-beam light source device of the present embodiment.
Figure 33:
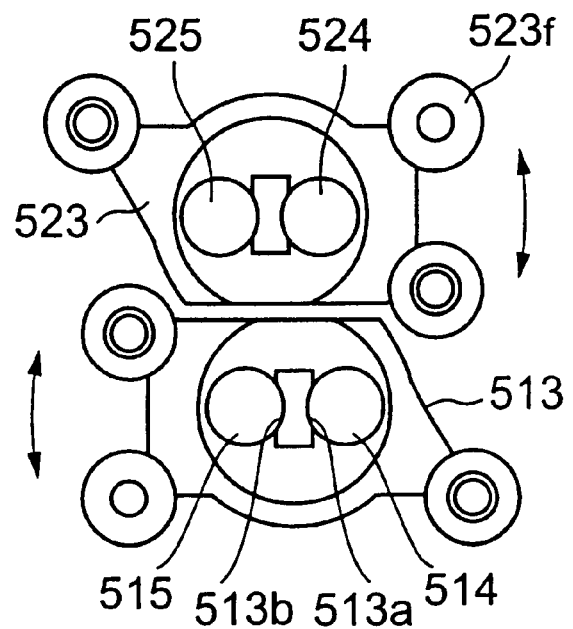
FIG. 33 is a diagram for explaining respective light source units in the multi-beam light source device of the present embodiment.

FIG. 31 is an exploded view of one preferred embodiment of the multi-beam light source device of the invention. FIG. 32 is a cross-sectional view of the multi-beam light source device of the present embodiment. FIG. 33 is a diagram for explaining respective light source units in the multi-beam light source device of the present embodiment.

In FIG. 32, the elements that are not actually on the same plane are also included in the cross sectional view, for the sake of convenience of illustration.

In the present embodiment, the multi-beam light source device is a 4-beam light source device using four general-purpose laser diodes.

As shown in FIG. 31 and FIG. 32, in the multi-beam light source device 500 of the present embodiment, the laser diodes 511 and 512 are held on the holder member 513 of aluminum die casting. The holder member 513 has mounting holes 513a and 513b on the rear surface, the mounting holes being arrayed at a distance of about 8 mm in the main scanning direction. The laser diodes 511 and 512 are press-fitted into the mounting holes so that the light sources are held by the holder member 513.

The coupling lenses 514 and 515 are positioned to the holder member 513 for each of the emission axial direction, the main scanning direction and the sub-scanning direction of the laser diodes. The coupling lenses are fitted to the adhesive surfaces of the holder member, and a UV curing adhesive agent is applied between the coupling lens and the adhesive surface. Hence, the coupling lenses are held by the holder member 513 and the optical axes of the coupling lenses accord with the emission axes of the laser diodes. The elements contained in the holder member 513 form the first light source unit 510 in the present embodiment.

The holder member 513 includes the cylinder portion 513c, and this cylinder portion is positioned so that its axial direction accords with the emission axis of the laser diodes. The holder member 513 includes the fastening portions, and each of fastening portions is provided with a threaded hole. The base member 530 includes the mounting portions 530a and 530b. The fastening portions of the holder member 513 are fitted to the mounting portions of the base member 530 by fastening the screws 532.

Similarly, the holder member 523 holds the laser diodes 521 and 522 and the coupling lenses 524 and 525 in the same manner as the holder member 513. In the present embodiment, the emission axes of the laser diodes 521 and 522 are symmetrical about the emission axis of the holder member 523. The elements contained in the holder member 523 form the second light source unit 520 in the present embodiment. The fastening portions of the holder member 523 are fitted to the mounting portions of the base member 530 by fastening the screws 532.

The base member 530 includes the through holes 530a. The cylinder portions of the holder members 513 and 523 are fitted into the through holes of the base member 530. The fastening portions of the holder members 513 and 523 are brought into contact with the mounting portions of the base member 530 by fastening the screws 532. After the fastening of the screws is performed, the fastening portions of the holder members are pressed onto the mounting portions of the base member by the compression force of the springs 531.

As indicated by the arrows in FIG. 33, in the present embodiment, the holder members 513 and 523 (or the first and second light source units 510 and 520) are mounted on the base member 530 such that the optical path direction of the laser diodes of each holder member is rotatable around the central axis of the laser diodes.

In the present embodiment, the coil springs 531 and the adjusting screws 532 form the elastic member that applies the pressure to the base member 530 and the holder members 513 and 523 to maintain the direction of each holder member to the emission axis. The applied pressure of the elastic member is varied depending on the amount of the rotation of the adjusting screw 532, and the elastic member of the present embodiment includes a pressure changing unit that arbitrarily changes the pressure of the elastic member.

In the present embodiment, the ball 534 is provided on the contact surface 523f of the holder member 523. The ball 534 contacts the base member 530 to make the gradient of the holder member 523 relative to the emission axis variable. The adjusting screw 533 is attached to the base member 530 to have a conical surface in contact with the ball 534. When the adjusting screw 533 is rotated so that the screw is moved in the vertical direction perpendicular to the emission axis, the gradient of the holder member 523 relative to the emission axis is varied, so that the pitch of beam spots, formed on the scanned surface, is varied in the sub-scanning direction in accordance with the adjusting screw movement.

In the present embodiment, the ball 534 and the adjusting screw 533 form the attitude adjustment mechanism that adjusts the optical path direction of the light beams of the light sources 521 and 522 of the holder member 523 (the second light source unit 520) relative to the emission axis by moving one of the holder member 513 and 523 to the other holder member against the pressure of the springs 531. Therefore, the multi-beam light source device of the present embodiment is effective in easily providing accurate positioning of the optical paths of the light beams from the light sources by performing the alignment adjusting operations.

Further, in the present embodiment, the beam synthesizing prism 541 is provided on the base member 530. The prism holder 540 is secured to the front surface of the base member 530, and the beam synthesizing prism 541 is contained in the prism holder 540. The beam synthesizing prism 541 converts the laser beams from the laser diodes 511, 512, 521 and 522 into adjacent light beams that are adjacent to each other on a scanned surface of a photosensitive medium (not shown). The halfwave plate 542 and the beam synthesizing prism 541 are attached to the front surface of the base member 530 on which the first and second light source units 510 and 520 are mounted, so that the laser beams are directed to the scanned surface along the emission axis perpendicular to the scanned surface.

As shown in FIG. 32, the beam synthesizing prism 541 includes an upper slanted surface 541a and a lower beam-split surface 541b. The laser beams, emitted by the laser diodes 521 and 522, are reflected by the upper slanted surface 541a, and the reflected laser beams are further reflected by the lower beam-split surface 541b toward the emission axis, as indicated by the one-dotted lines 520a and 520b in FIG. 32. The laser beams, emitted by the laser diodes 511 and 512, pass through the lower beam-split surface 541b toward the emission axis, as indicated by the one-dotted lines 510a and 510b in FIG. 32. The halfwave plate 542 rotates the direction of polarization of the laser beams from the laser diodes 521 and 522 by 90 degrees before they are incident to the slated surface 541a of the prism. The beam synthesizing prism 541 converts the laser beams from the light sources 511, 512, 521 and 522 into the adjacent light beams that are adjacent to each other on the scanned surface of the photosensitive medium.

As indicated by the arrow in FIG. 32, when an angular error "θ" between the optical axis of the laser beams 510a and 510b and the optical axis of the laser beams 520a and 520b is excessively large, the optical path direction of the laser beams 520a and 520b of the laser diodes 521 and 522 will considerably deviate from the optical path direction of the laser beams 510a and 510b of the laser diodes 511 and 512 that substantially matches with the emission axis of the multi-beam light source device.

Figure 34:
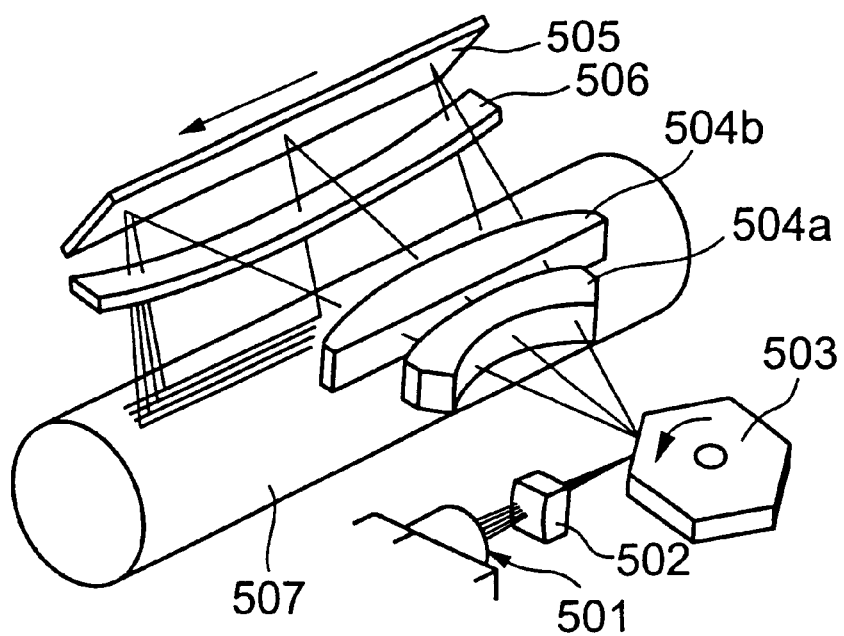
FIG. 34 is a perspective view of a multi-beam scanning apparatus in which the multi-beam light source device of the present embodiment is provided.

FIG. 34 is a perspective view of a multi-beam scanning apparatus in which the multi-beam light source device of the present embodiment is provided.

As shown in FIG. 34, in the multi-beam scanning apparatus, the multi-beam light source device 501 of the present embodiment is provided. The laser beams of the multi-beam light source device 501 are directed to a reflection surface of a rotary polygonal mirror 503 through a focusing lens 502. The polygonal mirror 503 is provided as a rotary deflector.

The light beams reflected by the polygonal mirror 503 are passed through a focusing optical system (called the fθ lens) including a first focusing lens 504a and a second focusing lens 504b. The focusing optical system converts the light beams from the polygonal mirror 503 into focusing light beams. A reflector 505 reflects the light beams from the focusing optical system onto the scanned surface of a photosensitive medium 507. An elongated lens 506 focuses the laser beams, reflected by the reflector 505, onto the scanned surface of the photosensitive medium 507. As the result, the beam spots are formed on the scanned surface of the photosensitive medium 507 by the light beams of the multi-beam light source device. In the present embodiment, when the adjusting screw 533 is manually rotated, the pitch "p" of the beam spots in the sub-scanning direction can be easily adjusted.

Generally, in order to reproduce an accurate image by the multi-beam scanning apparatus, the pitch of beam spots on the scanned surface in the sub-scanning direction must be adjusted to an appropriate value defined by the recording density (or the resolution) of the image forming system. For example, when the recording density is 1200 dpi, the pitch of beam spots in the sub-scanning direction must be adjusted to 21.2 μm.

Figure 35:
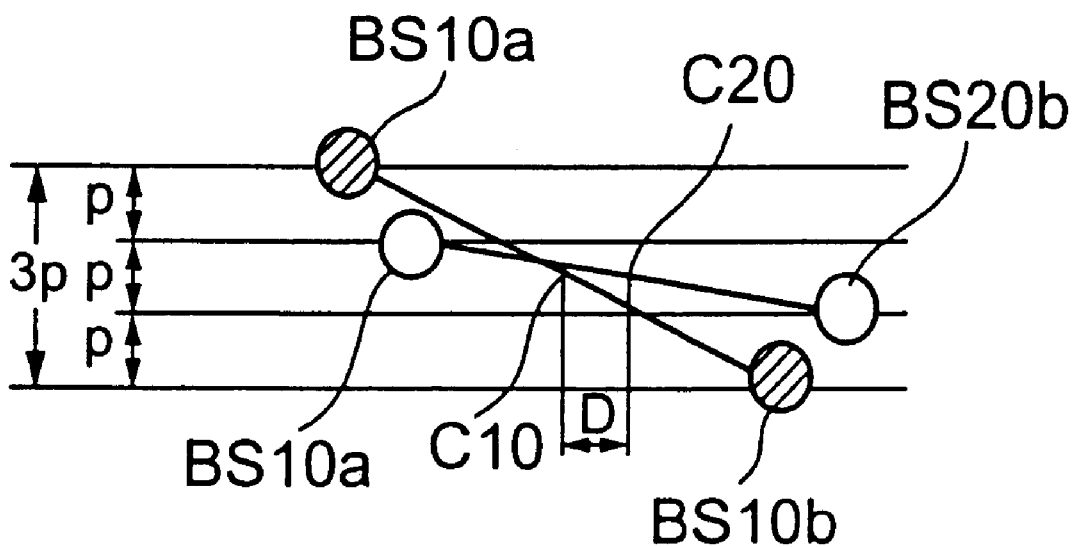
FIG. 35 is a diagram for explaining a positional adjustment of the beam spots that is performed with the multi-beam light source device of the present embodiment.

FIG. 35 is a diagram for explaining a positional adjustment of the beam spots that is performed with the multi-beam light source device of the present embodiment.

As shown in FIG. 35, the laser beams 510a and 510b, emitted by the laser diodes 511 and 512 and passed through the prism 541, form a pair of beam spots BS10a and BS10b (indicated by the shaded circles) on the scanned surface, and the laser beams 520a and 520b, emitted by the laser diodes 521 and 522 and reflected through the prism 541, form a pair of beam spots BS20a and BS20b (indicated by the hollow circles) on the scanned surface. C10 indicates the center of the beam spots BS10a and BS10b, and C20 indicates the center of the beam spots BS20a and BS20b.

Suppose that, in the case of FIG. 35, the pitch "p" of the beam spots BS20a and BS20b is adjusted to 21.2 μm. The pitch "3p" of the beam spots BS10a and BS10b (or the total pitch of the four beam spots) is adjusted to 3p=63.5 μm.

In order to easily achieve accurate positioning of the optical paths of the light beams from the laser diodes by performing the alignment adjusting operations, the above-described attitude adjustment mechanism is provided in the multi-beam light source device of the present embodiment. Specifically, the attitude adjustment mechanism of the present embodiment includes the adjusting screw 533 and the ball 544.

When the angular error "θ" (FIG. 32) between the optical axis of the laser beams 510a and 510b and the optical axis of the laser beams 520a and 520b is excessively large, the center C20 of the beam spots BS20a and BS20b formed by the laser beams of the laser diodes 521 and 522 will considerably deviate from the center C10 of the beam spots BS10a and BS10b formed by the laser beams of the laser diodes 511 and 512. In the case of FIG. 35, a distance "D" between the center C10 and the center C20 will be excessively large.

In order to eliminate the above problem, in the present embodiment, by rotating the adjusting screw 533 to suitably adjust the pitch of the beam spots such that the center C20 approaches the center C10 or the distance D approaches zero, the pitch "p" of the beam spots in the sub-scanning direction can be easily adjusted to 21.2 μm.

In order to easily carry out the above alignment adjusting operations with the multi-beam light source device, when performing the temporary rotational adjustment of the first and second light source units 510 and 520 before the alignment adjusting operations, the pressuring force of the elastic member (or the coil springs 531) must be decreased to a low level, and when performing the final rotation adjustment of the first and second light source unit after the alignment adjusting operations, the pressuring force of the elastic member must be increased to a high level.

To satisfy the above requirement, the elastic member of the present embodiment is configured such that a ratio of the pressuring force to the deflection of the elastic member (the coil spring 531) is increased as the deflection is increased.

Figure 36A:
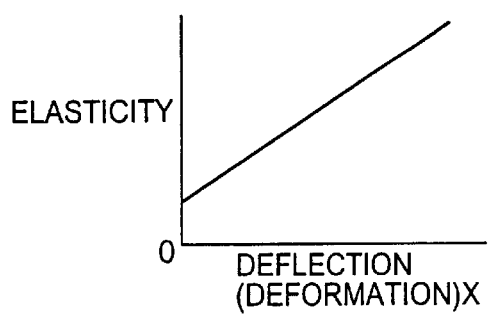
FIG. 36A and FIG. 36B are diagrams for explaining elasticity characteristics of a coil spring of the multi-beam light source device of the present embodiment.
Figure 36B:
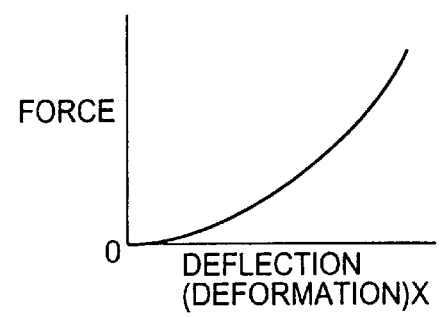

FIG. 36A and FIG. 36B are diagrams for explaining elasticity characteristics of such coil spring 531 in the multi-beam light source device of the present embodiment. As shown in FIG. 36A, when the deflection (or deformation) "x" of the coil spring 531 is increased, the elasticity coefficient of the coil spring 531 is increased. To achieve the desired characteristic, the inside diameter of the coil spring 531 may be varied along the longitudinal line of the spring, or the number of turns per unit length of the coil spring 531 may be varied. As shown in FIG. 36B, when the deflection "x" of the thus modified coil spring 531 is increased, the pressuring force "F" of the coil spring 531 is increased.

Alternatively, the elastic member (the coil spring 531) that achieves the desired characteristic may be constituted by a plurality of elastic units that have different elasticity coefficients K and are connected in series. In such alternative embodiment, when the deflection "x" of the elastic member is increased, the pressuring force "F" of the elastic member can be varied in a stepwise manner.

Figure 37A:
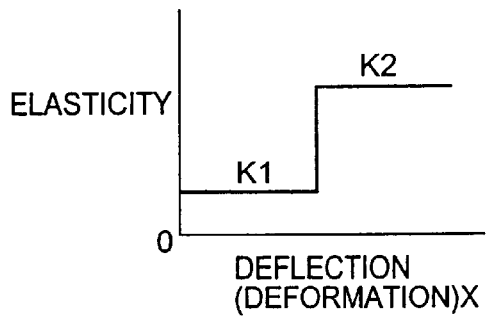
FIG. 37A and FIG. 37B are diagrams for explaining other elasticity characteristics of the coil spring of the multi-beam light source device of the present embodiment.
Figure 37B:
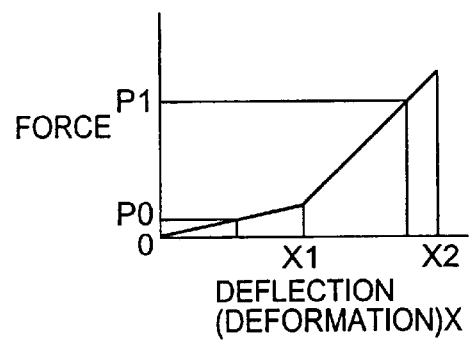

FIG. 37A and FIG. 37B are diagrams for explaining other elasticity characteristics of such coil units in the multi-beam light source device of the present embodiment. FIG. 37A shows the deflection-elasticity characteristic of two coil springs that have different elasticity coefficients K1 and K2 (K1<K2) and are connected in series. FIG. 37B shows the deflection-force characteristic of such coil springs. The elasticity coefficients K1 and K2 of the two coil springs are predetermined such that the characteristics as shown in FIG. 37A and FIG. 37B are met.

In the above-described embodiment, the multi-beam scanning apparatus according to the invention is effective in easily providing accurate positioning of the optical paths of the light beams from the light sources by performing the alignment adjusting operations.

FIG. 38 is a diagram for explaining a beam synthesizing prism 541 in another configuration of the multi-beam light source device of the present embodiment.

In the present embodiment, the multi-beam light source device is an 8-beam light source device using two laser arrays each emitting four laser beams.

As shown in FIG. 38, the laser beams 561a through 561d, emitted by the laser array 561, are reflected by the lower slanted surface 541a of the beam synthesizing prism, and the reflected laser beams are further reflected by the upper beam-split surface 541b toward the emission axis. The laser beams 551a through 551d, emitted by the laser array 551, pass through the beam-split surface 541b toward the emission axis. The halfwave plate 542 rotates the direction of polarization of the laser beams from the laser array 561 by 90 degrees before they are incident to the slated surface 541a of the prism. The beam synthesizing prism 541 converts the laser beams from the light arrays 551 and 561 into the adjacent light beams that are adjacent to each other on the scanned surface of the photosensitive medium 507.

Figure 39:
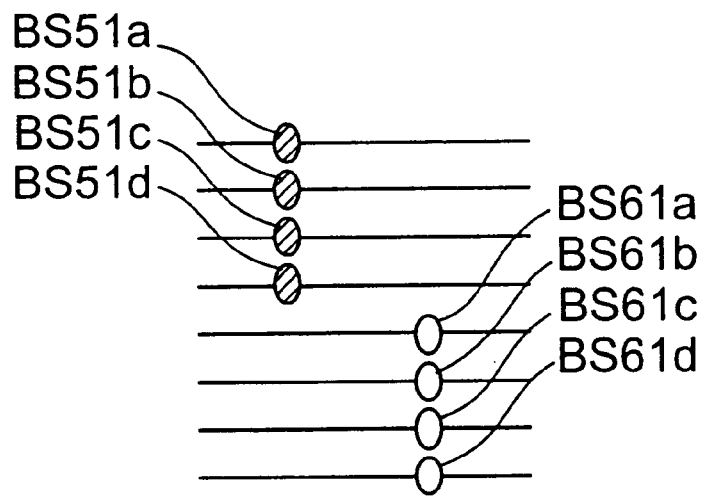
FIG. 39 is a diagram for explaining a layout of the beam spots from the multi-beam scanning apparatus of the present embodiment.

FIG. 39 is a diagram for explaining a layout of the beam spots from the multi-beam scanning apparatus of the present embodiment. In the layout shown in FIG. 39, the beam spots BS51a through BS51d and the beam spots BS61a through BS61d are separately arrayed on the scanned surface of the photosensitive medium.

Figure 40:
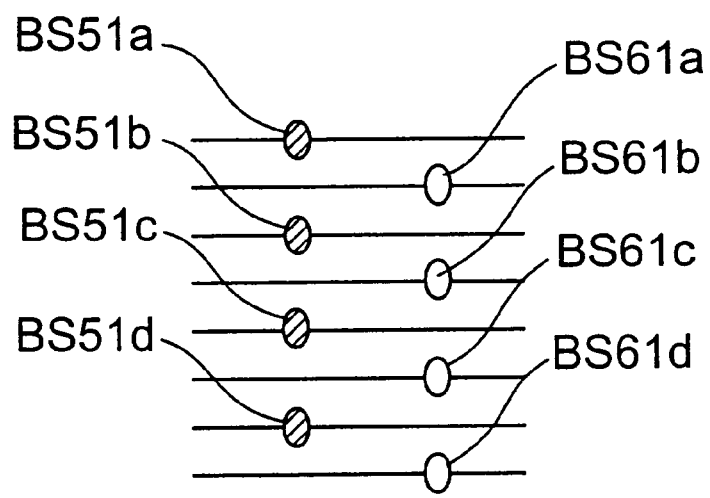
FIG. 40 is a diagram for explaining another layout of the beam spots from the multi-beam scanning apparatus of the present embodiment.

FIG. 40 is a diagram for explaining another layout of the beam spots from the multi-beam scanning apparatus of the present embodiment. In the layout shown in FIG. 40, the beam spots BS51a through BS51d and the beam spots BS61a through BS61d are alternately arrayed on the scanned surface of the photosensitive medium.

In the above-described embodiment, the multi-beam scanning apparatus is effective in easily providing accurate positioning of the optical paths of the light beams from the light sources by performing the alignment adjusting operations.

Figure 41:
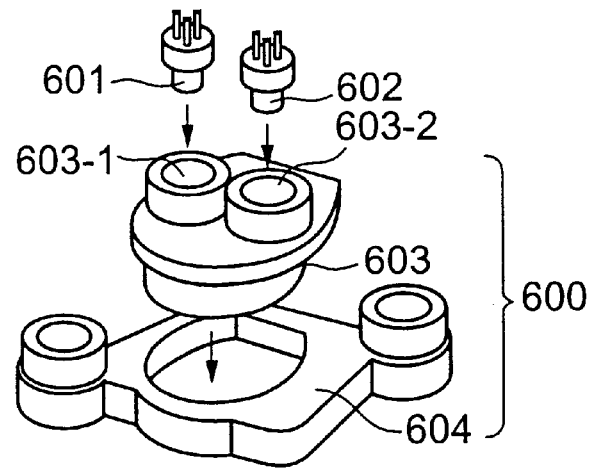
FIG. 41 is a perspective view of one preferred embodiment of the multi-beam light source device of the invention using two general-purpose laser diodes.

FIG. 41 is a perspective view of one preferred embodiment of the multi-beam light source device of the invention using two general-purpose laser diodes.

In the present embodiment, the multi-beam light source device is a 2-beam light source device using two general-purpose laser diodes.

As shown in FIG. 41, a light source holder 603 includes mounting holes 603-1 and 603-2 that are arrayed at a given distance in the main scanning direction. Laser diodes 601 and 602 are fitted into the mounting holes of the light source holder. The light source holder 603 includes a cylinder portion, and this cylinder portion is fitted into an opening of a fastening member 604. The light source holder 603 is separately provided with and attached to the fastening member 604 to form an integral light source unit 600.

In the light source unit 600, the light source holder 603, holding the laser diodes 601 and 602, is separately provided with the fastening member 604. The multi-beam light source device of the present embodiment is effective in reducing deformations of the light source holder and providing stable image reproduction performance when performing the alignment adjusting operations with the multi-beam light source device, when fastening the light source holder, or when the ambient temperature fluctuates.

Figure 42:
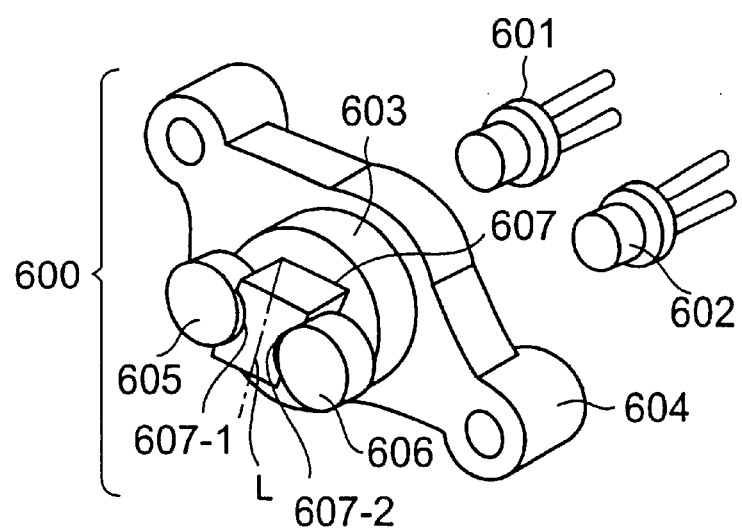
FIG. 42 is a perspective view of a variation of the multi-beam light source device of the present embodiment.

FIG. 42 is a perspective view of the light source unit 600 of the multi-beam light source device of the present embodiment.

As shown in FIG. 42, in the light source unit 600, a coupling lens 605 and a coupling lens 606 are integrally supported onto the light source holder 603. A mounting portion 607 is provided on the front surface of the light source holder 603 coaxially. The mounting portion 607 includes a pair of cylindrical recesses 607-1 and 607-2, and the coupling lenses 605 and 605 are mounted on these recesses of the mounting portion 607. A UV curing adhesive agent is applied between the mounting portion and the coupling lens.

The cylindrical recesses 607-1 and 607-2 of the mounting portion are symmetrically arranged, and the coupling lenses 605 and 606 mounted thereon are arrayed at an accurate distance in the main scanning direction.

Figure 43:
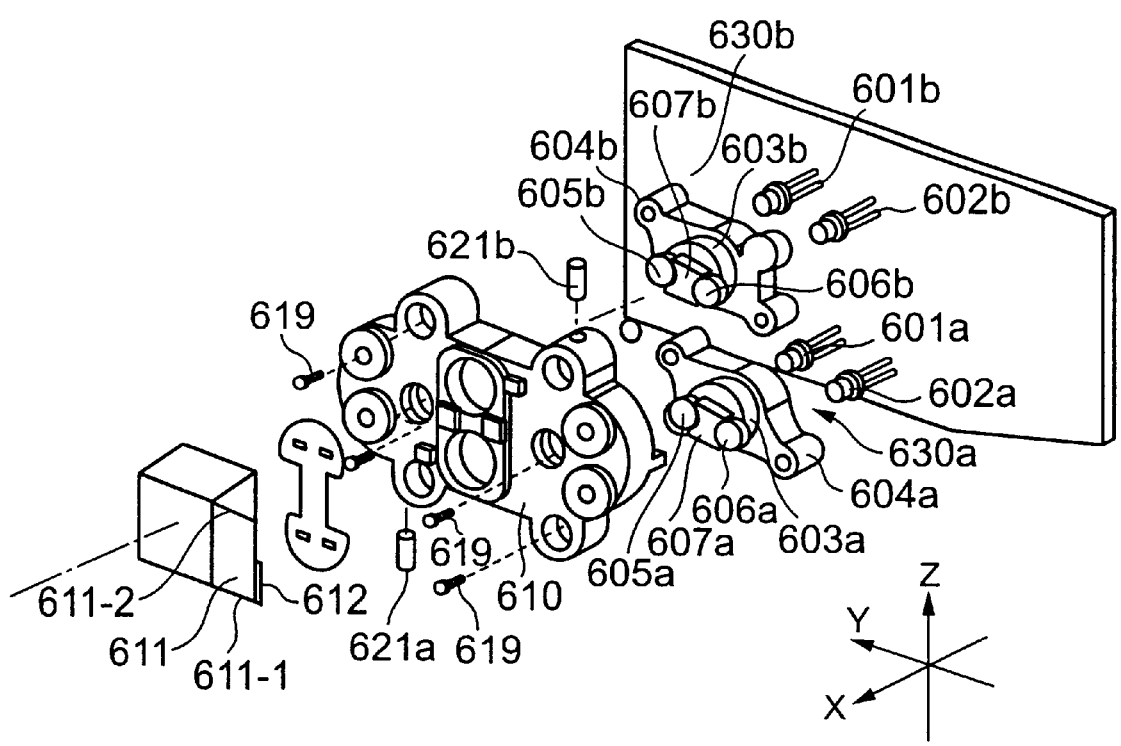
FIG. 43 is an exploded view of one preferred embodiment of the multi-beam light source device of the invention using four general-purpose laser diodes.
Figure 44:
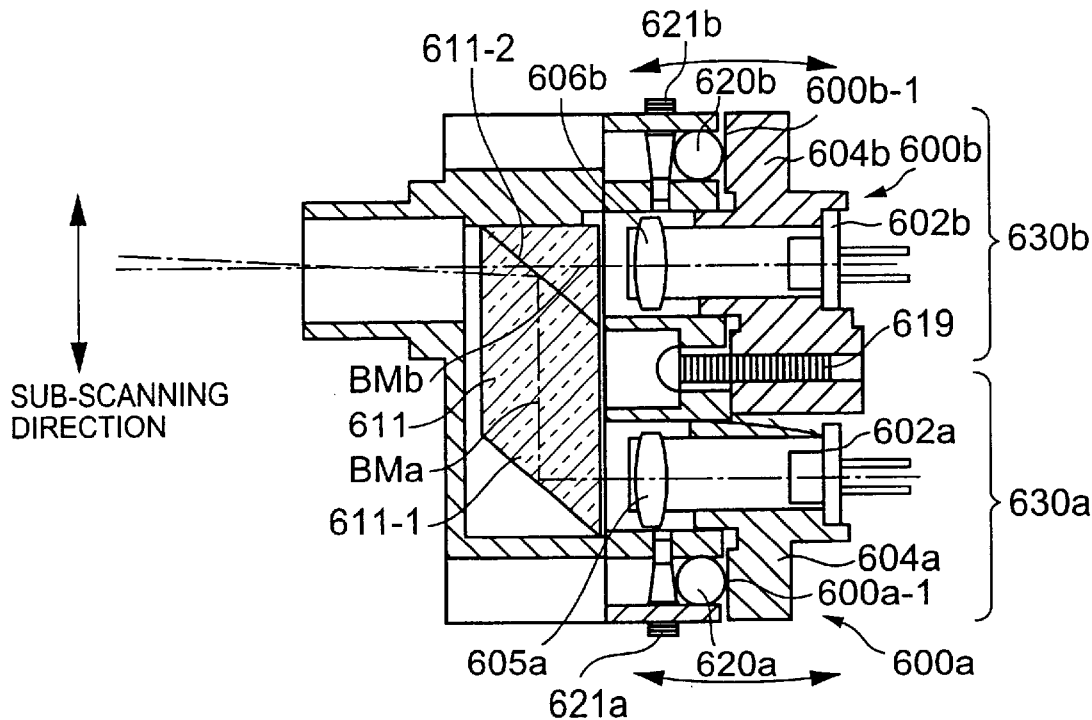
FIG. 44 is a cross-sectional view of the multi-beam light source device of the present embodiment in the sub-scanning direction.

FIG. 43 is an exploded view of one preferred embodiment of the multi-beam light source device of the invention using four general-purpose laser diodes. FIG. 44 is a cross-sectional view of the multi-beam light source device of the present embodiment in the sub-scanning direction.

In the present embodiment, the multi-beam light source device is a 4-beam light source device using four general-purpose laser diodes.

As shown in FIG. 43 and FIG. 44, the light source holder 603a is provided to hold the laser diodes 601a and 602a and the coupling lenses 605a and 606a, and the light source holder 603b is provided to hold the laser diodes 601b and 602b and the coupling lenses 605b and 606b. These light source holders 603a and 603b are essentially the same as the light source holder 603 shown in FIG. 41.

In the light source unit 630 (each of the light source units 630a and 630b) of the present embodiment, the light source holder 603, holding the laser diodes 601 and 602, is separately provided with the fastening member 604. Other configurations of the light source units 630a and 630b are essentially the same as those of the light source units 513 and 523 shown in FIG. 31.

In the multi-beam light source device of the present embodiment, the coil springs 531 and the adjusting screws 532 (the elastic member) as in the embodiment of FIG. 31, are not provided.

In the present embodiment, the ball 620a and the adjusting screw 621a, provided on the bottom of the base member 610, form the mounting mechanism that adjusts a mounting angle of the light source unit 630a relative to the base member 610, so that the pitch of beam spots, formed on the scanned surface by the laser beams, are variable in the sub-scanning direction in accordance with the amount angle adjustment. Furthermore, the ball 620b and the adjusting screw 621b, provided on the top of the base member 610, form the mounting mechanism that adjusts a mounting angle of the light source unit 630b relative to the base member 610, so that the pitch of beam spots, formed on the scanned surface by the laser beams, are variable in the sub-scanning direction in accordance with the amount angle adjustment. Therefore, the multi-beam light source device of the present embodiment is effective in easily providing accurate positioning of the optical paths of the light beams from the light sources by performing the alignment adjusting operations.

As shown in FIG. 44, the beam synthesizing prism 611 includes a lower slanted surface 611-1 and an upper beam-split surface 611-2. The laser beams, emitted by the laser diodes 601a and 601b, are reflected by the lower slanted surface 611-1, and the reflected laser beams are further reflected by the upper beam-split surface 611-2 toward the emission axis, as indicated by the one-dotted lines BMa in FIG. 44. The laser beams, emitted by the laser diodes 602a and 602b, pass through the upper beam-split surface 611-2 toward the emission axis, as indicated by the one-dotted lines BMb in FIG. 44. The halfwave plate 612 rotates the direction of polarization of the laser beams from the laser diodes 601a and 601b by 90 degrees before they are incident to the slated surface 611-1 of the prism. The beam synthesizing prism 611 converts the laser beams from the four light sources into the adjacent light beams that are adjacent to each other on the scanned surface of the photosensitive medium.

As shown in FIG. 44, when an angular error between the optical axis of the laser beams BMa and the optical axis of the laser beams BMb is excessively large, the optical path direction of the laser beams BMa of the laser diodes 601a and 601b will considerably deviate from the optical path direction of the laser beams BMb of the laser diodes 602a and 602b that substantially matches with the emission axis of the multi-beam light source device.

Figure 45:
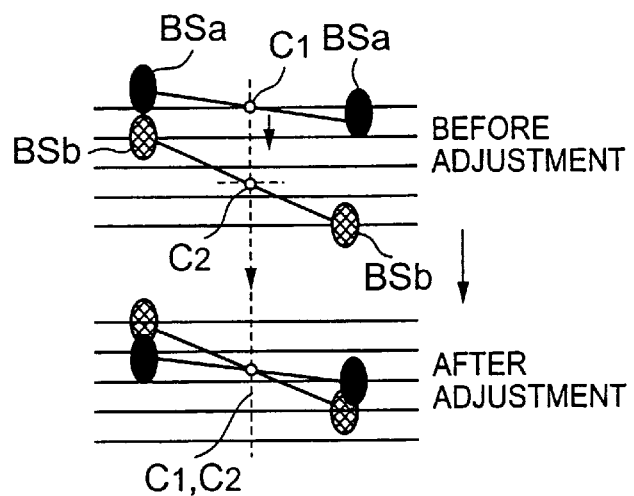
FIG. 45 is a diagram for explaining a positional adjustment of the beam spots that is performed with the multi-beam light source device of the present embodiment.

FIG. 45 is a diagram for explaining a positional adjustment of the beam spots that is performed with the multi-beam light source device of the present embodiment.

As shown in FIG. 45, the laser beams BMb, emitted by the laser diodes 601b and 602b and passed through the prism 611, form a pair of beam spots BSb on the scanned surface, and the laser beams BMa, emitted by the laser diodes 601a and 602a and reflected through the prism 611, form a pair of beam spots BSa on the scanned surface. C1 indicates the center of the beam spots BSa, and C2 indicates the center of the beam spots BSb. Suppose that, in the case of FIG. 45, the pitch "p" of the beam spots BSa is adjusted to 21.2 µm. The pitch "3p" of the beam spots BSb (or the total pitch of the four beam spots) is adjusted to 3p=63.5 µm.

In order to easily achieve accurate positioning of the optical paths of the light beams from the laser diodes by performing the alignment adjusting operations, the above-described mounting mechanism is provided in the multi-beam light source device of the present embodiment. Specifically, the mounting mechanism of the present embodiment includes the adjusting screws 621a and 621b and the balls 620a and 620b.

When the angular error between the optical axis of the laser beams BMa and the optical axis of the laser beams BMb is excessively large, the center C1 of the beam spots BSa formed by the laser beams BMa will considerably deviate from the center C2 of the beam spots BSb formed by the laser beams BMb. In the case of FIG. 45, a distance between the center C1 and the center C2 will be excessively large.

In order to eliminate the above problem, in the present embodiment, by rotating the adjusting screws 621a and 621b to suitably adjust the pitch of the beam spots on the scanned surface such that the center C1 approaches the center C2 or the distance between them approaches zero, the pitch "p" of the beam spots in the sub-scanning direction can be easily adjusted as shown in FIG. 45.

The multi-beam light source device of the present embodiment is effective in reducing deformations of the light source holder and providing stable image reproduction performance when performing the alignment adjusting operations with the multi-beam light source device, when fastening the light source holder, or when the ambient temperature fluctuates.

Figure 46:
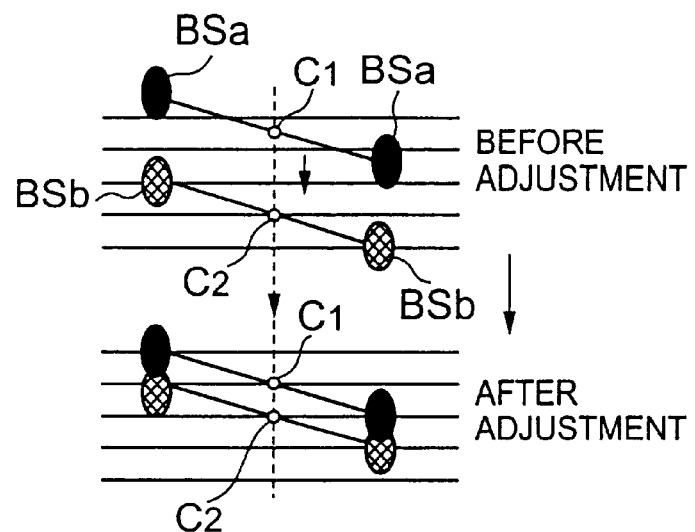
FIG. 46 is a diagram for explaining another positional adjustment of the beam spots that is performed with the multi-beam light source device of the present embodiment.

In the multi-beam light source device of FIG. 44, the balls 620a and 620b and the screws 621a and 621b are provided as the mounting mechanism for both the light source units 630a and 630b. The mounting mechanism may be provided for one of the light source units 630a and 630b. In addition, FIG. 46 is a diagram for explaining another layout of the beam spots in the multi-beam light source device of the present embodiment. In the present embodiment, the layout of the beam spots on the scanned surface may be modified to that shown in FIG. 46, instead of that of FIG. 45.

Figure 47:
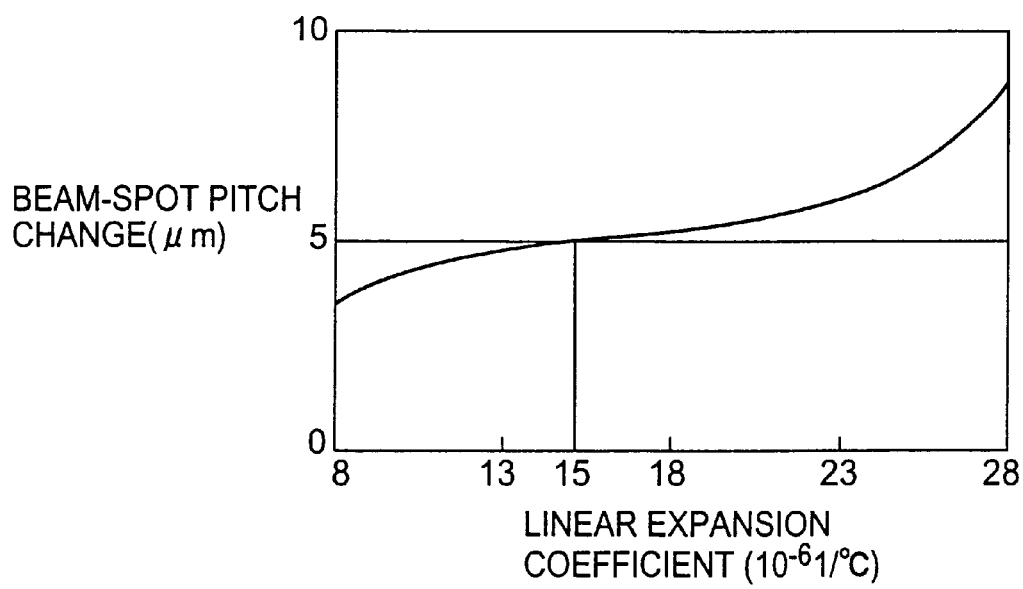
FIG. 47 is a diagram for explaining a relationship between the linear expansion coefficient of the fastening part and the change of the beam-spot pitch.

FIG. 47 is a diagram for explaining a relationship between the linear expansion coefficient of the fastening member and the change of the beam-spot pitch.

When the ambient temperature fluctuates, the pitch of the beam spots in the sub-scanning direction which the multi-beam scanning device forms on the scanned surface is likely to change because of the thermal expansion of the device. In order to provide stable image reproduction performance, it is necessary to set the linear expansion coefficients of the light source holders 603a and 603b to a low level.

In the present embodiment, the light source holder 603 is separately provided with the fastening member 604, and it is attached to the fastening member 604 to form the light source unit 630. Therefore, it is possible for the multi-beam light source device to reduce the influences of the thermal fluctuation on the pitch of the beam spots.

Further, in the present embodiment, the fastening members 604a and 604b have a linear expansion coefficient that is substantially equal to a linear expansion coefficient of the base member 610. The fastening members 604a and 604b have a linear expansion coefficient that is below $15.0 \times 10^{-6}$ 1/°C.

The multi-beam light source device of the present embodiment is effective in reducing deformations of the light source holder and providing stable image reproduction performance when performing the alignment adjusting operations with the multi-beam light source device, when fastening the light source holder, or when the ambient temperature fluctuates.

Figure 48:
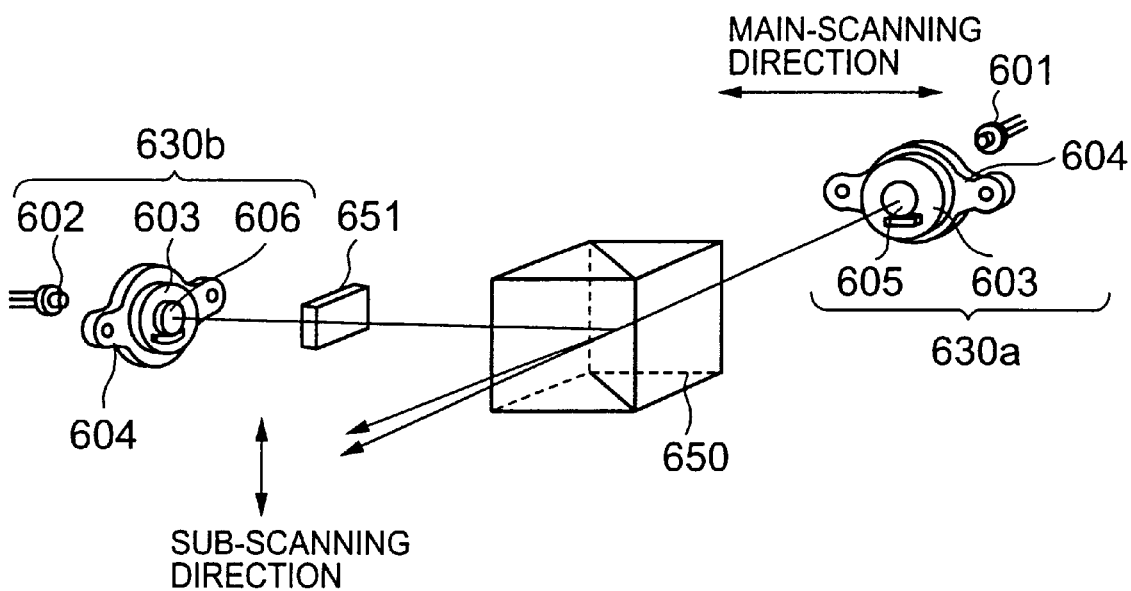
FIG. 48 is a perspective view of one preferred embodiment of the multi-beam light source device of the invention.

FIG. 48 is a perspective view of one preferred embodiment of the multi-beam light source device of the invention. In FIG. 48, the elements that are essentially the same as corresponding elements in FIG. 41 and FIG. 42 are designated by the same reference numerals, and a description thereof will be omitted.

As shown in FIG. 48, in the present embodiment, the light source holder 603 and the fastening member 604 are separately provided for each of the first light source unit 630a and the second light source unit 630b. The semiconductor lasers 601 and 602 are respectively held on the first and second light source units 630a and 630b. A polarization beam splitter 650 is provided at an intermediate position between the light source units 630a and 630b. The beam splitter 650 converts the laser beams from the light source units 630a and 630b into adjacent laser beams that adjacent to each other on the scanned surface.

In the present embodiment, a halfwave plate 651 is provided between the second light source unit 630b and the beam splitter 650. The halfwave plate 651 rotates the direction of polarization of the laser beam emitted by the laser 602, by 90 degrees. In the present embodiment, the number of light sources contained in each of the light source units 630a and 630b may be arbitrarily set, or it may be single or multiple.

In the above-described embodiment, the multi-beam scanning apparatus and the multi-beam light source device according to the invention are effective in reducing deformations of the light source holder and providing stable image reproduction performance even when the multi-beam light source device uses general-purpose light sources.

Figure 49:
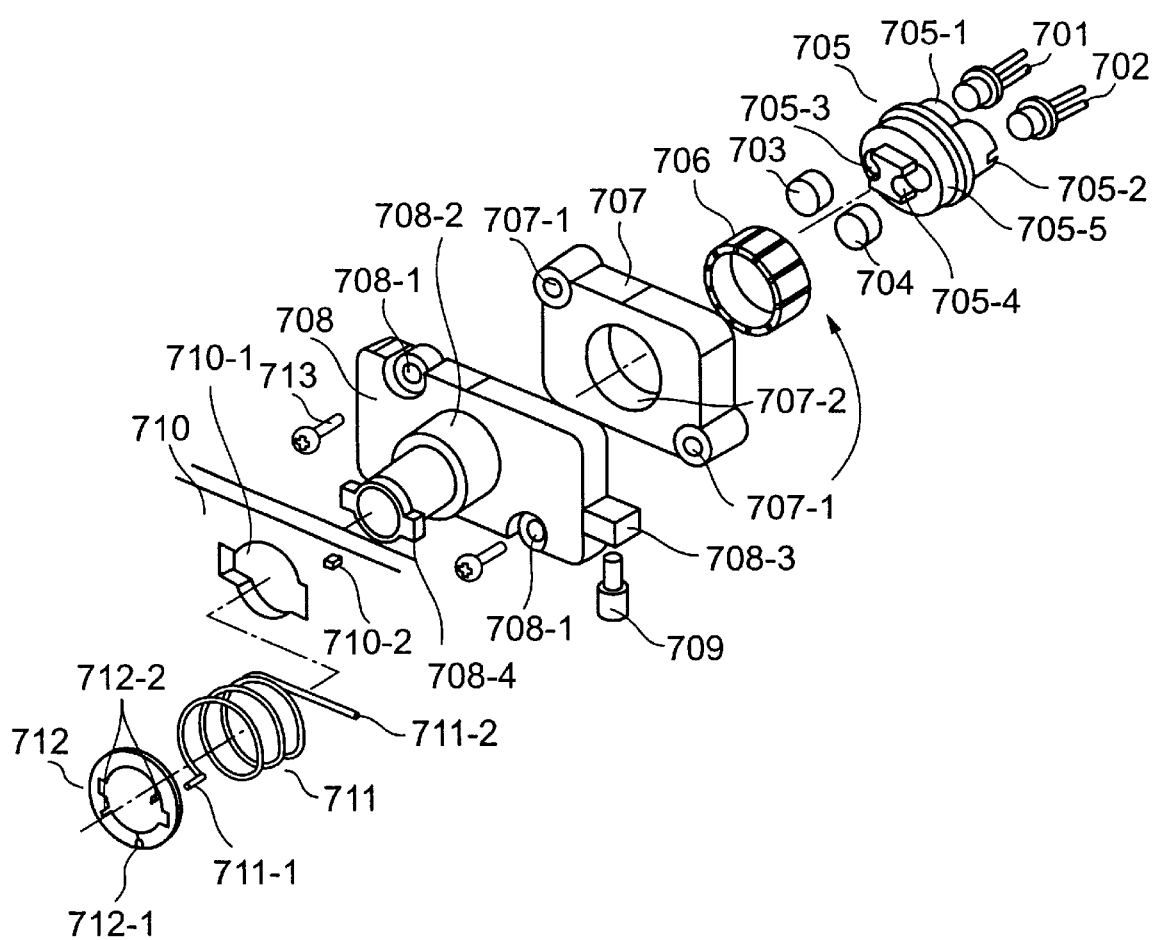
FIG. 49 is an exploded view of one preferred embodiment of the multi-beam light source device of the invention.
Figure 50:
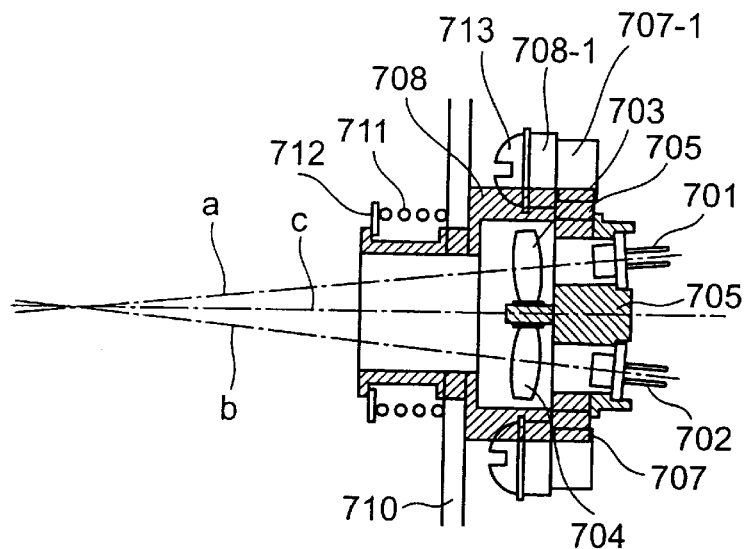
FIG. 50 is a cross-sectional view of the multi-beam light source device of the present embodiment in the main scanning direction.

FIG. 49 is an exploded view of another preferred embodiment of the multi-beam light source device of the invention. FIG. 50 is a cross-sectional view of the multi-beam light source device of the present embodiment in the main scanning direction.

In the present embodiment, a laser diode 701 and a laser diode 702 are held on a holder member 705. The holder member 705 includes a cylinder portion 705-1 and a cylinder portion 705-2 that extend rearward from the rear surface of the holder member 705. The cylinder portions 705-1 and 705-2 have respective mounting holes, and the laser diodes 701 and 702 are press fitted into the holes of the cylinder portions 705-1 and 705-2 of the holder member respectively.

The holder member 705 further includes a U-shaped mounting portion 705-3 and a U-shaped mounting portion 705-4. A coupling lens 703 and a coupling lens 704 are attached to the mounting portion 705-3 and the mounting portion 705-4 of the holder member 705, respectively. After the positioning of the coupling lenses 703 and 704 is performed, a UV curing adhesive agent is applied to between the coupling lens and the mounting portion of the base member. In this manner, the coupling lenses 703 and 704 are secured to the holder member 705 such that the coupling lenses 703 and 704 respectively convert the laser beams, emitted by the laser diodes 701 and 702, into collimated laser beams "a" and "b" in a given direction along an emission axis "C" of the multi-beam light source device, as shown in FIG. 50.

In the present embodiment, the optical path of the laser beam "a" from the coupling lens 703 along the optical axis "C" and the optical path of the laser beam "b" from the coupling lens 704 along the optical axis "C" are symmetrically arranged such that the angle between the optical paths in the main scanning direction is set at about 3 degrees. The multi-beam light source device of the present embodiment is configured such that the laser diode and the coupling lens are aligned with each other for each of the two optical paths.

The holder member 705 is supported onto a flange member 707. The holder member 705 includes a cylinder portion 705-5. The flange member 707 includes a pair of fastening holes 707-1. After the positioning of the flange member 707 is performed, the flange member 707 is secured to a base member 708 by fastening screws 713 to the fastening holes 707-1. The base member 708 is further secured to a housing 710 of a main system (not shown). When supporting the holder member 705 onto the flange member 707, an intermediate member 706 is press fitted onto the outside surface of the cylinder portion 705-5 of the holder member 705, and the outside surface of the intermediate member 706 is press fitted into an internal opening 707-2 of the flange member 707. Hence, the holder member 705 is supported onto the flange member 707 through the intermediate member 706.

Figures 56A, 56B:
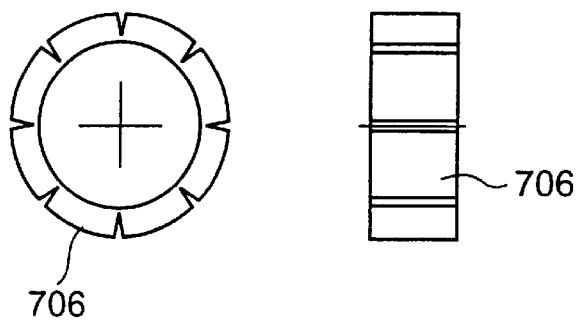
FIG. 56A and FIG. 56B are views of an intermediate member of the multi-beam light source device of the present embodiment.

FIG. 56A and FIG. 56B are a front view and a side view of the intermediate member 706 in the present embodiment. As shown, the intermediate member 706 has the outer peripheral surface that is formed with a set of equally spaced cut-out portions. Dimensional changes of the intermediate member 706 in the circumferential direction can be absorbed by means of these cut-out portions.

Alternatively, the set of equally spaced cut-out portions may be provided on either the inner peripheral surface of the intermediate member 706 or both the inner and outer peripheral surfaces of the intermediate member 706.

Suppose that "d1" indicates the diameter of the cylindrical area where the flange member 707 and the intermediate member 706 are fitted together, "d2" indicates the diameter of the cylindrical area where the holder member 705 and the intermediate member 706 are fitted together, and "γ1","γ2", and "γ3" indicate the linear expansion coefficients of the flange member 707, the holder member 705, and the intermediate member 706, respectively. When the ambient temperature changes by "t" in a free state of the multi-beam light source device, the inside diameter "d1" of the flange member 707 is expanded by "d1γ1t" and the outside diameter "d2" of the holder member 705 is expanded by "d2γ2t". In such a situation, if an appropriate material of the intermediate member 706 that satisfies the condition: d1γ1−d2γ2= (d1−d2) γ3, it is possible to absorb the dimensional changes of the multi-beam light source device in the circumferential direction by means of the difference of the linear expansions of the flange member 707, the holder member 705, and the intermediate member 706.

Accordingly, when the linear expansion coefficient of the holder member 705 is larger than the linear expansion coefficient of the flange member 707, the intermediate member 706 must have a linear expansion coefficient less than the linear expansion coefficient of the flange member 707. On the other hand, when the linear expansion coefficient of the holder member 705 is less than the linear expansion coefficient of the flange member 707, the intermediate member 706 must have a linear expansion coefficient larger than the linear expansion coefficient of the flange member 707.

For example, the intermediate member 706 is made of an elastic material such as nitrile rubber or chloroprene rubber. By use of such elastic material, the intermediate member 706 can suitably absorb the dimensional changes of the multi-beam light source device in the circumferential direction.

The flange member 707 is supported by the base member 708 by passing the screw 713 through the hole 708-1 and fastening the screw 713 to the threaded hole 707-1 of the flange member 707. The flange member 707 is secured to the housing 710 by placing the cylinder portion 708-2 of the base member 708 into the mounting hole 710-1 in line with the emission axis "C". The positioning of the flange member 707 is performed, and the flange member is mounted.

The spring 711 is internally provided on the housing 710. One end 711-1 of the spring 711 is connected to the hole 712-1 of the stopper 712, and the other end 711-2 thereof is connected to the projection 710-2 of the housing 710. The adjusting screw 709 is connected to the fixed portion 708-3 of the base member 708. The stopper 712 includes the raised portions 712-2, and the raised portions 712-2 are connected to the projections 708-4 of the base member 708. The actuating force of the spring 711 is exerted on the base member 708 so as to rotate the base member 708 around the emission axis "C". When the adjusting screw 709 is manually rotated, the mounting angle of the base member 708 to the emission axis "C" can be easily adjusted by the connection of the screw 709 and the base member 708.

Figure 54:
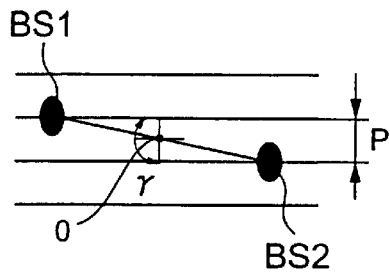
FIG. 54 is a diagram for explaining a layout of the beam spots adjusted with the multi-beam light source device of FIG. 49.

FIG. 54 is a diagram for explaining a layout of the beam spots adjusted with the multi-beam light source device of FIG. 49. As shown in FIG. 54, the beam spots BS1 and BS2 are formed on the scanned surface by the light beams of the multi-beam light source device. As described above, when the adjusting screw 709 is manually rotated, the pitch "P" of the beam spots BS1 and BS2 in the sub-scanning direction can be easily adjusted so as to match with a distance between the scanning lines according to the recording density of the optical scanning apparatus.

Figure 51:
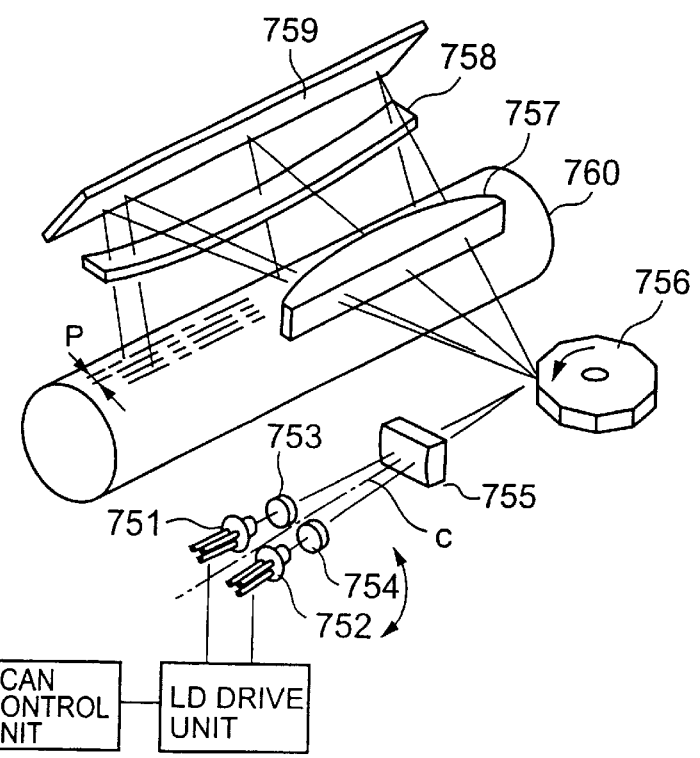
FIG. 51 is a perspective view of a multi-beam scanning apparatus in which the multi-beam light source device of the present embodiment is provided.

FIG. 51 is a perspective view of a multi-beam scanning apparatus in which the multi-beam light source device of the present embodiment is provided.

As shown in FIG. 51, in the multi-beam scanning apparatus, semiconductor lasers 751 and 752 (e.g., laser diodes LD), coupling lenses 753 and 754 and a cylindrical lens 755 are provided as the elements of the multi-beam light source device of the present embodiment. Further, a scan control unit and an LD drive unit are provided to control the operations of the LD 751 and 752. The laser beams of the multi-beam light source device are directed to a reflection surface of a rotary polygonal mirror 756. The polygonal mirror 756 is provided as a rotary deflector.

The light beams reflected by the polygonal mirror 756 are passed through a focusing optical system including a first focusing lens 757 and a second focusing lens 758. The focusing optical system converts the light beams from the polygonal mirror 756 into focusing light beams. The reflector 759 reflects the light beams from the focusing optical system onto the scanned surface of the photosensitive medium 760. Hence, the beam spots are formed on the scanned surface of the photosensitive medium 760 by the light beams of the multi-beam light source device. When the adjusting screw 709 is manually rotated, the pitch "P" of the beam spots in the sub-scanning direction can be easily adjusted.

Figure 52:
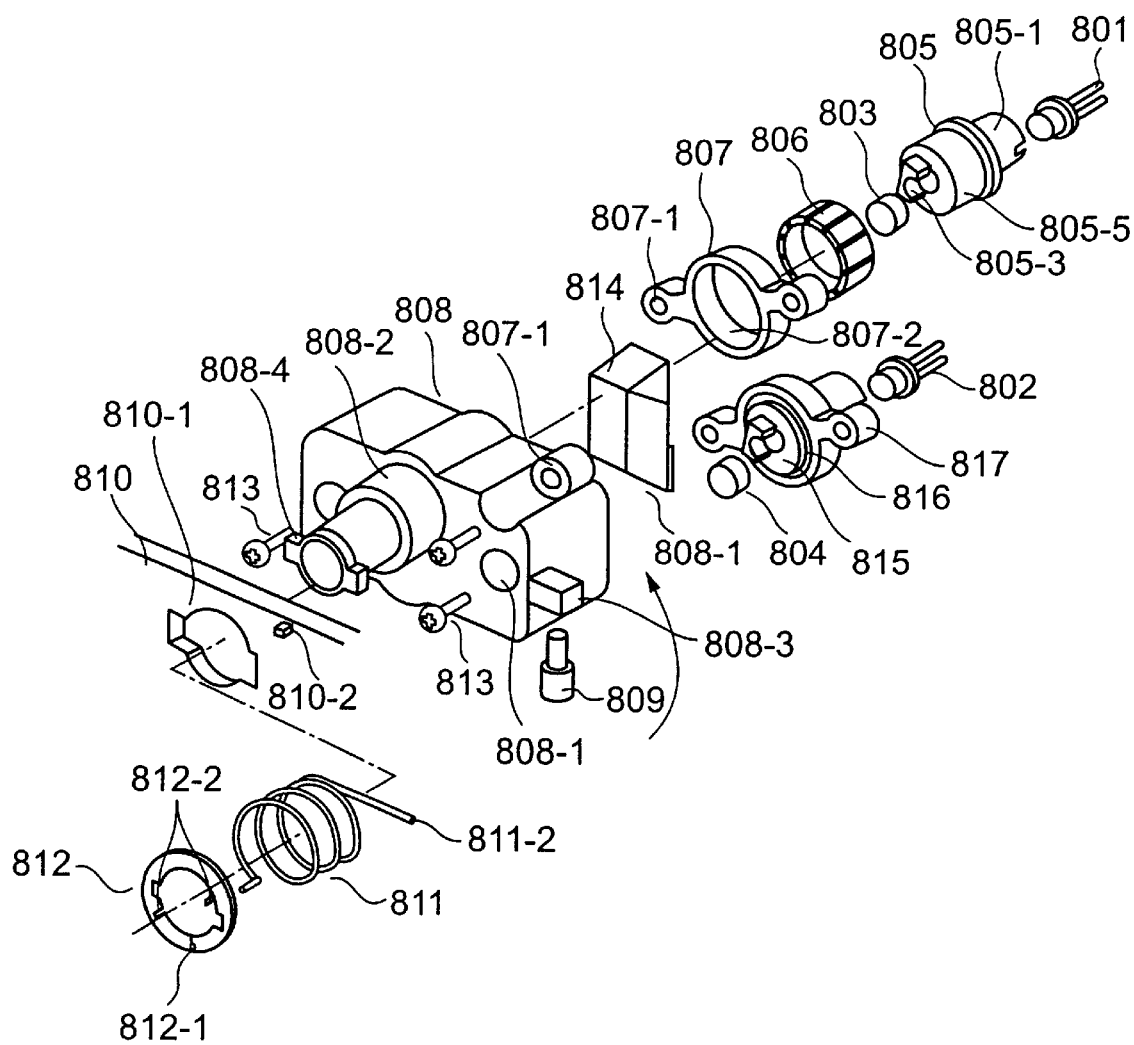
FIG. 52 is an exploded view of a variation of the multi-beam light source device of the present embodiment.
Figure 53:
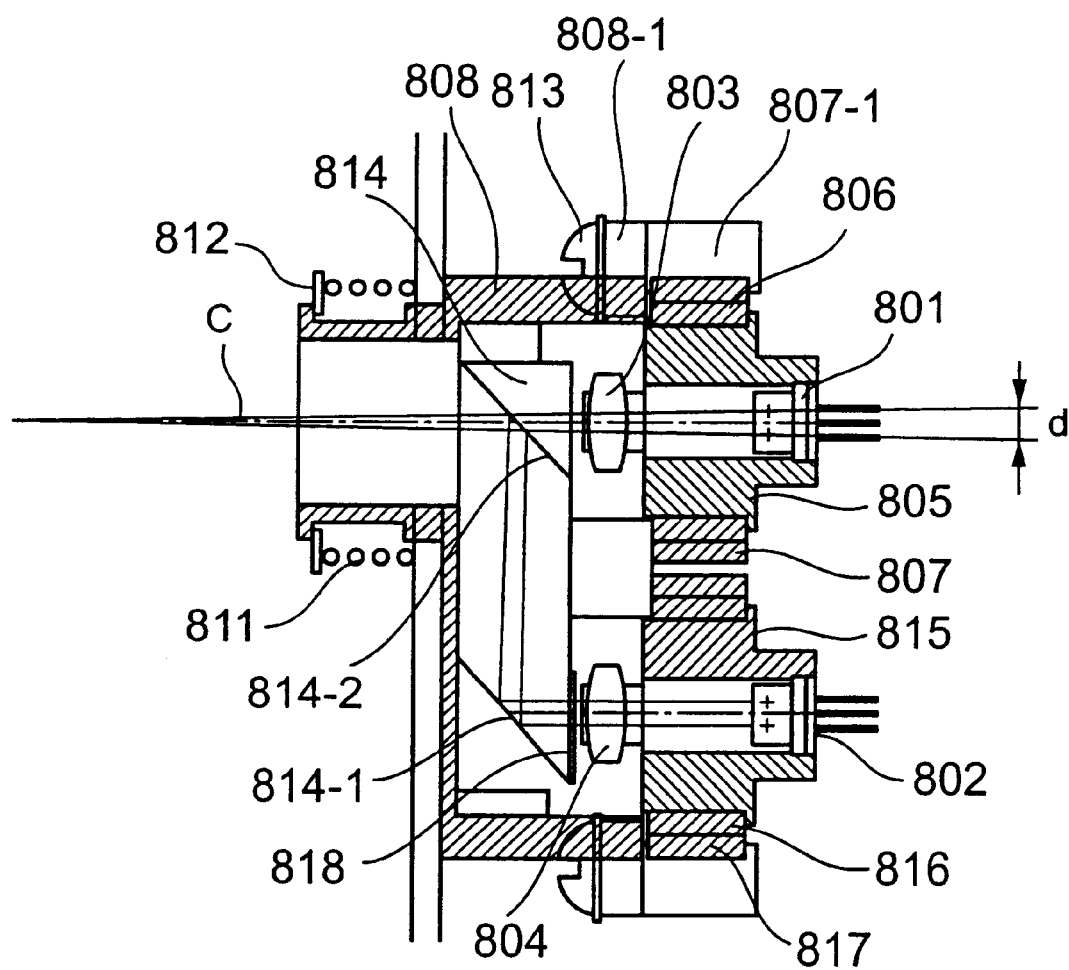
FIG. 53 is a cross-sectional view of the multi-beam light source device of the present embodiment in the sub-scanning direction.

FIG. 52 is an exploded view of a variation of the multi-beam light source device of the present embodiment. FIG. 53 is a cross-sectional view of the multi-beam light source device of the present embodiment in the sub-scanning direction.

In the present embodiment, a semiconductor laser array 801 and a semiconductor laser array 802 are held on a holder member 805. The holder member 805 includes a cylinder portion 805-1 and a cylinder portion 805-2 that extend rearward from the rear surface of the holder member 805. The cylinder portions 805-1 and 805-2 have respective mounting holes, and the laser arrays 801 and 802 are press fitted into the holes of the cylinder portions 805-1 and 805-2 of the holder member respectively.

The holder member 805 further includes a U-shaped mounting portion 805-3. A coupling lens 803 is attached to the mounting portion 805-3 of the holder member 805, respectively. After the positioning of the coupling lens 803 is performed, a UV curing adhesive agent is applied to between the coupling lens and the mounting portion of the base member. In this manner, the coupling lens 803 is secured to the holder member 805 such that the coupling lens 803 converts the laser beams, emitted by the laser array 801, into collimated laser beams in a given direction along an emission axis "C" of the multi-beam light source device, as shown in FIG. 53.

Similarly, a base member 815 has the same configuration as that of the base member 805 with respect to the laser array 802 and the coupling lens 805.

The holder member 805 is supported onto a flange member 807. The holder member 805 includes a cylinder portion 805-5. The flange member 807 includes a pair of fastening holes 807-1. After the positioning of the flange member 807 is performed, the flange member 807 is secured to a base member 808 by fastening screws 813 to the fastening holes 807-1. The base member 808 is further secured to a housing 810 of a main system (not shown). When supporting the holder member 805 onto the flange member 807, an intermediate member 806 is press fitted onto the outside surface of the cylinder portion 805-5 of the holder member 805, and the outside surface of the intermediate member 806 is press fitted into an internal opening 807-2 of the flange member 807. Hence, the holder member 805 is supported onto the flange member 807 through the intermediate member 806.

Figure 55:
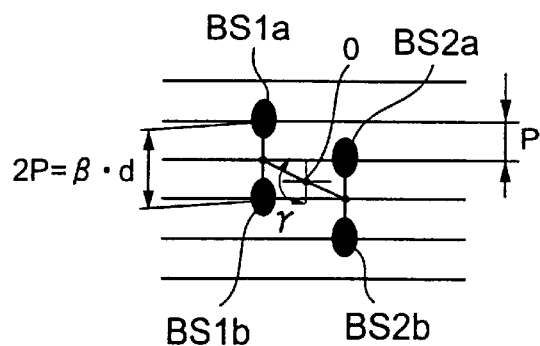
FIG. 55 is a diagram for explaining a layout of the beam spots adjusted with the multi-beam light source device of FIG. 52.

FIG. 55 is a diagram for explaining a layout of the beam spots adjusted with the multi-beam light source device of FIG. 52.

As shown in FIG. 55, the beam spots BS1$a$ and BS1$b$ are formed on the scanned surface by the light beams of the laser array 801 of the multi-beam light source device of FIG. 52, and the beam spots BS2$a$ and BS2$b$ are formed on the scanned surface by the light beams of the laser array 802. The pitch of the beam spots BS1$a$ and BS1$b$ and the pitch of the beam spots BS2$a$ and BS2$b$ are set to meet the condition $2P=\beta d$ where $\beta$ is a magnification factor and d is a distance between laser emission points in the laser array as indicated in FIG. 53. As described above, when the adjusting screw 809 is manually rotated, the pitch "P" of the beam spots BS1$a$ and BS2$a$ in the sub-scanning direction can be easily adjusted.

In the above-described embodiment, the multi-beam scanning apparatus and the multi-beam light source device according to the invention are effective in reducing deformations of the light source holder and providing stable image reproduction performance.

Figure 57:
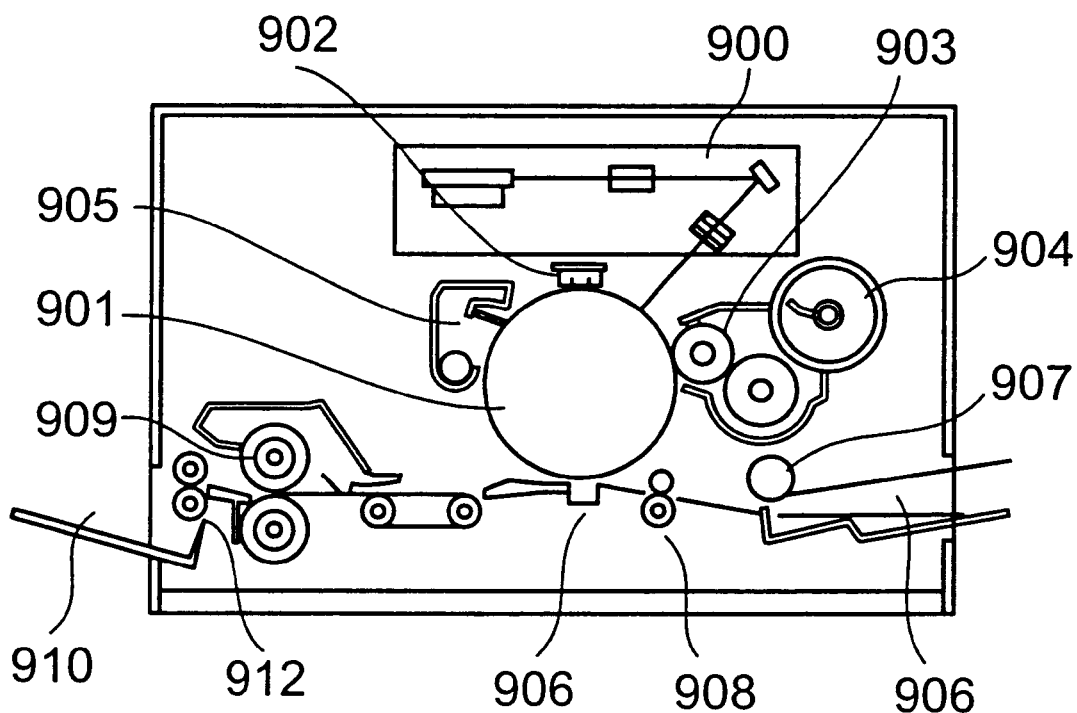
FIG. 57 is a diagram of an image forming system in which the multi-beam scanning apparatus of the present embodiment is provided.

FIG. 57 is a diagram of an image forming system in which the multi-beam scanning apparatus of the above-mentioned embodiment is provided. In the present embodiment, the image forming system is a digital copier, and the multi-beam scanning apparatus is applied to the digital copier.

As shown in FIG. 57, in the image forming system, the multi-beam scanning apparatus 900 is provided at the upper position thereof. Around a photosensitive drum 901, a charger 902, a developing roller 903, a toner cartridge 904, a cleaning case 905 and a transfer charger 906 are provided. The charger 902 charges the photosensitive drum 901 electrostatically. The multi-beam scanning apparatus 900 exposes the photosensitive drum 901 to the image light pattern, which results in an electrostatic latent image on the surface of the photosensitive drum 901. The developing roller 903 develops the photosensitive drum 901 by bringing electrostatically charged toner particles (black or colored) to the surface of the photosensitive drum 901 where they selectively adhere to appropriately charged regions. The toner cartridge 904 supplies the toner to the developing roller 903. The cleaning case 905 cleans residual toner from the surface of the photosensitive drum 901.

Every time the four laser beams from the multi-beam light source device are reflected by one of the reflection surfaces of the polygonal mirror, the reflected laser beams from the multi-beam scanning apparatus 900 simultaneously scan the photosensitive drum 901 to speedily form the electrostatic latent image on the photosensitive medium 901.

A copy sheet (e.g., paper) from a copy sheet tray 913 is delivered by a sheet feeding roller 907 to a registration roller 908. When a match with the timing of print start occurs, the registration roller 908 delivers the copy sheet to the photosensitive drum 901. When the copy sheet passes through the photosensitive drum 901, the transfer charger 906 electrostatically transfers the toner image from the photosensitive drum 901 to the copy sheet. A fixing roller 909 thermally fixes the toner to the copy sheet. After the fixing of the toner is performed, a sheet ejection roller 912 ejects the copy sheet toward a sheet ejection tray 910.

In alternative embodiments of the above-described embodiments, the LD base of FIG. 14, the supporting member of FIG. 24, and the holder members of FIG. 29 and FIG. 31 may be configured to form the light source unit or the light source means in the claims. Further, in alternative embodiments of the above-described embodiments, the flange member of FIG. 14 and the supporting member of FIG. 24 may be configured to form the base member or the base member means in the claims.

According to the multi-beam scanning apparatus of the present invention, it is possible to construct the image forming system that can simultaneously scan the photosensitive medium by the multiple laser beams in order to speedily form the electrostatic latent image on the photosensitive medium. The multi-beam scanning apparatus of the present invention makes it possible that the image forming system provides an increased recording density and a high-quality image formation.

The present invention is not limited to the above-described embodiments, and variations and modifications may be made without departing from the scope of the present invention.

Further, the present invention is based on Japanese priority application No.2000-111730, filed on Apr. 13, 2000, Japanese priority application No.2000-115660, filed on Apr. 17, 2000, Japanese priority application No.2000-144844, filed on May 17, 2000, Japanese priority application No.2000-249523, filed on Aug. 21, 2000, Japanese priority application No.2000-261479, filed on Aug. 30, 2000, Japanese priority application No.2000-289182, filed on Sep. 22, 2000, and Japanese priority application No.2001-101936, filed on Mar. 30, 2001, the entire contents of which are hereby incorporated by reference.

What is claimed is:

1. A multi-beam light source device comprising:
   a light source unit holding light sources and coupling lenses, the coupling lenses coupling light beams emitted by the light sources;
   a base member holding the light source unit such that the light beams from the light source unit held by the base member are rotatable around an axis which passes through a point of intersection of the light beams and is perpendicular to a sub-scanning cross-section in a sub-scanning direction of an optical scanning device; and
   an angle adjustment mechanism configured to adjust a mounting angle of the light source unit relative to the base member with respect to the sub-scanning direction, so that respective pitches of beam spots, formed on a scanned surface by the light beams, in the sub-scanning direction are variable in accordance with the mounting angle adjustment.

2. The multi-beam light source device of claim 1 wherein the light sources of the light source unit are held by the base member at positions that cross over an emission axis of the light source unit.

3. The multi-beam light source device of claim 2 wherein the angle adjustment mechanism is configured to rotate the light source unit around a line segment passing through the two positions.

4. The multi-beam light source device of claim 3 wherein the angle adjustment mechanism comprises:
   a position movement unit provided on the base member such that the position movement unit contacts the light source unit so as to rotate the light source unit around the light segment and make gradients of the light sources of the light source unit relative to the emission axis variable; and
   a position adjusting unit provided on the base member in contact with the position movement unit, the position adjusting unit provided to be movable to the base member in a direction perpendicular to the emission axis, and movement of the position adjusting unit in the direction allows the gradients of the light sources of the light source unit to the emission axis to be adjusted.

5. The multi-beam light source device of claim 4, wherein the position movement unit comprises balls provided on the base member, and the position adjusting unit comprises adjusting screws each having a conical surface in contact with one of the balls.

6. A multi-beam scanning apparatus in which an optical scanning device scans a surface of a photosensitive medium in a main scanning direction by focusing multiple light beams of a multi-beam light source device onto the scanned surface, the multi-beam light source device comprising:
   a light source unit holding light sources and coupling lenses, the coupling lenses coupling light beams emitted by the light sources;
   a base member holding the light source unit such that the light beams from the light source unit held by the base member are rotatable around an axis which passes through a point of intersection of the light beams and is perpendicular to a sub-scanning cross-section in a sub-scanning direction of the optical scanning device; and
   an angle adjustment mechanism configured to adjust a mounting angle of the light source unit relative to the base member with respect to the sub-scanning direction, so that respective pitches of beam spots, formed on the scanned surface by the light beams, in the sub-scanning direction are variable in accordance with the mounting angle adjustment.

7. The multi-beam light source device of claim 1, wherein the light source unit includes a first light source unit that integrally supports first light sources and first coupling lenses to array the first light sources in the main scanning direction, and a second light source unit that integrally supports second light sources and second coupling lenses to array the second light sources in the main scanning direction, and one of the first and second light source units is supported by the other light source unit.

8. The multi-beam light source device of claim 7, wherein each of the first and second coupling lenses has an outside diameter d, the first coupling lenses and the second coupling lenses are arranged to have a distance L between the first coupling lenses and the second coupling lenses, and the first and second light source units are held by the base member so as to satisfy the condition that the outside diameter d is larger than the distance L.

9. The multi-beam light source device of claim 7, wherein one of the first and second light source units is rotatably supported by the other light source unit, and said one of the first and second light source units is rotatable around a rotation axis that substantially matches with the emission axis.

10. A multi-beam light source device comprising:
first light source means for holding first light sources and first coupling lenses, the first coupling lenses coupling light beams emitted by the first light sources;
second light source means for holding second light sources and second coupling lenses, the second coupling lenses coupling light beams emitted by the second light sources;
base member means for holding the first light source means and the second light source means such that the light beams from at least one of the first and second light source means held by the base member means are rotatable around an axis which passes through a point of intersection of the light beams and is perpendicular to a sub-scanning cross-section in a sub-scanning direction;
beam synthesizing means for converting the light beams from the first and second light source means into adjacent light beams that are adjacent to each other and directed to a scanned surface along an emission axis perpendicular to the scanned surface; and
angle adjustment means for adjusting a mounting angle of at least one of the first and second light source means relative to the base member means with respect to the sub-scanning direction, so that respective pitches of beam spots, formed on the scanned surface by the light beams, in the sub-scanning direction are variable in accordance with the mounting angle adjustment.

11. A multi-beam light source device for use in a multi-beam scanning apparatus in which an optical scanning unit scans a surface of a photosensitive medium in a main scanning direction by focusing multiple light beams of the multi-beam light source device onto the scanned surface, the multi-beam light source device comprising:
a light source unit supporting light sources and coupling lenses to array the light sources in the main scanning direction, the coupling lenses coupling light beams emitted by the light sources;
an angle adjustment mechanism which adjusts a mounting angle of the light source unit relative to a base member with respect to a sub-scanning direction; and
an optical path changing unit changing an optical path of part of the light beams of the light source unit such that the light beams from the light source unit and the light beams from the optical path changing unit are converted into adjacent light beams that intersect each other in the main scanning direction in the vicinity of a deflector of the optical scanning unit, the optical path changing unit being provided to vary an intersecting angle of the adjacent light beams.

12. The multi-beam light source device of claim 11, wherein the light source unit includes a first light source unit and a second light source unit, the first light source unit supporting first light sources and first coupling lenses to array the first light sources in the main scanning direction, the first coupling lenses coupling light beams emitted by the first light sources, and the second light source unit supporting second light sources and second coupling lenses to array the second light sources in the main scanning direction, the second coupling lenses coupling light beams emitted by the second light sources, wherein the light beams of the second light source unit are disposed apart from the light beams of the first light source unit in a sub-scanning direction perpendicular to the main scanning direction.

13. The multi-beam light source device of claim 12, wherein the optical path changing unit changes an optical path direction of the light beams of the second light source unit within a plane including the main scanning direction.

14. The multi-beam light source device of claim 12, wherein the optical path changing unit comprises one of a positive lens and a negative lens, and said one of the positive lens and the negative lens changes an optical path direction of the light beams of the second light source unit within a plane including the main scanning direction.

15. The multi-beam light source device of claim 12, wherein the first coupling lenses and the second coupling lenses are arrayed such that optical axes of the first coupling lenses and optical axes of the second coupling lenses are at a given angle within a plane including the main scanning direction.

16. The multi-beam light source device of claim 12, wherein the first light source unit and the second light source unit respectively include a first supporting member and a second supporting member, the first supporting member and the second supporting member having an identical configuration, the first light sources being disposed apart from optical axes of the first coupling lenses in the main scanning direction, and the second light sources being disposed apart from optical axes of the second coupling lenses in the main scanning direction.

17. A multi-beam light source device comprising:
a light source holder holding a plurality of light sources, the light sources emitting multiple light beams; and
a fastening member supporting the light source holder to maintain a direction of the light source holder relative to an emission axis of the light beams, the fastening member having fastening portions secured to a base member that is fixed to a focusing optical device, wherein the light source holder and the fastening member form a light source unit; and
a mounting member supporting the light source unit on the base member by exerting a pressing force on the light source unit against the base member so as to match a direction of the light source unit relative to the base member with an emission axis perpendicular to a scanned surface of an optical scanning unit.

18. The multi-beam light source device of claim 17, wherein the multi-beam light source device includes a torsion bar provided for connecting the light source holder to the fastening member by bringing the fastening member in contact with a contact portion of the base member by a torsional force of the torsion bar.

19. The multi-beam light source device of claim 18, wherein the torsion bar is arranged so that an axial direction of the torsion bar is perpendicular to the emission axis.

20. The multi-beam light source device of claim 18, wherein the fastening member and the torsion bar are configured such that an axial direction of the torsion bar is variable within a plane perpendicular to the emission axis.

21. The multi-beam light source device of claim 17 wherein the base member integrally supports the light source unit by applying pressure of an elastic member to positions that cross over an emission axis of the light source unit, so as to maintain a direction of the light source holder relative to the emission axis.

22. The multi-beam light source device of claim 21, wherein the light source holder is mounted on the base member such that an optical path direction of the light sources of the light source holder to the base member is rotatable around a central axis of the light sources.

23. The multi-beam light source device of claim 21, wherein the elastic member includes a pressure changing unit that arbitrarily changes the pressure of the elastic member.

24. The multi-beam light source device of claim 21, wherein the elastic member is configured such that a ratio of a pressuring force to a deflection of the elastic member is increased as the deflection is increased.

25. The multi-beam light source device of claim 21, wherein the elastic member is constituted by a plurality of elastic units having different elasticity coefficients and being connected in series.

26. A multi-beam scanning apparatus in which an optical scanning unit scans a surface of a photosensitive medium in a main scanning direction by focusing multiple light beams of a multi-beam light source device onto the scanned surface, the multi-beam light source device comprising:

a light source unit supporting light sources and coupling lenses to array the light sources in the main scanning direction, the coupling lenses coupling light beams emitted by the light sources;

an angle adjustment mechanism which adjusts a mounting angle of the light source unit relative to a base member with respect to a sub-scanning direction; and an optical path changing unit changing an optical path of part of the light beams of the light source unit such that the light beams from the light source unit and the light beams from the optical path changing unit are converted into adjacent light beams that intersect each other in the main scanning direction in the vicinity of a deflector of the optical scanning unit, the optical path changing unit being provided to vary an intersecting angle of the adjacent light beams.

27. A multi-beam scanning apparatus comprising:

light source holder means for holding a plurality of light sources, the light sources emitting multiple light beams;

fastening member means for supporting the light source holder to maintain a direction of the light source holder means relative to an emission axis of the light beams, the fastening member means having fastening portions secured to a fixed base member, wherein the light source holder means and the fastening member means form a light source unit;

optical scanning means for focusing the light beams from the light source unit onto a scanned surface;

mounting member means for supporting the light source unit on the base member by exerting a pressing force onto the base member so as to match a direction of the light source unit relative to the base member with an emission axis perpendicular to the scanned surface of the optical scanning means; and torsion bar means for connecting the light source holder means to the fastening member means by bringing the fastening member means into contact with a contact portion of the base member by a torsional force of the torsion bar means.

28. A multi-beam scanning apparatus including a multi-beam light source device, the multi-beam light source device comprising:

a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder and the fastening member form a light source unit; and a mounting member supporting the light source unit on the base member by exerting a pressing force onto the base member so as to match a direction of the light source unit relative to the base member with an emission axis perpendicular to a scanned surface of an optical scanning unit.

29. A multi-beam light source device comprising:

first light source holder means for holding first light sources and first coupling lenses, the first coupling lenses coupling light beams emitted by the first light sources;

second light source holder means for holding the second light sources and the second coupling lenses, the second coupling lenses coupling light beams emitted by the second light sources, wherein the first and second light source holder means form a light source unit;

base member means for integrally supporting the first light source holder means and the second light source holder means by applying pressure of an elastic member to positions that cross over an emission axis of the light source unit, so as to maintain a direction of the light source holder relative to the emission axis, wherein each of the first and second light source holder means is mounted on the base member such that an optical path direction of the light sources of the light source unit to the base member is rotatable around a central axis of the light sources.

30. A multi-beam light source device comprising:

a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder is separately provided with and attached to the fastening member to form an integral light source unit, and the light source holder and the fastening member are of different materials.

31. The multi-beam light source device of claim 30, wherein the light source holder has a linear expansion coefficient that is less than a linear expansion coefficient of the fastening member.

32. The multi-beam light source device of claim 31, wherein the fastening member has a linear expansion coefficient that is below $15.0 \times 10^{-6}$ 1/°C.

33. The multi-beam light source device of claim 31, wherein the fastening member has a linear expansion coefficient that is substantially equal to a linear expansion coefficient of the base member.

34. The multi-beam light source device of claim 30 further comprising an intermediate member provided between an outside peripheral surface of the light source holder and an inside peripheral surface of the fastening member such that the light source holder is supported onto the fastening member through the intermediate member without contacting the fastening member directly.

35. The multi-beam light source device of claim 34, wherein the intermediate member includes a set of equally spaced cut-out portions on an outside peripheral surface of the intermediate member.

36. The multi-beam light source device of claim 34 wherein, when a first linear expansion coefficient of the light source holder is larger than a second linear expansion coefficient of the fastening member, the intermediate member has a linear expansion coefficient less than the second linear expansion coefficient of the fastening member.

37. The multi-beam light source device of claim 34, wherein, when the first linear expansion coefficient of the light source holder is less than the second linear expansion coefficient of the fastening member, the intermediate member has a linear expansion coefficient larger than the second linear expansion coefficient of the fastening member.

38. The multi-beam light source device of claim 34, wherein the intermediate member is made of an elastic material.

39. A multi-beam light source device comprising:

light source holder means for holding a plurality of light sources, the light sources emitting multiple light beams;

fastening means for supporting the light source holder means to maintain a direction of the light source holder means relative to an emission axis of the light beams, the fastening means having fastening portions secured to a base member that is fixed to a focusing optical device, wherein the light source holder means is separately provided with and attached to the fastening means to form an integral light source unit, and the light source holder means and the fastening means are of different materials; and angle adjustment means for adjusting a mounting angle of the light source unit relative to the base member, so that respective pitches of beam spots, formed on a scanned surface by the light beams, in a direction perpendicular to a main scanning direction are variable in accordance with the mounting angle adjustment.

40. A multi-beam scanning apparatus including a multi-beam light source device, the multi-beam light source device comprising:

a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder is separately provided with and attached to the fastening member to form an integral light source unit, and the light source holder and the fastening member are of different materials.

41. An image forming system including a multi-beam light source device and a multi-beam scanning apparatus, the multi-beam light source device comprising:

a light source unit holding light sources and coupling lenses, the coupling lenses coupling light beams emitted by the light sources;

a base member holding the light source unit such that the light beams from the light source unit held by the base member are rotatable around an axis which passes through a point of intersection of the light beams and is perpendicular to a sub-scanning cross-section in a sub-scanning direction of an optical scanning device; and an angle adjustment mechanism configured to adjust a mounting angle of the light source unit relative to the base member with respect to the sub-scanning direction, so that respective pitches of beam spots, formed on a scanned surface by the light beams, in the sub-scanning direction are variable in accordance with the mounting angle adjustment.

42. An image forming system including a multi-beam light source device and a multi-beam scanning apparatus, the multi-beam light source device comprising:

a light source unit supporting light sources and coupling lenses to array the light sources in the main scanning direction, the coupling lenses coupling light beams emitted by the light sources;

an angle adjustment mechanism which adjusts a mounting angle of the light source unit relative to a base member with respect to a sub-scanning direction, and an optical path changing unit changing an optical path of part of the light beams of the light source unit such that the light beams from the light source unit and the light beams from the optical path changing unit are converted into adjacent light beams that intersect each other in the main scanning direction in the vicinity of a deflector of the optical scanning unit, the optical path changing unit being provided to vary an intersecting angle of the adjacent light beams.

43. An image forming system including a multi-beam light source device and a multi-beam scanning apparatus, the multi-beam light source device comprising:

a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder and the fastening member form a light source unit; and a mounting member supporting the light source unit on the base member by exerting a pressing force on the light source unit against the base member so as to match a direction of the light source unit relative to the base member with an emission axis perpendicular to a scanned surface of an optical scanning unit.

44. An image forming system including a multi-beam light source device and a multi-beam scanning apparatus, the multi-beam light source device comprising:

a light source holder holding a plurality of light sources, the light sources emitting multiple light beams; and a fastening member supporting the light source holder to maintain a direction of the light source holder relative to an emission axis of the light beams, the fastening member having fastening portions secured to a base member that is fixed to a focusing optical device, wherein the light source holder is separately provided with and attached to the fastening member to form an integral light source unit, and the light source holder and the fastening member are of different materials.

* * * * *